(12) United States Patent
Beretta et al.

(10) Patent No.: US 9,358,744 B2
(45) Date of Patent: Jun. 7, 2016

(54) PRODUCT HAVING A NET STRUCTURE, A PROCESS FOR REALIZING THE PRODUCT AND USE OF THE PRODUCT FOR GEOTECHNICAL APPLICATIONS

(75) Inventors: Cesare Beretta, Castagnola (CH); Piergiorgio Recalcati, Milan (IT)

(73) Assignee: TENAX S.P.A, Vigano (Lecco) (IT)

( * ) Notice: Subject to any disclaimer, the term of this patent is extended or adjusted under 35 U.S.C. 154(b) by 498 days.

(21) Appl. No.: 13/444,611

(22) Filed: Apr. 11, 2012

(65) Prior Publication Data

US 2012/0257933 A1  Oct. 11, 2012

(30) Foreign Application Priority Data

Apr. 11, 2011  (IT) .............................. MI2011A0606

(51) Int. Cl.
| | |
|---|---|
| *E02D 17/20* | (2006.01) |
| *B29D 28/00* | (2006.01) |
| *B32B 3/10* | (2006.01) |
| *E02D 29/02* | (2006.01) |
| *B29C 55/08* | (2006.01) |
| *B29C 55/12* | (2006.01) |

(52) U.S. Cl.
CPC ............ *B29D 28/00* (2013.01); *E02D 29/0208* (2013.01); *E02D 29/0241* (2013.01); *B29C 55/08* (2013.01); *B29C 55/12* (2013.01); *E02D 17/202* (2013.01); *Y10T 428/24314* (2015.01)

(58) Field of Classification Search
CPC ......... E02D 17/00; E02D 17/18; E02D 17/20; E02D 17/202; E02D 29/0241; E02D 29/0233; E02D 29/02; E02D 29/0266; E02D 29/0225; E02D 29/0208; E02D 5/76; E02D 1/00; E02D 27/01; E02D 31/00

USPC ............. 405/302.4, 302.7; 428/131, 134, 136
See application file for complete search history.

(56) References Cited

U.S. PATENT DOCUMENTS

| | | | | |
|---|---|---|---|---|
| 3,386,876 | A | * | 6/1968 | Wyckoff ........................ 428/134 |
| 4,152,479 | A | | 5/1979 | Larsen |
| 4,207,375 | A | * | 6/1980 | Kim et al. ...................... 428/134 |
| 4,374,798 | A | * | 2/1983 | Mercer ....................... 264/288.8 |
| 4,530,622 | A | * | 7/1985 | Mercer .......................... 405/284 |
| 4,610,568 | A | | 9/1986 | Koerner |

(Continued)

FOREIGN PATENT DOCUMENTS

| | | |
|---|---|---|
| EP | 0 418 104 A2 | 3/1991 |
| EP | 0 914 933 A1 | 5/1999 |

(Continued)

*Primary Examiner* — Tara M. Pinnock
(74) *Attorney, Agent, or Firm* — Oliff PLC

(57) ABSTRACT

A reinforcing element for geo-technical applications may include a monolithic net structure made of a plastic material, having a plurality of first elements distanced from one another and having an elongate conformation in a respective prevalent development direction, a plurality of second elements distanced from one another and also having an elongate conformation, which develop substantially in a transversal direction to the first elements. The second elements are stretched along a development thereof, and the second elements are configured such that the net structure exhibits a substantially arched profile and forms a longitudinal seating having an axis of extension substantially parallel to the first elements. A process of manufacturing the reinforcing element and an artificial or partially artificial structure obtained by consolidating the terrain using the reinforcing element are also described.

26 Claims, 47 Drawing Sheets

(56) References Cited

U.S. PATENT DOCUMENTS

| | | | | |
|---|---|---|---|---|
| 4,680,215 | A | * | 7/1987 | Mercer .................. 428/107 |
| 4,743,486 | A | * | 5/1988 | Mercer et al. ............ 428/134 |
| 4,756,946 | A | | 7/1988 | Mercer |
| 5,053,264 | A | | 10/1991 | Beretta |
| 5,156,495 | A | * | 10/1992 | Mercer .................. 405/262 |
| 5,267,816 | A | * | 12/1993 | Mercer et al. ............ 405/302.7 |
| 5,269,631 | A | * | 12/1993 | Mercer et al. ............ 405/302.7 |
| 5,419,659 | A | | 5/1995 | Mercer |
| 5,851,089 | A | * | 12/1998 | Beretta ................ 405/259.1 |
| 6,343,895 | B1 | * | 2/2002 | Yamada et al. ............ 405/302.7 |
| 6,423,394 | B1 | * | 7/2002 | Mercer et al. ............ 428/131 |
| 6,558,075 | B2 | * | 5/2003 | Benedict et al. ............ 405/21 |
| 7,048,474 | B2 | * | 5/2006 | Tabler .................. 405/302.7 |
| 7,645,098 | B1 | | 1/2010 | Rainey |
| 2002/0069605 | A1 | * | 6/2002 | Hong .................. 52/660 |
| 2003/0118410 | A1 | * | 6/2003 | Race .................. 405/302.7 |

FOREIGN PATENT DOCUMENTS

| | | |
|---|---|---|
| GB | 2 253 669 | 9/1992 |
| KR | 2008111706 | * 12/2008 |
| WO | 2004/094259 A1 | 11/2004 |

* cited by examiner

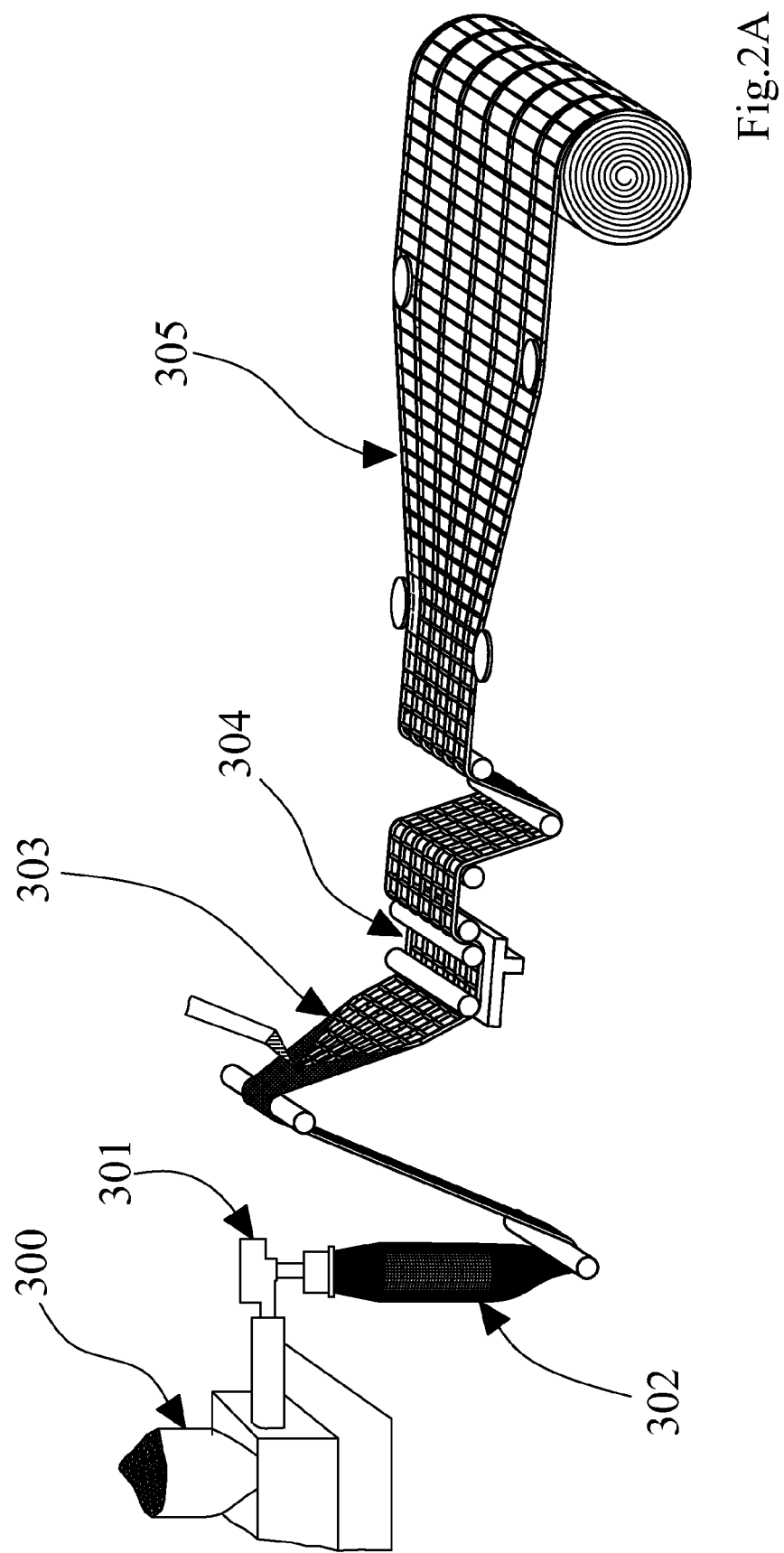

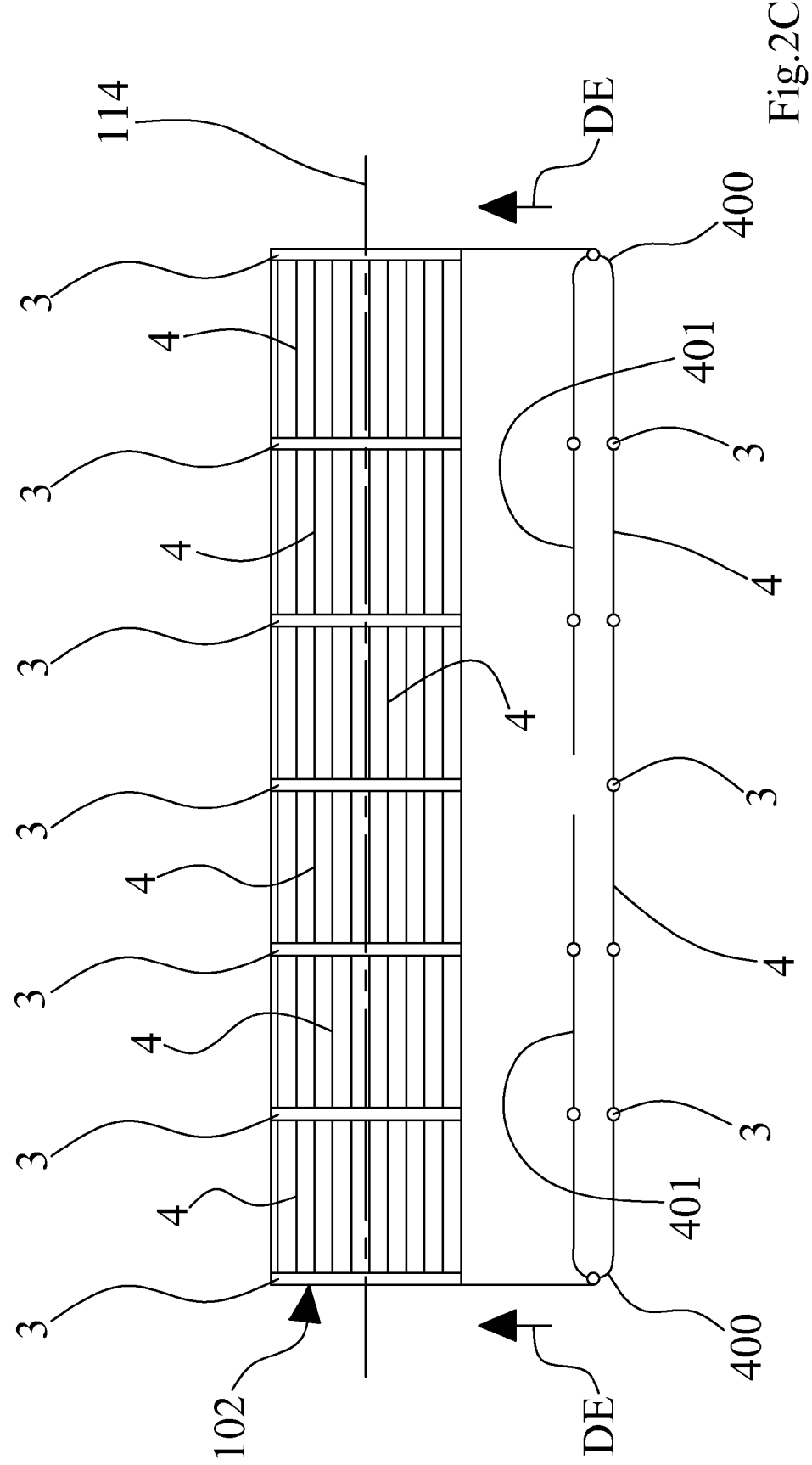

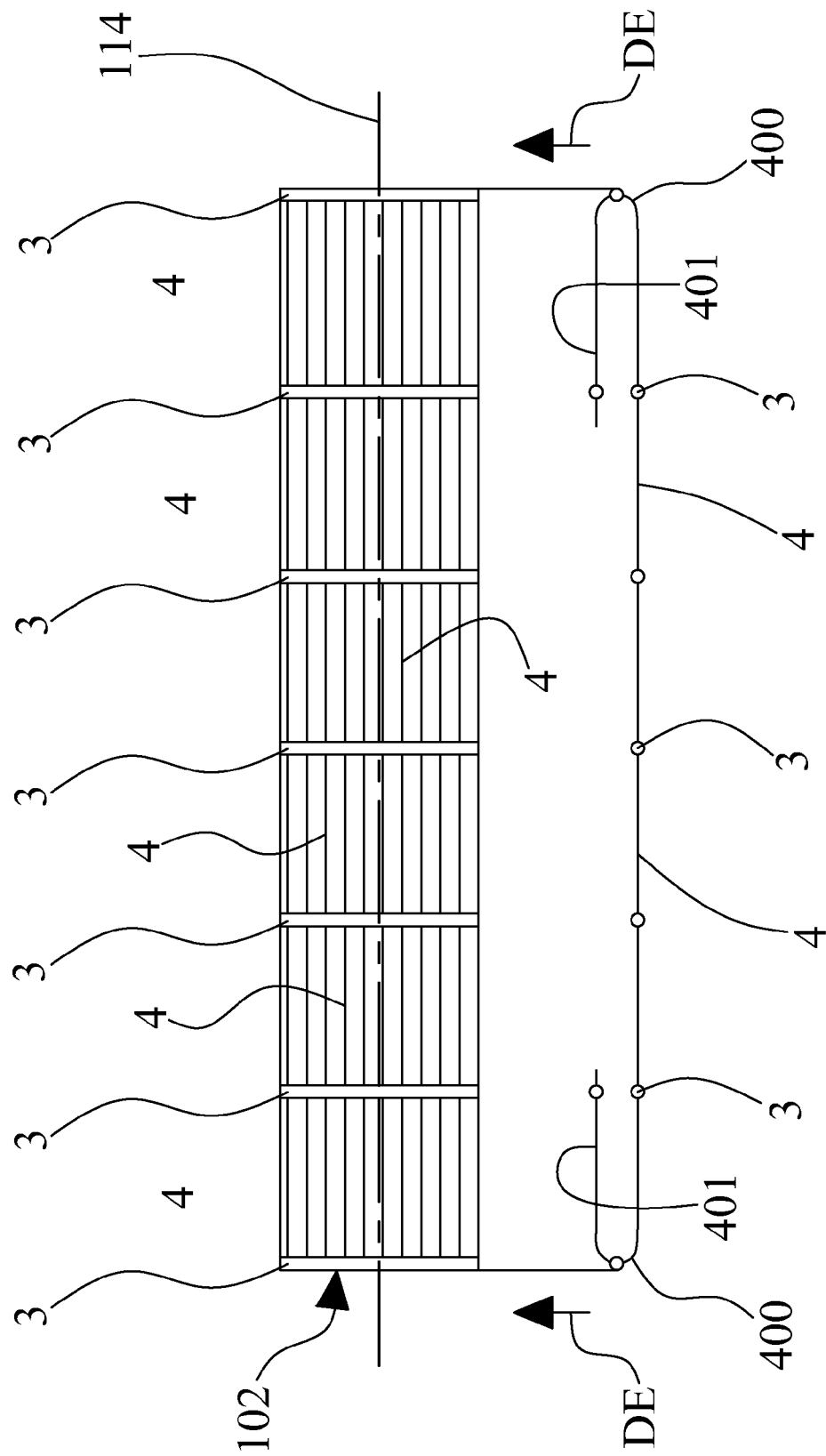

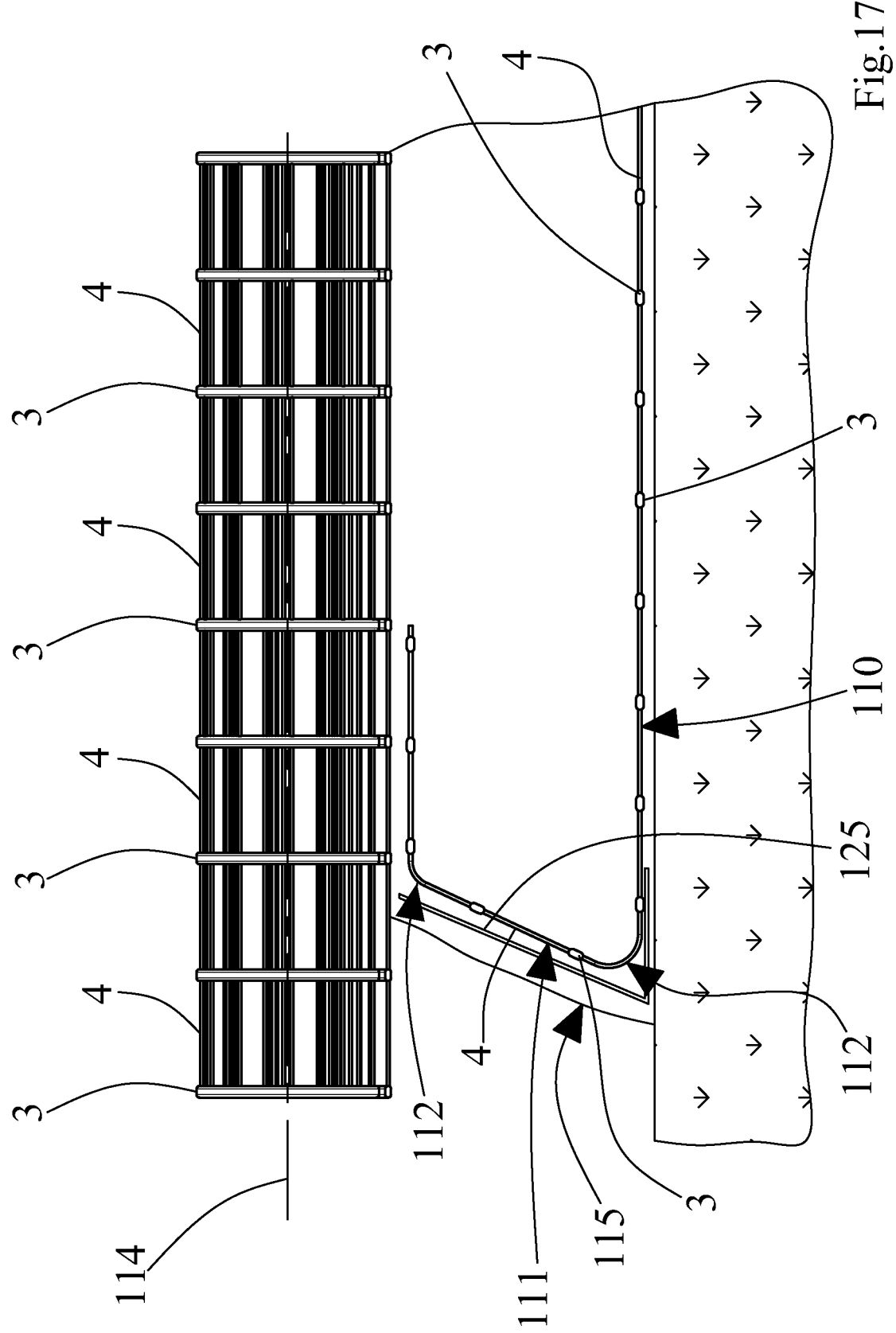

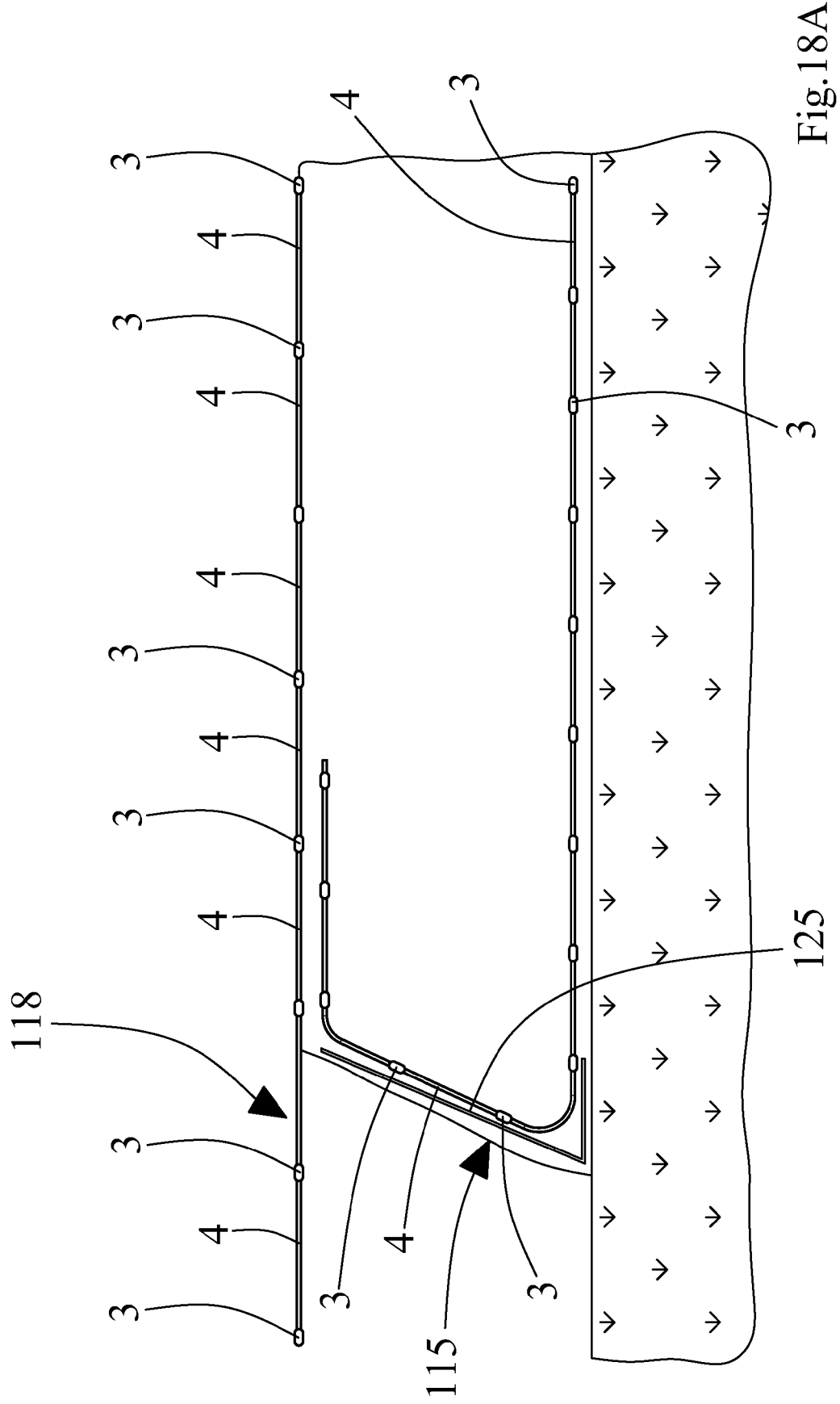

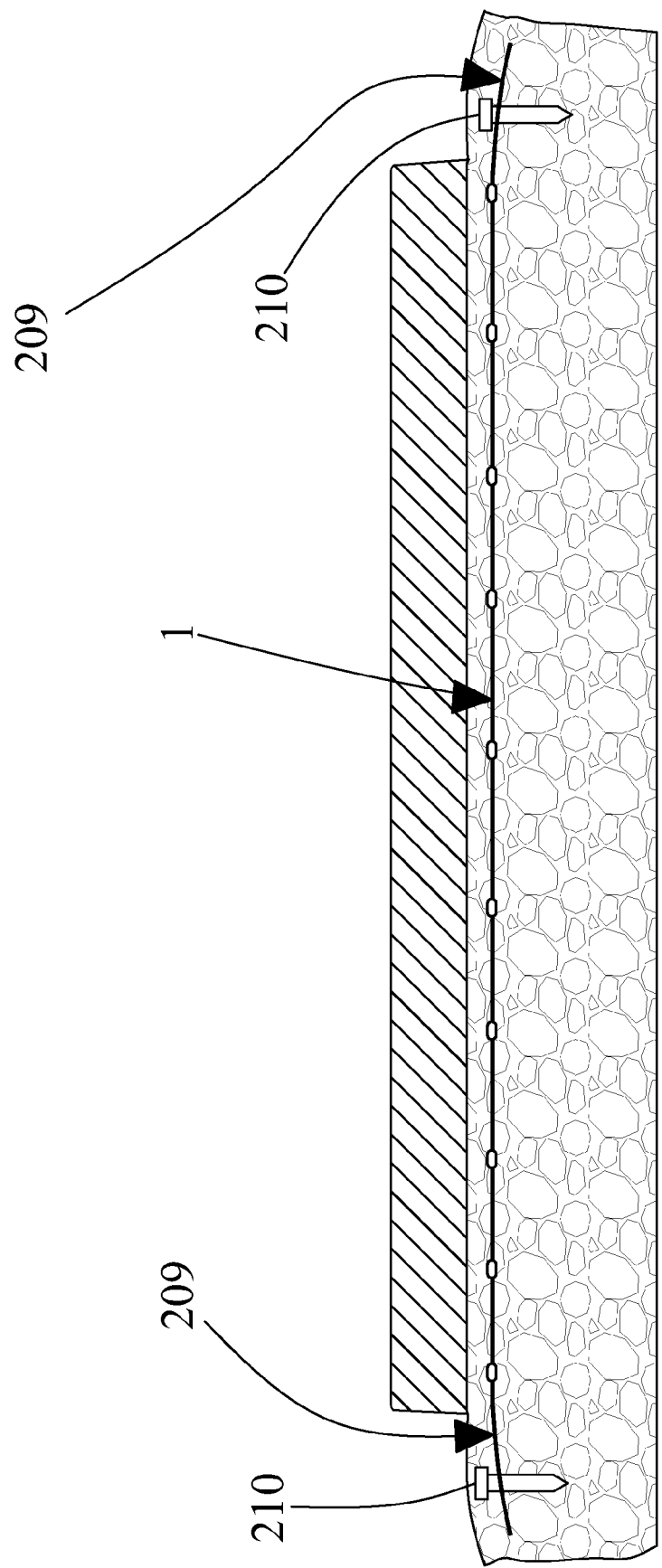

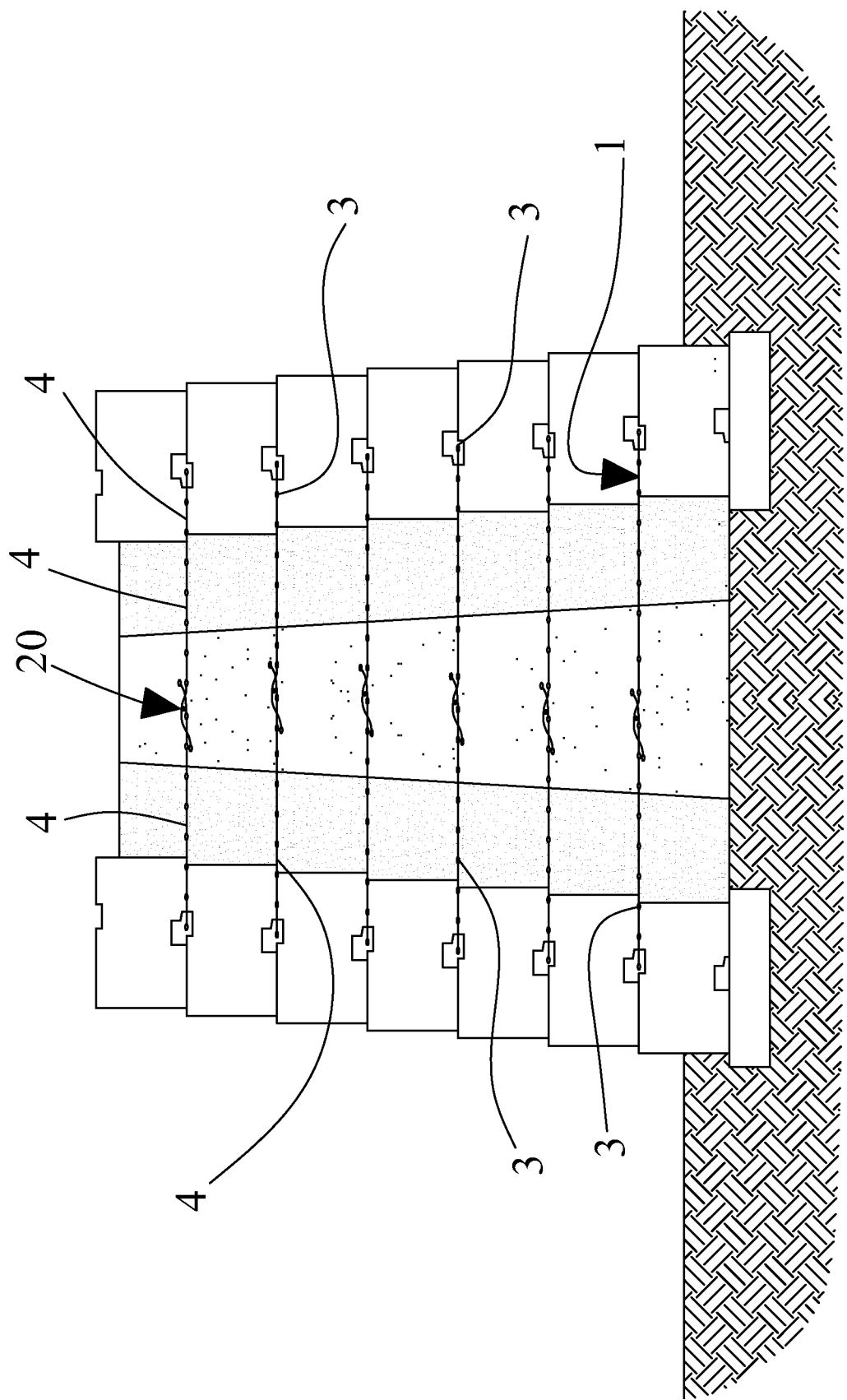

PRODUCT HAVING A NET STRUCTURE, A PROCESS FOR REALIZING THE PRODUCT AND USE OF THE PRODUCT FOR GEOTECHNICAL APPLICATIONS

CROSS-REFERENCE TO RELATED APPLICATION

This application claims the benefit of priority of Italian Patent Application No. MI2011A000606, filed Apr. 11, 2011, pursuant to 35 U.S.C. 119(a)-(d), the disclosure of which is incorporated herein by reference.

TECHNICAL FIELD

The invention relates to a product, which can be wound up in a roll form, from which a single-stretched reinforcing element can be obtained having dimensions such as to be suitable in many geotechnical applications. For example the reinforcing element of the invention is applicable for reinforcing artificial structures. Examples of application are represented by natural slopes which require consolidation and/or reinforcement, such as green walls, block walls, artificial walls, coverings for rocky slopes, rockfall repairs, sound-absorbing barriers, valley protection against rockfalls and railway beddings.

A further example of an application is for stabilizing yielding terrains as well as consolidation of road beds, parking areas, and finally the realizing of coastal protection systems, and the realization of columns for consolidation.

BACKGROUND OF THE INVENTION

As is known, net elements are present on the market, used for the reinforcement, containment, stabilization and/or the consolidation of terrain.

A first example relates to a net element or grid structure made of a substantially flat plastic material. The element is stretched in the manufacturing process of the product in two directions such as to increase the structural strength thereof in both directions and the possibility of confining the meshes between the covering material. The shape of the product makes it suitable as a stabilizer or containing element or otherwise for use where an action of reinforcement and stabilization is required, substantially uniform in all directions of the lie plane of the net structure. It should be noted in fact that the openings in the grid, substantially square, to a certain extent enable interlocking with the granules present in the soil and the cooperation with the same.

The net element is obtained by subjecting the extruded or perforated product first to a stretching action in the longitudinal direction, with the passage of rollers rotating at different speeds, and then in the transversal direction via the action of an orthopedic implant for transverse stretching.

A second example concerns reinforcing structures made of a plastic material and composed of a reticular structure having a series of substantially stretched longitudinal elements and a series of transversal elements substantially not stretched. These elements create meshes with elongate apertures which can be inserted in the terrain to be strengthened during the depositing of the structures in place. The reinforcing structure is obtained by extrusion or perforation of sheets and then by stretching in the exiting direction from the extruder, and exhibits parallel longitudinal elements at a fixed distance and a length that is adjustable according to requirements. The reticular structure is in fact subjected to unidirectional stretching along the exit direction from the extruder, and then cut transversally; the grid thus obtained has a good tensile strength in the direction of the longitudinal elements, and the ability to contain and reinforce terrain. Note that the openings in the grid, of substantially rectangular shape, allow a certain amount interlocking with the granules present in the terrain and co-operation with them too, and the pronounced thickness of the non-stretched transversal elements ensures a good anchoring capability. It should however be noted that the orientation of the maximum resistance direction coincides with that of the exiting direction from the extruder and this entails major limitations at the level of application and implementation due to the limited dimension of the width of the finished product available today.

At present, in fact, the product reaches a maximum width of two meters and in existing applications, the task of laying the element along the direction to be reinforced means having to constantly repeat the process of sectioning the product into many strip such as to create panels in a sufficient number to match the dimensions of the work area, and then the panels have to be laid side by side.

A further drawback is that the existing panels are not interconnectable along the sides and therefore, in order to make the reinforcement continuous panels are partially overlapped, with an ensuing waste of material.

Also, the anchoring along the reinforcing direction is at present possible only along the ends of each panel which are of limited size and therefore not efficient for uses where it is necessary to cover areas of significant extension.

Further examples of net structures are described in documents U.S. Pat. Nos. 4,756,946, 4,374,798, 4,743,486, 5,269,631, 5,267,816 5,419,659, EPO418104A2, and U.S. Pat. No. 5,053,264.

SUMMARY

A first aim of the present example is to obviate one or more of the limitations and drawbacks of the preceding solutions.

A further aim of the invention is to disclose a product, which can be wound in a roll form, having considerable dimensions, constituted by a reinforcing element having excellent mechanical resistance characteristics and at the same time a novel use mode and good flexibility of use.

An additional aim of the invention is to provide a product which enables simplifying the on-site operation, reducing times and costs of installation.

An additional aim of the invention is to provide a product which can enable realizing reinforcing and stabilizing areas of significant dimensions.

A further aim is to disclose a production process for efficient manufacture of a rolled product and/or of a reinforcing element which is usable for geotechnical applications.

A further aim of the invention is to provide terrain consolidation processes that are effective and easy to lay.

Finally, an aim of the invention is to disclose a product and/or a reinforcing element which can satisfy various product demands thanks to the possibility of easily varying the configuration of the meshes of the net structure.

One or more of the set aims are attained by a rolled product, by a reinforcing element and by the processes described in the accompanying claims.

Aspects of the invention are described in the following.

In a 1st aspect, a roller product is provided for use in geotechnical applications which exhibits a monolithic net structure made of a plastic material, wound upon itself, the net structure comprising: a plurality of first elements distanced from one another, a plurality of second elements distanced from one another which develop substantially in a transversal direction to the first elements; the second elements are stretched along the development thereof.

In a 2nd aspect according to the 1st aspect, the net structure is wound in a roller about a winding axis that is transversal to the first elements.

In a 3rd aspect according to any one of the preceding aspects, the second elements exhibit a length of greater than 1.2 meters.

In a 4th aspect according to any one of the preceding aspects, the second elements exhibit a length of greater than 3 meters.

In a 5th aspect according to any one of the preceding aspects, the second elements exhibit a length of greater than 5 meters.

In a 6th aspect according to any one of the preceding aspects, the first elements exhibit a length of greater than 10 meters.

In a 7th aspect according to any one of the preceding aspects, the first elements are twice as long as the second elements or ten times as long as the second elements.

In an 8th aspect according to any one of the preceding aspects, the winding axis is substantially parallel to the second elements.

In a 9th aspect according to any one of the preceding aspects, the first elements and the second elements are substantially perpendicular to one another.

In a 10th aspect according to any one of the preceding aspects the second elements are configured such as to freely flex about at least a transversal axis of the second elements themselves.

In an 11th aspect according to any one of the preceding aspects, the second elements are configured such as to freely flex about at least a transversal axis substantially parallel to the first elements.

In a 12th aspect according to any one of the preceding aspects the second elements are stretched along their prevalent development axis following formation thereof, and exhibit a structure having molecular chains orientated along the prevalent develop direction of the second elements.

In a 13th aspect according to any one of the preceding aspects the second elements are obtained by extrusion and subsequent stretching.

In a 14th aspect according to any one of the preceding aspects the second elements exhibit a stretching ratio defined as a ratio between a final length of the second elements once the stretching has been carried out and an initial length of the second elements before a stretching action thereon, that is greater than 3.

In a 15th aspect according to any one of the preceding aspects the second elements exhibit a stretching ratio defined as a ratio between a final length of the second elements once the stretching has been carried out and an initial length of the second elements before a stretching action thereon, that is comprised between 3 and 8.

In a 16th aspect according to any one of the preceding aspects the second elements exhibit a stretching ratio defined as a ratio between a final length of the second elements once the stretching has been carried out and an initial length of the second elements before a stretching action thereon, that is comprised between 4 and 7.

In a 17th aspect according to any one of the preceding aspects the first elements exhibit a stretching ratio defined as a ratio between a final length of the first elements once the stretching has been carried out and an initial length of the first elements before a stretching action thereon, that is lower than the stretching ratio of the second elements.

In an 18th aspect according to any one of the preceding aspects the first elements exhibit a stretching ratio defined as a ratio between a final length of the first elements once the stretching has been carried out and an initial length of the first elements before a stretching action thereon, that is comprised between 1 and 1.5.

In a 19th aspect according to any one of the preceding aspects the first elements are not subjected to stretching after their formation.

In a 20th aspect according to any one of the preceding aspects the first elements and the second elements intersect at nodes to form meshes, at least the second elements exhibiting portions extending between consecutive nodes, each of the portions having terminal zones of a width, measured parallel to the first elements, that progressively decreases starting from a node in a direction of a median line of the portions and a central zone having a substantially constant width along the respective development.

In a 21st aspect according to any one of the preceding aspects the first elements and the second elements exhibit a full transversal section.

In a 22nd aspect according to any one of the preceding aspects the transversal section of the first elements is greater by at least 5 times with respect to the transversal section of the second elements.

In a 23rd aspect according to any one of the preceding aspects the first elements exhibit a transversal section having an area of greater than 20 $mm^2$.

In a 24th aspect according to any one of the preceding aspects the first elements exhibit a transversal section having an area of greater than 30 $mm^2$.

In a 25th aspect according to any one of the preceding aspects the second elements exhibit a transversal section having an area of greater than 3 $mm^2$.

In a 26th aspect according to any one of the preceding aspects the second elements exhibit a transversal section having an area of greater than 4 $mm^2$.

In a 27th aspect according to any one of the preceding aspects the net structure exhibits a specific weight of greater than 200 g per $m^2$, for instance a specific weight comprised between 200 and 1200 g per $m^2$.

In a 28th aspect according to any one of the preceding aspects the net structure exhibits a specific resistance to traction, along the second elements, greater than 20 KN/m, the specific resistance to traction being measured with the method set down in the detailed description that follows.

In a 29th aspect according to any one of the preceding aspects the net structure exhibits a specific resistance to traction, along the second elements, comprised between 20 and 200 KN/m, the specific resistance to traction being measured with the method set down in the detailed description that follows.

In a 30th aspect according to any one of the preceding aspects the net structure exhibits a specific resistance to traction, along the second elements, comprised between 60 and 200 KN/m, the specific resistance to traction being measured with the method set down in the detailed description that follows.

A 31st aspect relates to a process for realizing a manufactured product according to any one of the preceding aspects, comprising steps of: continuously forming a semi-finished workpiece having a net structure and developing continuously in an advancement direction, first elements of the net structure being parallel to the advancement direction, stretching the semi-finished workpiece transversally to the advancement direction such as to form the second stretched elements, rolling the net structure on itself according to a rolling axis that is transversal to the first elements.

Note that the workpiece having a net structure, after stretching, can be directly rolled to form a rolled product; alternatively before the rolling step there can be a step in which the semi-finished workpiece is folded on itself along one or more fold lines parallel to the first elements, reducing the transversal size of the workpiece and the product under formation. For example, the workpiece can be folded on itself along a longitudinal median line thereof or lateral flaps of the workpiece can be folded along longitudinal fold lines: this is made possible by the flexibility of the second elements.

In a 32nd aspect according to the 31st aspect, the first elements and the second elements are formed either starting from a perforated sheet made of a plastic material formed in a laminating or calendering station, or are formed continuously by hot co-extrusion in an extrusion station.

In a 33rd aspect according to the 32nd aspect the outlet direction of the net structure from the laminating or calendering station or, respectively, from the extrusion station, is parallel to the prevalent development direction of the first elements.

In a 34th aspect according to any one of aspects from 31 to 33, the second elements, optionally brought to a temperature of 80° C. or higher, are stretched and elongated by at least 300%.

In a 35th aspect according to any one of aspects from 31 to 34, the first elements are not stretched following formation thereof.

A 36th aspect relates to a use of a product according to any one of aspects from 1 to 30, in a process for consolidation or reinforcement of terrains or natural or artificial structures having a prevalent development direction.

In a 37th aspect according to the 36th, the process comprises unrolling the rolled product along the prevalent development direction of the first elements in order to obtain a reinforcing element and positioning the reinforcing element thus-obtained on the terrain or the natural or artificial structure, with the first elements orientated parallel to the prevalent development direction of the terrain or the natural or artificial structure.

In a 38th aspect a reinforcing element for geotechnical applications is comprised, including a monolithic net structure made of a plastic material having: a plurality of first elements spaced from one another and having an elongate conformation in a respective prevalent development direction, a plurality of second elements spaced from one another and also having an elongate conformation, which develop substantially in a transversal direction to the first elements; the second elements are stretched along the development thereof.

In a 39th aspect according to the 38th aspect, the second elements, in a work condition of the net structure, are configured such that the net structure exhibits a substantially arched profile to form a longitudinal seating exhibit an extension axis that is substantially parallel to the first elements.

In a 40th aspect according to the 39th aspect, the net structure, in working condition, exhibits a length, in the direction of the extension axis, that is greater than 3 meters.

In a 41st aspect according to the 39th or 40th aspect, the net structure, in working condition, exhibits a length, in the direction of the extension axis, that is greater than 5 meters.

In a 42nd aspect according to the 39th or 40th or 41st aspect, the net structure, in working condition, exhibits a length, in the direction of the extension axis, that is greater than 10 meters.

In a 43rd aspect, according to any one of aspects from 39 to 42, the net structure, in a working condition, exhibits a ratio between the length in the direction of the extension axis and a maximum transversal size measured perpendicular to the axis of greater than 3.

In a 44th aspect according to any one of aspects from 39 to 43, the second elements exhibits a length of greater than 1.2 meters.

In a 45th aspect according to any one of aspects from 39 to 44, the second elements exhibits a length of greater than 3 meters.

In a 46th aspect according to any one of aspects from 39 to 45, the second elements exhibits a length of greater than 5 meters.

In a 47th aspect according to any one of aspects from 39 to 46, the first elements are twice as long as the second elements.

In a 48th aspect according to any one of aspects from 39 to 47, the first elements are ten times as long as the second elements.

In a 49th aspect according to any one of aspects from 39 to 48, the second elements are stretched following the formation thereof and exhibit a structure having molecular chains orientated along the development of the second elements.

In a 50th aspect according to any one of aspects from 39 to 49, the second elements are obtained by coextrusion with the first elements or sheet formation, and by a following stretching along the prevalent development direction thereof.

In a 51st aspect according to any one of the preceding aspects the net structure exhibits a radially external surface and a radially internal surface opposite the radially external surface.

In a 52nd aspect according to any one of the preceding aspects the net structure exhibits a first and a second longitudinal flap arranged at respective transversal ends of the net structure.

In a 53rd aspect according to any one of the preceding aspects the net structure, in working conditions, winds at least partially on itself to form a zone of longitudinal superposing comprising at least two mutually superposed flaps of the net structure.

In a 54th aspect according to the 53rd aspect the superposing zone comprises a plurality of slots, each of the slots forming a passage opening delimited by tracts of second elements of the mutually superposed flaps.

In a 55th aspect according to the 54th aspect a plurality of the slots is substantially aligned in a direction of the first elements to form a coupling zone.

In a 56th aspect according to the 55th aspect a second plurality of slots is substantially aligned in a direction of the first elements, forming an auxiliary coupling zone.

In a 57th aspect according to any one of aspects from 39 to 56, the reinforcing element comprises a blocking element configured such as to guarantee at least radial blocking of the net structure in work condition.

In a 58th aspect according to the 57th aspect, the blocking elements are engaged with the slots.

In a 59th aspect according to any one of aspects from the 57th to the 58th, the blocking elements are arranged internally of the passage openings.

In a 60th aspect according to any one of aspects from the 57th to the 58th, the blocking elements comprise at least a rod inserted in the passage openings of the slots.

In a 61st aspect according to any one of aspects from the 57th to the 60th, the blocking elements comprise a rod for each aligned series of slots.

In a 62nd aspect according to any one of aspects from 52 to 61, the first and second flap are substantially facing one another.

In a 63rd aspect according to any one of aspects from 52 to 62, the first and the second flap are in contact and the blocking elements are arranged substantially on the flaps and configured such as to guarantee at least a radial blocking and/or a tangential blocking between the flaps.

In a 64th aspect according to any one of aspects from 57 to 63, the blocking elements are a solid part of the net structure.

In a 65th aspect according to any one of aspects from 57 to 63, the blocking elements are distinct entities from the net structure couplable to the first elements.

In a 66th aspect according to the 65th aspect the blocking elements comprise a predetermined number of clips and/or plates engaging the two facing flaps.

In a 67th aspect according to any one of aspects from 39 to 65, the reinforcing element exhibits a support element internally arranged in the seating.

In a 68th aspect according to aspect 67, the support element is a net tube or bag filled with an aggregate material, concrete or a combination thereof; alternatively, the support element is defined by at least a laminar bordering element joined on a side of the reinforcing element, for example a plastic net or a textile net, or a non-woven textile, having through-openings that are significantly smaller with respect to the openings of the net structure, the support element delimiting a space that can be filled with aggregate material, concrete or a combination thereof.

In a 69th aspect according to any one of aspects from 39 to 68, the net structure, in work conditions, exhibits, in a transversal section, a profile having a polygonal or circular or elliptical or arc of circle or arc of ellipse shape.

In a 70th aspect according to any one of aspects from 39 to 69, the first elements and the second elements are respectively longitudinal and transversal elements.

In a 71st aspect according to the 70th aspect the transversal elements are located normally to the longitudinal elements, which are substantially rectilinear.

In a 72nd aspect according to any one of aspects from 38 to 71, the first elements and the second elements intersect at nodes to form links, at least the second elements exhibiting portions extending between consecutive nodes, the portions having a progressively decreasing width starting from a node in a direction of a median line of the portions and a progressive increase in a direction from a median line to the next node, and wherein the width is measured parallel to the first elements.

In a 73rd aspect according to any one of aspects from 38 to 72, the second elements exhibits a transversal section having a substantially non-constant area along the respective developments.

In a 74th aspect according to any one of the preceding aspects from 38 to 73, the first elements and/or the second elements exhibit a full transversal section.

In a 75th aspect according to any one of the preceding aspects from 38 to 74, the transversal section of the first elements is greater by at least 5 times with respect to the transversal section of the second elements.

In a 76th aspect according to any one of the preceding aspects from 38 to 75, the first elements exhibit a transversal section having an area of greater than 20 mm$^2$.

In a 77th aspect according to any one of aspects from 38 to 76, the first elements exhibit a transversal section having an area of greater than 30 mm$^2$.

In a 78th aspect according to any one of aspects from 38 to 77, the second elements exhibit a transversal section having an area of greater than 3 mm$^2$.

In a 79th aspect according to any one of aspects from 38 to 78, the second elements exhibit a transversal section having an area of greater than 4 mm$^2$.

In an 80th aspect according to any one of aspects from 39 to 79, the second elements exhibit a stretching ratio of greater than 3.

In an 81st aspect according to any one of aspects from 39 to 80, the second elements exhibit a stretching ratio of between 3 and 8.

In an 82nd aspect according to any one of aspects from 39 to 81, the second elements exhibit a stretching ratio of between 4 and 7.

In an 83rd aspect according to any one of aspects from 39 to 82, the first elements exhibit a stretching ratio, defined as a ratio between a final length of the first elements once the stretching is performed and an initial length of the first elements before a stretching action thereon, smaller than the stretching ratio of the second elements.

In an 84th aspect according to any one of the preceding aspects from 39 to 83, the first elements exhibit a stretching ratio defined as a ratio between a final length of the first elements once the stretching has been carried out and an initial length of the first elements before a stretching action thereon, that is comprised between 1 and 1.5.

In an 85th aspect according to any one of aspects from 39 to 84, the first elements are either not stretched or exhibit a smaller stretching ratio, optionally at least half, with respect to the ratio of the second elements, the stretching ratio of an element being defined as a ratio between a final length of the element once the stretching has been performed and the initial length of the element before the stretching action.

In an 86th aspect according to any one of aspects from 38 to 85, the net structure exhibits a specific weight of greater than 200 g per m$^2$.

In an 87th aspect according to any one of aspects from 38 to 86, the net structure exhibits a specific weight comprised between 200 and 1200 g per m$^2$.

In an 88th aspect according to any one of aspects from 39 to 87, the net structure exhibits a specific resistance to traction, along the second elements, greater than 20 KN/m, the specific resistance to traction being measured with the method set down in the detailed description that follows.

In an 89th aspect according to any one of aspects from 39 to 88, the net structure exhibits a specific resistance to traction, along the second elements, comprised between 20 and 200 KN/m, the specific resistance to traction being measured with the method set down in the detailed description that follows.

In a 90th aspect according to any one of the preceding aspects from 39 to 89, the net structure exhibits a specific resistance to traction, along the second elements, comprised between 60 and 200 KN/m, the specific resistance to traction being measured with the method set down in the detailed description that follows.

A 91st aspect comprises a process for realizing a reinforcing element according to any one of aspects from 39 to 90, comprising steps of: continuously forming a semi-finished workpiece having a net structure developing continuously according to an advancing direction, first elements of the net structure being parallel to the advancement direction, stretching the workpiece transversally to the advancement direction in order to form the second stretched elements, cutting the net structure transversally of the first elements, arranging the net structure in working conditions in which the net structure forms the seating.

In a 92nd aspect according to the 91st aspect, the first elements and the second elements are formed either starting from a perforated sheet made of a plastic material form in a laminating or calendering station, or are formed continuously by hot co-extrusion in an extrusion station.

In a 93rd aspect according to the 92nd aspect the outlet direction of the net structure from the laminating or calendering station or, respectively, from the extrusion station, is parallel to the prevalent development direction of the first elements.

In a 94th aspect according to any one of aspects from 31 to 33, the second elements, optionally brought to a temperature of 80° C. or higher, are stretched and elongated by at least 300%.

In a 95th aspect according to any one of aspects from 91 to 94, the first elements are not stretched following formation thereof, or are stretched less than the second elements.

A 96th aspect comprises use of a reinforcing element according to any one of aspects from 38 to 90, or made according to a process for realizing the reinforcing element according to any one of aspects from 91 to 95, in a process for consolidating terrain or in a process for sea beds, lake beds or river beds.

In a 97th aspect according to the 96th aspect, in the process for consolidating marine beds, the reinforcing element is configured transversally as a closed loop and is arranged longitudinally with the axis thereof transversal to the bank and in a mutually flanking relation with other reinforcing elements also configured as closed loops; the reinforcing elements housing filler material.

In a 98th aspect according to aspects 96 or 97, the terrain consolidating process comprises following steps: realizing a plurality of housing cavities, optionally having a vertical development, in a terrain to be consolidated, predisposing internally of each housing cavity at least a reinforcing element according to any one of aspects from 38 to 90, or realized using a process according to any one of aspects from 91 to 95, the reinforcing element has the first elements aligned along the depth of the cavities, inserting at least a filler material internally of the longitudinal seating, defined by the reinforcing element.

In a 99th aspect according to the 98th aspect, the reinforcing element is inserted internally of the housing cavity, conformed according to a closed transversal profile.

In a 100th aspect, an artificial or partly artificial structure is provided, obtained by consolidating terrain, comprising: a plurality of housing cavities fashioned in a terrain, at least a reinforcing element according to any one of aspects from 38 to 90, or realized by means of a process according to any one of aspects from 91 to 95, inserted in each respective cavity with the first elements orientated longitudinally along the depth of the cavities, a filler material internally of the longitudinal seating or internally of a reinforcing element housed in the longitudinal seating.

A 101st aspect comprises a reinforcing element for geotechnical applications comprising a monolithic net structure made of a plastic material having: a plurality of the first elements spaced from one another and having an elongate conformation according to a respective prevalent development direction, a plurality of second elements spaced from one another which develop substantially in a transversal direction to the first elements, the second elements also having an elongate conformation according to a respective prevalent development direction; the net structure exhibits a length, measured in a direction of the first elements, having a greater extension than the width measured in the direction of the second elements.

In a 102nd aspect according to aspect 101, the second elements, following formation of the net structure, are stretched along the prevalent development direction thereof, giving the net structure a width in the direction of the second elements that is greater than 1.2 meters.

In a 103rd aspect according to aspect 101 or 102, the second elements, following formation of the net structure, are stretched along the prevalent development direction thereof, giving the net structure a width in the direction of the second elements that is greater than 3 meters.

In a 104th aspect according to aspect 101 or 103, the second elements, following formation of the net structure, are stretched along the prevalent development direction thereof, giving the net structure a width in the direction of the second elements that is greater than 5 meters.

In a 105th aspect according to any one of aspects from 101 to 104, the second elements exhibit a length of greater than 2 meters.

In a 106th aspect according to any one of aspects from 101 to 105, the second elements exhibit a length of greater than 3 meters.

In a 107th aspect according to any one of aspects from 101 to 106, the second elements exhibit a length of greater than 5 meters.

In a 108th aspect according to any one of aspects from 101 to 107, the second elements exhibit a length of greater than 10 meters.

In a 109th aspect according to any one of aspects from 101 to 108, the first elements are twice as long as the second elements.

In a 110th aspect according to any one of aspects from 101 to 109, the first elements are ten times as long as the second elements.

In a 111th aspect according to any one of aspects from 101 to 110, the net structure is arranged in a three-dimensional configuration and exhibits, in a transversal view to the first elements, a shape having:
  a flat configuration having, in a transversal view to the first elements, a substantially straight profile, or
  a three-dimensional configuration having, in a transversal view to the first elements, a central part with a substantially straight profile and longitudinal edges that are undulating or folded with respect to the central part, or
  a three-dimensional configuration having, in a transversal view to the first elements, a closed loop form in which opposite longitudinal flaps arranged at respect transversal ends of the net structure define a superposing zone comprising a plurality of slots that are substantially aligned in a direction of the first elements to form a coupling zone in which a blocking element inserts, the blocking element comprising at least a rod crossing the passage openings of the slots.

In a 112th aspect according to the 111th aspect, the shape comprises a first and a second tract, substantially straight and optionally substantially parallel to one another, connected by at least an intermediate tract transversal to the first and the second tract.

In a 113th aspect according to any one of aspects from 101 to 112, the second elements are configured such as to flex freely according to at least an axis that is transversal to the second elements.

In a 114th aspect according to the 113th aspect, the transversal aspect is substantially transversal to the second elements and substantially parallel to the first elements.

In a 115th aspect according to any one of aspects from 101 to 114, the first elements and the second elements are substantially perpendicular to one another.

In a 116th aspect according to any one of aspects from 101 to 115, the second elements exhibit molecular structures orientated along the development of the second elements.

In a 117th element aspect to the 116th aspect the second elements are obtained by extrusion and subsequent stretching along the prevalent development direction thereof.

In a 118th aspect according to any one of aspects from 102 to 117, the second elements exhibit a stretching ratio defined as a ratio between a final length of the second elements once the stretching has been carried out and an initial length of the second elements before a stretching action thereon, that is greater than 3.

In a 119th aspect according to any one of aspects from 102 to 118, the second elements exhibit a stretching ratio defined as a ratio between a final length of the second elements once the stretching has been carried out and an initial length of the second elements before a stretching action thereon, that is comprised between 3 and 8.

In a 120th aspect according to any one of aspects from 102 to 119, the second elements exhibit a stretching ratio defined as a ratio between a final length of the second elements once the stretching has been carried out and an initial length of the second elements before a stretching action thereon, that is comprised between 4 and 7.

In a 121st aspect according to any one of aspects from 102 to 120, the first elements exhibit a stretching ratio defined as a ratio between a final length of the first elements once the stretching has been carried out and an initial length of the first elements before a stretching action thereon, that is less that the stretching ratio of the second elements, in particular comprised between 1 and 1.5.

In a 122nd aspect according to any one of aspects from 102 to 121, the first elements exhibit a stretching ratio defined as a ratio between a final length of the first elements once the stretching has been carried out and an initial length of the first elements before a stretching action thereon, that is comprised between 1 and 1.5.

In a 123rd aspect according to any one of aspects from 102 to 122, the first elements are either not stretched or exhibit a lower stretching ratio, optionally at least half, with respect to the stretching ratio of the second elements, the stretching ratio of an element being defined as a ratio between a final length of the element once the stretching has been performed and the initial length of the element before the stretching action.

In a 124th aspect according to any one of aspects from 112 to 123, the tracts of the second elements arranged at the intermediate portion are arranged transversally to tracts of the second elements arranged at the straight tracts.

In a 125th aspect according to any one of aspects from 101 to 124 the first elements and the second elements intersect at nodes to form links, at least the second elements exhibiting portions extending between consecutive nodes, each of the portions having terminal zones of a width, measured parallel to the first elements, that progressively decrease starting from a node in a direction of a median line of the portions and a central zone having a substantially constant width along the respective development.

In a 126th aspect according to any one of aspects from 101 to 125, the first elements and the second elements exhibit a full transversal section.

In a 127th aspect according to any one of aspects from 101 to 126, the transversal section of the first elements is greater by at least 5 times with respect to the transversal section of the second elements.

In a 128th aspect according to any one of aspects from 101 to 127, the first elements exhibit a transversal section having an area of greater than 20 mm$^2$.

In a 129th aspect according to any one of aspects from 101 to 128, the first elements exhibit a transversal section having an area of greater than 30 mm$^2$.

In a 130th aspect according to any one of aspects from 101 to 129, the second elements exhibit a transversal section having an area of greater than 3 mm$^2$.

In a 131st aspect according to any one of aspects from 101 to 130, the second elements exhibit a transversal section having an area of greater than 4 mm$^2$.

In a 132nd aspect according to any one of aspects from 101 to 131, the net structure exhibits a specific weight of greater than 200 g per m$^2$, optional between 200 and 1200 g per m$^2$.

In a 133rd aspect according to any one of aspects from 101 to 132, the net structure exhibits a specific weight comprised between 200 and 1200 g per m$^2$.

In a 134th aspect according to any one of aspects from 101 to 133, the net structure exhibits a specific resistance to traction, along the second elements, greater than 20 KN/m, the specific resistance to traction being measured with the method set down in the detailed description that follows.

In a 135th aspect according to any one of aspects from 101 to 134, the net structure exhibits a specific resistance to traction, along the second elements, comprised between 20 and 200 KN/m, the specific resistance to traction being measured with the method set down in the detailed description that follows.

In a 136th aspect according to any one of aspects from 101 to 135, the net structure exhibits a specific resistance to traction, along the second elements, comprised between 60 and 200 KN/m, the specific resistance to traction being measured with the method set down in the detailed description that follows.

A 137th aspect comprises a process for realizing a reinforcing element according to any one of aspects from 101 to 136, comprising steps of: continuously forming a semi-finished workpiece having a net structure and developing continuously in an advancement direction, for elements of the net structure being parallel to the advancement direction, stretching the semi-finished workpiece transversally to the advancement direction such as to form the second stretched elements, rolling the net structure on itself according to a rolling axis that is transversal of the first elements.

In a 138th aspect according to aspect 137, the first elements and the second elements are formed either starting from a perforated sheet made of a plastic material form in a laminating or calendering station, or are formed continuously by hot co-extrusion in an extrusion station.

In a 139th aspect according to aspect 138, the outlet direction of the net structure from the laminating or calendering station or, respectively, from the extrusion station, is parallel to the prevalent development direction of the first elements.

In a 140th aspect according to any one of aspects from 137 to 139, the net structure, optionally brought to a stretching temperature of at least 80° C., is stretched in the direction of the second elements and elongated at least by 300%.

In a 141st aspect according to any one of aspects from 137 to 140, the net structure, optionally brought to a stretching temperature of at least 80° C., is stretched in the direction of the second elements and elongated at least by 500%.

In a 142nd aspect, a process is comprised for realizing a geotechnical consolidating and/or reinforcing structure, for example for containing and/or reinforcing of fronts, slopes, embankments, green walls, natural or artificial walls, block walls, the structure being frontally delimited by a face, the process comprising following steps: arranging at least a reinforcing element according to one of aspects from 101 to 136 at a surface portion of the structure under formation, wherein the reinforcing element exhibits the first elements arranged parallel to the horizontal extension direction of the face and the second elements arranged transversally with respect to the horizontal extension direction of the face, constraining at least a longitudinal edge of the reinforcing element defined by one of the first elements at or in proximity of the face.

In a 143rd aspect according to the 142nd aspect the process comprises folding at least a frontal portion of the reinforcing element such that in a transversal view to the first elements, the element exhibits a profile having at least two tracts, optionally substantially straight, which are oriented transversally to one another; and spreading filler material such as to cover the reinforcing element.

In a 144th aspect according to aspect 143, during the step of folding the first elements are maintained parallel to one another and substantially horizontal and wherein the second elements are arranged in such a way that the profile exhibits an open profile and/or at least a tract orientated transversally to the surface of the face.

In a 145th aspect according to aspect 142, the geotechnical structure is an artificial relief, in which the reinforcing element exhibits a flat structure, and in which a longitudinal edge of each reinforcing element engages a hole predisposed on the upper face of blocks defining the frontal wall or walls of the wall.

In a 146th aspect according to aspects 142 and 145 the geotechnical structure is an artificial relief in which the reinforcing element exhibits a flat structure, and in which both opposite longitudinal edges engage respective holes predisposed on the blocks, opposite one another, that form faces, also opposite one another.

In a 147th aspect according to any one of aspects from 142 to 146, a plurality of reinforcing elements are positioned in partial or total superposing relation.

In a 148th aspect according to any one of aspects from 142 to 147, the process comprises at least two reinforcing elements flanked along a parallel direction to the horizontal extension direction of the face.

In a 149th aspect according to the preceding aspect the reinforcing elements are connected by blocking elements which constrain longitudinally flanked edges of adjacent reinforcing elements.

In a 150th aspect according to any one of aspects from 142 to 149, the reinforcing element before depositing is conformed in a roll with a winding axis transversal to the development direction of the first elements and wherein the step of arranging comprises unrolling the roll along the development direction of the first elements and parallel to the horizontal extension direction of the face.

In a 151st aspect, according to any one of aspects from 142 to 150, the process comprises a step of positioning formworks, for example made of a metal mesh, for guiding the fold of the reinforcing element on a respective layer of filler material at the face, optionally in which the formworks are successively arranged along the development of the first elements and connected to one another by joining elements.

In a 152nd aspect, a reinforcing and/or containing geotechnical structure realized with the process of any one of aspects from 142 and 151 is comprised, the geotechnical structure comprising: a front face, a plurality of reinforcing layers; each of the layers having: terrain and/or filler material and/or concrete blocks, and at least a reinforcing element according to one of the preceding claims, wherein the reinforcing element is inserted in the layers and exhibits the first elements arranged parallel to the horizontal extension direction of the face and the second elements arranged transversally with respect to the horizontal extension direction of the face.

In a 153rd aspect, a reinforcing element for geotechnical applications is comprised, including a monolithic net structure made of a plastic material having: a plurality of the first elements spaced from one another and having an elongate conformation according to a respective prevalent development direction, a plurality of second elements spaced from one another which develop substantially in a transversal direction to the first elements, the second elements also having an elongate conformation according to a respective prevalent development direction; the net structure exhibits a length, measured in a direction of the first elements, having a greater extension than the width measured in the direction of the second elements.

In a 154th aspect according to the 151st aspect, the second elements, following formation of the net structure, are stretched along the prevalent development direction thereof, giving the net structure a width in a direction of the second elements which is greater than 2 meters.

In a 155th aspect according to aspect 153 or 154, the second elements, following formation of the net structure, are stretched along the prevalent development direction thereof, giving the net structure a width in a direction of the second elements that is greater than 3 meters.

In a 156th aspect according to any one of aspects from 153 to 155, the second elements, following formation of the net structure, are stretched along the prevalent development direction thereof, giving the net structure a width in the direction of the second elements that is greater than 5 meters.

In a 157th aspect according to any one of aspects from 153 to 156, the reinforcing element exhibits a length in a direction of the first elements that is greater than 10 m.

In a 158th aspect according to any one of aspects from 153 to 157, the first elements are twice as long as the second elements.

In a 159th aspect according to any one of aspects from 153 to 158, the first elements are ten times as long as the second elements.

In a 160th aspect according to any one of aspects from 153 to 159, the net structure exhibits: either a flat configuration having, in a transversal view to the first elements, a substantially straight profile or a three-dimensional configuration having, in a transversal view to the first elements, a central part with a substantially straight profile and undulating longitudinal borders.

In a 161st aspect according to any one of aspects from 153 to 160, the second elements are configured such as to flex freely according to at least an axis that is transversal to the second elements.

In a 162nd aspect according to the 161st aspect, the transversal axis to the second elements is substantially parallel to the first elements.

In a 163rd aspect according to aspects 161 or 162, the transversal axis is substantially transversal to the second elements and substantially parallel to the first elements.

In a 164th aspect according to the 161st or 162nd or 163rd aspect, the first and the second elements are substantially perpendicular to one another.

In a 165th aspect according to any one of aspects from 153 to 164, the second elements exhibit molecular structures orientated along the development of the second elements.

In a 166th aspect according to any one of aspects from 153 to 165, the second elements are obtained by coextrusion with the first elements or sheet formation, and by a following stretching along the prevalent development direction thereof.

In a 167th aspect according to any one of aspects from 153 to 166, the second elements exhibit a stretching ratio defined as a ratio between a final length of the second elements once the stretching has been carried out and an initial length of the second elements before a stretching action thereon, that is greater than 3.

In a 168th aspect according to any one of aspects from 154 to 167, the second elements exhibit a stretching ratio defined as a ratio between a final length of the second elements once the stretching has been carried out and an initial length of the second elements before a stretching action thereon, that is comprised between 3 and 8.

In a 169th aspect according to any one of aspects from 154 to 168, the second elements exhibit a stretching ratio defined as a ratio between a final length of the second elements once the stretching has been carried out and an initial length of the second elements before a stretching action thereon, that is comprised between 4 and 7.

In a 170th aspect according to any one of aspects from 153 to 169, the first elements exhibit a stretching ratio defined as a ratio between a final length of the first elements once the stretching has been carried out and an initial length of the first elements before a stretching action thereon, that is smaller than the stretching ratio of the second elements.

In a 171st aspect according to any one of aspects from 153 to 170, the first elements exhibit a stretching ratio defined as a ratio between a final length of the first elements once the stretching has been carried out and an initial length of the first elements before a stretching action thereon, that is comprised between 1 and 1.5.

In a 172nd aspect according to any one of aspects from 153 to 171, the first elements do not exhibit a stretching following formation thereof.

In a 173rd aspect according to any one of aspects from 153 to 172, the first elements and the second elements intersect at nodes to form links, at least the second elements exhibiting portions extending between consecutive nodes, each of the portions having terminal zones of a width, measured parallel to the first elements, that progressively decrease starting from a node in a direction of a median line of the portions and a central zone having a substantially constant width along the respective development.

In a 174th aspect according to any one of the aspects from 153 to 173, the first elements and the second elements exhibit a full transversal section.

In a 175th aspect according to the 174th aspect, the transversal section of the first elements is greater by at least 5 times with respect to the transversal section of the second elements.

In a 176th aspect according to any one of the aspects from 153 to 175, the first elements exhibit a transversal section having an area of greater than 20 mm$^2$.

In a 177th aspect according to any one of the aspects from 153 to 176, the first elements exhibit a transversal section having an area of greater than 30 mm$^2$.

In a 178th aspect according to any one of the aspects from 153 to 177, the second elements exhibit a transversal section having an area of greater than 3 mm$^2$.

In a 179th aspect according to any one of the aspects from 153 to 178, the second elements exhibit a transversal section having an area of greater than 4 mm$^2$.

In a 180th aspect according to any one of the aspects from 153 to 179, the net structure exhibits a specific resistance to traction, along the second elements, greater than 20 KN/m, the specific resistance to traction being measured with the method set down in the detailed description that follows.

In a 181st aspect according to any one of the aspects from 153 to 180, the net structure exhibits a specific resistance to traction, along the second elements, comprised between 20 KN/m and 200 KN/m, the specific resistance to traction being measured with the method set down in the detailed description that follows.

In a 182nd aspect according to any one of aspects from 153 to 181, the net structure exhibits a specific resistance to traction, along the second elements, comprised between 60 and 200 KN/m, the specific resistance to traction being measured with the method set down in the detailed description that follows.

In a 183rd aspect according to any one of aspects from 153 to 182, the net structure exhibits a specific weight of greater than 200 g per m$^2$.

In a 184th aspect according to any one of aspects from 153 to 183, the net structure exhibits a specific weight comprised between 200 and 1200 g per m$^2$.

In a 185th aspect, a process is comprised for realizing a reinforcing element according to any one of aspects from 153 to 184, comprising steps of: continuously forming a semi-finished workpiece having a net structure that develops continuously in an advancing direction, first elements of the net structure being parallel to the advancing direction, stretching the workpiece transversally to the advancing direction such as to form the second stretched elements, cutting the net structure transversally to the first elements, arranging the net structure in a working condition in which the net structure forms the seating.

In a 186th aspect according to the 185th aspect, the first elements and the second elements are formed either starting from a perforated sheet made of a plastic material form in a laminating or calendering station, or are formed continuously by hot co-extrusion in an extrusion station.

In a 187th aspect according to the 186th aspect, the outlet direction of the net structure from the laminating or calendering station or, respectively, from the extrusion station, is parallel to the prevalent development direction of the first elements.

In a 188th aspect according to any one of aspects from 185 to 187, the second elements, optionally brought to a temperature of 80° C. or higher, are stretched and elongated by at least 300%.

In a 189th aspect according to any one of aspects from 185 to 187, the first elements are not stretched following formation thereof.

A 190th aspect relates to a forming and consolidating process of a road bedding or a railway bedding extending according to a prevalent development direction, the process comprises steps of: arranging at least a reinforcing element according to one of aspects from 153 to 184 with the first elements orientated parallel to the prevalent development direction of the road bed or the railway bedding to be realized, applying filler material on the reinforcing element such as to define a reinforced bedding of the reinforcing element, depositing a road surface covering or positioning railway tracks superiorly of the bedding.

In a 191st aspect according to the 190th aspect the reinforcing element before depositing is conformed in a roll with a winding axis that is transversal to the development direction of the first elements.

In a 192nd aspect according to aspects 190 and 191, the step of arranging comprises unrolling the roll along the development direction of the first elements and parallel to the prevalent development direction of the road bed or the railway bedding to be realized.

In a 193rd aspect according to aspects 191 or 192, the process comprises arranging at least two reinforcing elements flanked in a transversal direction to the prevalent development direction of the road bed or the railway bedding to be realized.

In a 194th aspect according to aspects from 190 to 193, the reinforcing elements are connected by blocking elements which constrain longitudinally flanked edge of adjacent reinforcing elements.

In a 195th aspect according to any one of aspects from 190 to 194, the reinforcing element or elements connected along the longitudinal edges are arranged in the bedding with a transversal profile defined by the second elements configured in a closed loop, in which opposite longitudinal flaps arranged at respective transversal ends of the net structure define a superposing zone comprising a plurality of slots that are substantially aligned in a direction of the first elements such as to form a coupling zone and in which at least a rod is inserted in the passage openings of the slots.

In a 196th aspect according to one of aspects from 190 to 194, the reinforcing element or elements connected along longitudinal edges are arranged in the bedding in one of the following ways:
  either with a transversal profile having a flat configuration that, in a transversal view to the first elements, evidences a substantially straight profile, blocking pegs being arranged along the free longitudinal edges of the reinforcing element or elements,
  or with a transversal profile having a three-dimensional configuration having, in a transversal view to the first elements, a central part having a substantially straight profile and undulated or folded longitudinal edges with respect to the central part such as to define blocking trenches where material of the bedding can be inserted.

A 197th aspect comprises a road bed or a railway bedding obtained with the process of aspects from 190 to 196.

In a 198th aspect the reinforcing element described herein above in according with any one of the preceding aspects can comprise a laminar confining element joined (using heat or glue) on a side of the reinforcing element itself; for example the confining element comprises a plastic or textile net, or a non-woven textile material, having through-openings that are significantly smaller with respect to those of the net structure.

A 199th aspect relates to a series comprising two or more reinforcing elements according to any one of the preceding aspects, transversally flanked and arranged longitudinally according to a parallel direction to the direction of the first elements, in which the reinforcing elements are connected by one or more blocking elements (such as elements with slots and a rod described in the detailed description that follows) which constrain longitudinally flanked edges in the detailed description that follows) which constrain longitudinally flanked edge of adjacent reinforcing elements.

BRIEF DESCRIPTION OF THE DRAWINGS

Some embodiments and some aspects of the invention will be described in the following with reference to the accompanying drawings, provided purely by way of non-limiting example, in which:

FIG. 2A shows a production line of the product of FIG. 1, according to an aspect of the invention;

FIGS. 2C-2E schematically show a step of folding second fold lines parallel to the first longitudinal elements: the three figures show the alternative folding mode;

FIG. 17 is a lateral view of FIG. 16;

FIG. 18A shows a lateral view of a step following the step of FIG. 17;

FIGS. 22, 23 and 23A are schematic views in cross section of a roadway in which a reinforcing element of variants of the invention is inserted;

FIG. 27 is a schematic cross-section of a relief in which a reinforcing element according to a variant of the invention is inserted.

DETAILED DESCRIPTION

Product in Roll Form and Reinforcing Element

The rolled product and the reinforcing element described herein below relate to all applications that follow in the present description and, for that reason the description of the elements will not be repeated.

Figure 1:
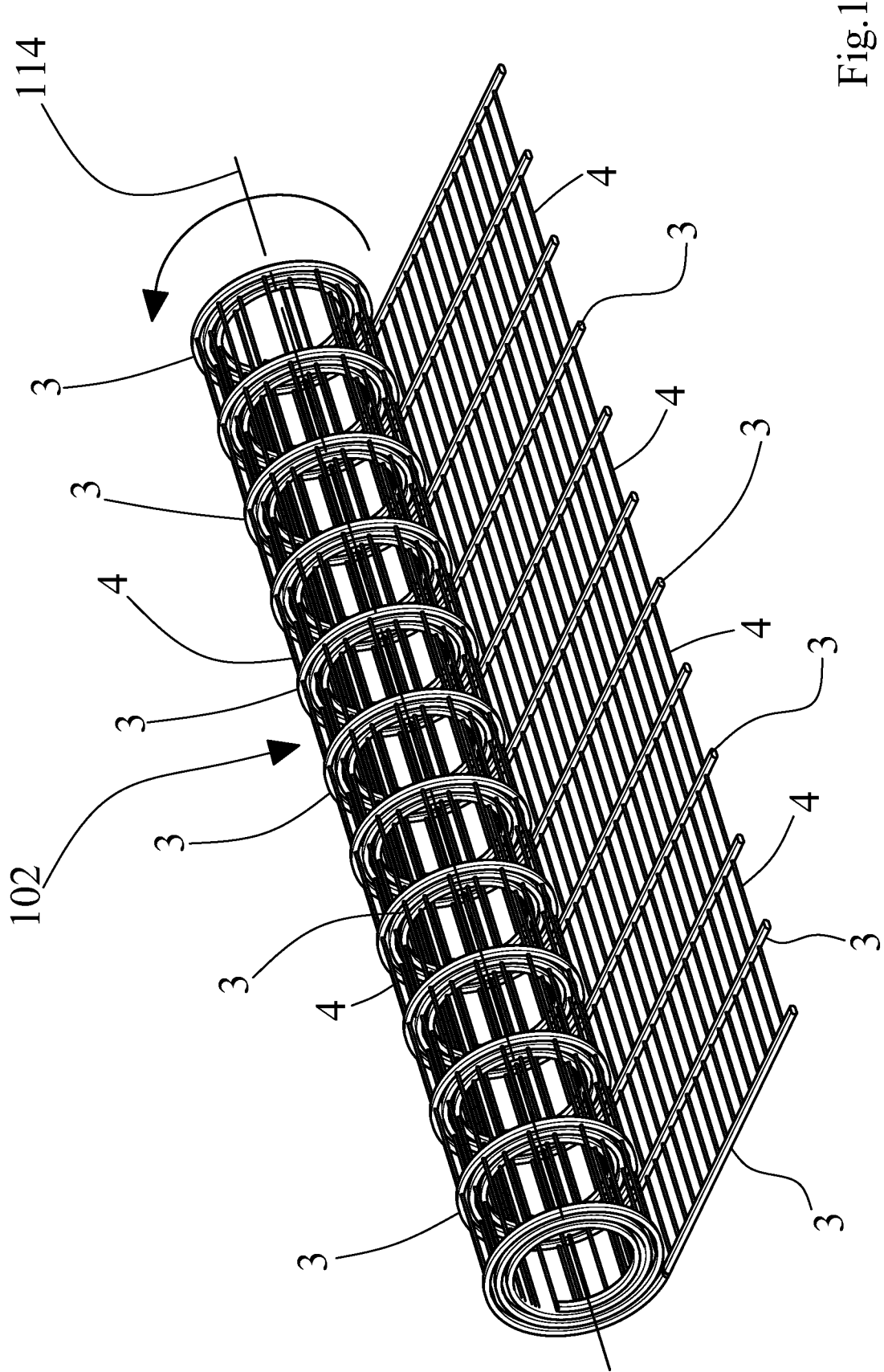
FIG. 1 is a perspective view of a product in roll form according to aspects of the invention; the product is shown partially unrolled along the direction of the first elements to highlight the meshes of the grid.

FIG. 1 denotes a product in roll form 102, partially unwound, to be used in geotechnical applications. The product 102 comprises an integral mesh 2 (i.e. a monolithic net obtained in one piece and not the result of connections by gluing or weaving of various elongate elements) made of plastic material comprising a series of first elements, or bars, 3 placed longitudinally and parallel to one another; the first elements or bars 3 are spaced apart and interconnected by a plurality of second transversal elements 4; for example, they are also parallel to one another and stretched in the width direction of the roll.

In the present description, it is understood that each of the first elements extends over the entire length of the net structure formed by the plurality of portions aligned along a same longitudinal line of the net structure. Similarly, each of the second elements extending in the width direction of the net structure is formed by the plurality of portions aligned along a same transversal line to the net structure 2: in this way each of the first elements is intersected by a plurality of second elements, and each of the second elements is intersected by a plurality of first elements.

Figure 1A:
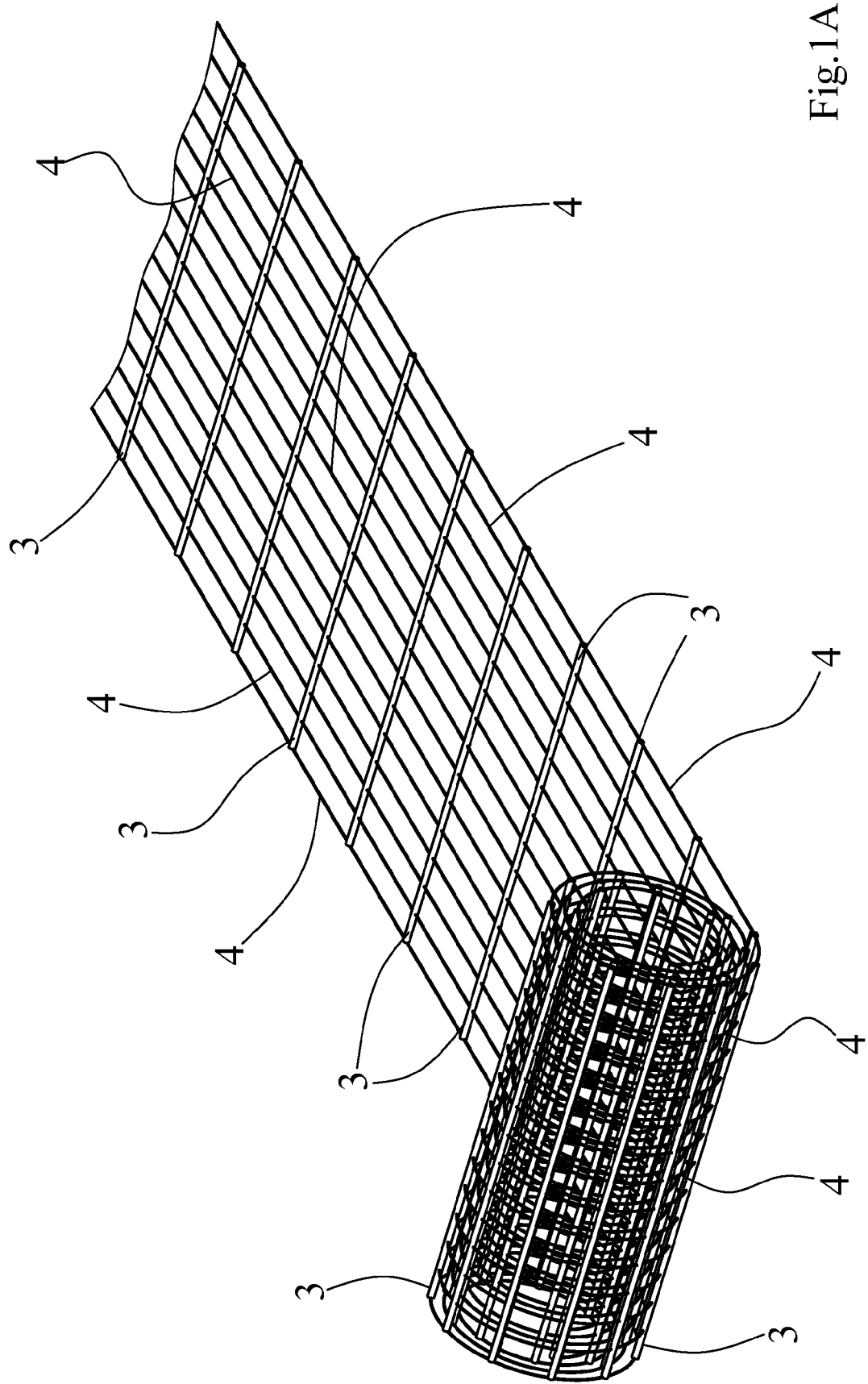
FIG. 1A is a perspective view of a traditional product in roll form.

Depending on the degree of stretching, the second elements exhibit a more or less slim structure, which can also assume a filiform structure; in any case, the second elements have a transversal section that at a midpoint between two consecutive bars is substantially slimmer than the section of the bars. The product is wound along the first elements or bars 3 and about an axis 114 transversal to the bars themselves and for example parallel to the second elements 4, as shown in FIG. 1: in practice, the bars 3, which because of their section exhibit a greater resistance to folding than the second elements 4, are however wound a spiral trajectory. This is totally opposite with respect to traditional practice (FIG. 1A).

Going into further detail, the first elements or bars 3 exhibit a substantially unstretched structure (or at most slightly stretched) and a thickness (and a cross section) that is constantly greater than the thickness (and the cross section) of the second elements or wires 4. In this way, the first elements or bars 3 are more resistant to compression and capable of greater friction with the terrain than the second elements 4. The second elements 4, for example in the form of transversal wires, are connected to the bars and have a structure that is substantially stretched along the development thereof such as to give a greater tensile strength per unit area with respect to the bars.

Figure 3A:
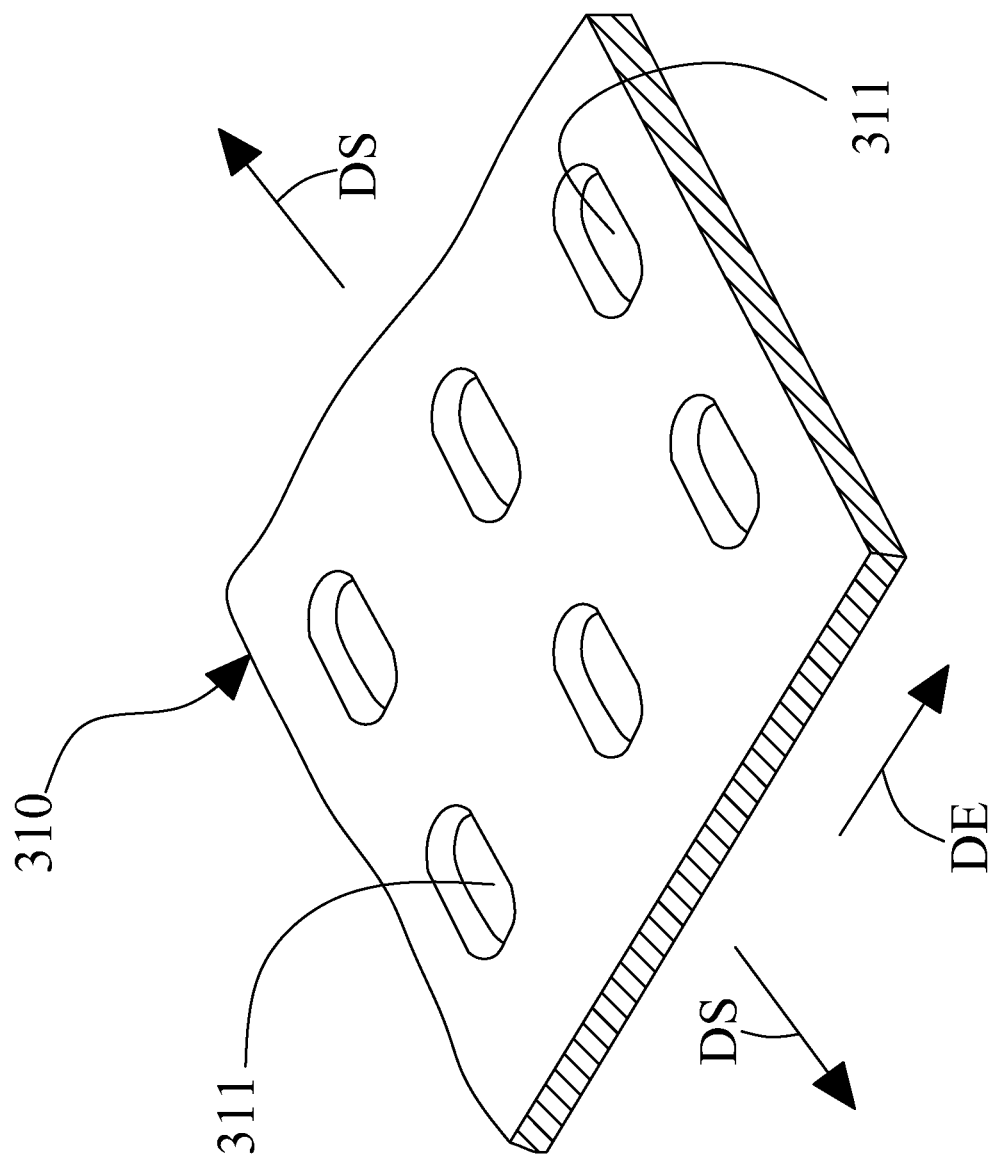
FIGS. 3A and 3B illustrate a semi-reticular structure used for the realization of a reinforcing element, for example by transversal stretching as shown in FIG. 2B.
Figure 3B:
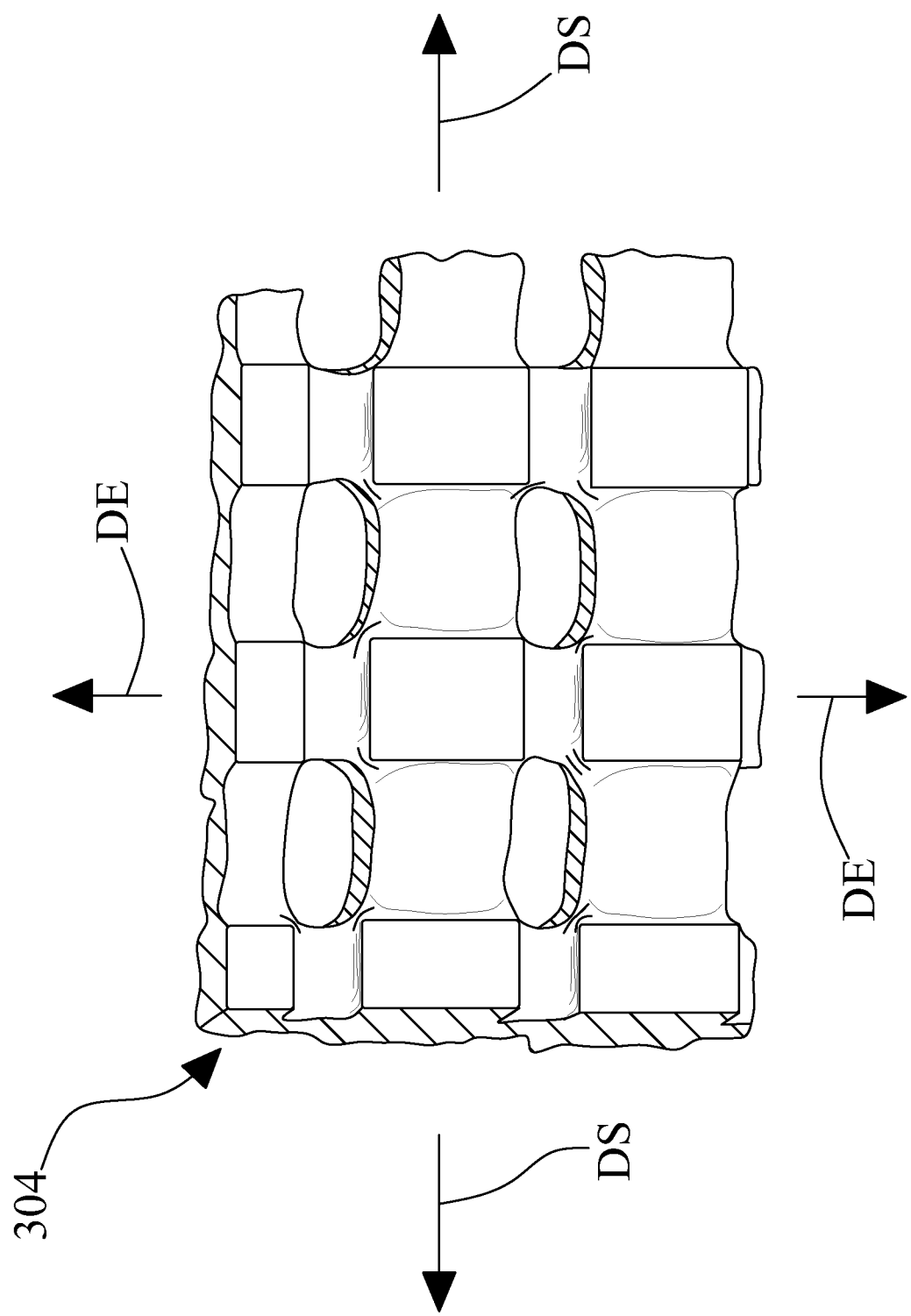

FIGS. 3A and 3B illustrate a respective semi-finished workpiece of a net structure used for the production of a rolled product 102. FIG. 3A shows the case of a semi-finished workpiece obtained from an extruded sheet (calendered or laminated or printed) and then perforated (with through-holes or not), while FIG. 3B shows the case of a semi-finished workpiece obtained by extrusion of precursors of the first elements and contemporary forming of precursors of the second elements located transversally to the precursors of the first elements. As can be seen, in the first case a semi-finished workpiece is produced that has a constant thickness, apart obviously from the perforated zones, while in the second case the workpiece has a variably-extending thickness. By transversally stretching the precursors of the second elements 4 and winding the product thus obtained about a transversal axis to the first elements 3, the roller product 102 is obtained, as will be more fully explained in the following.

Figure 4:
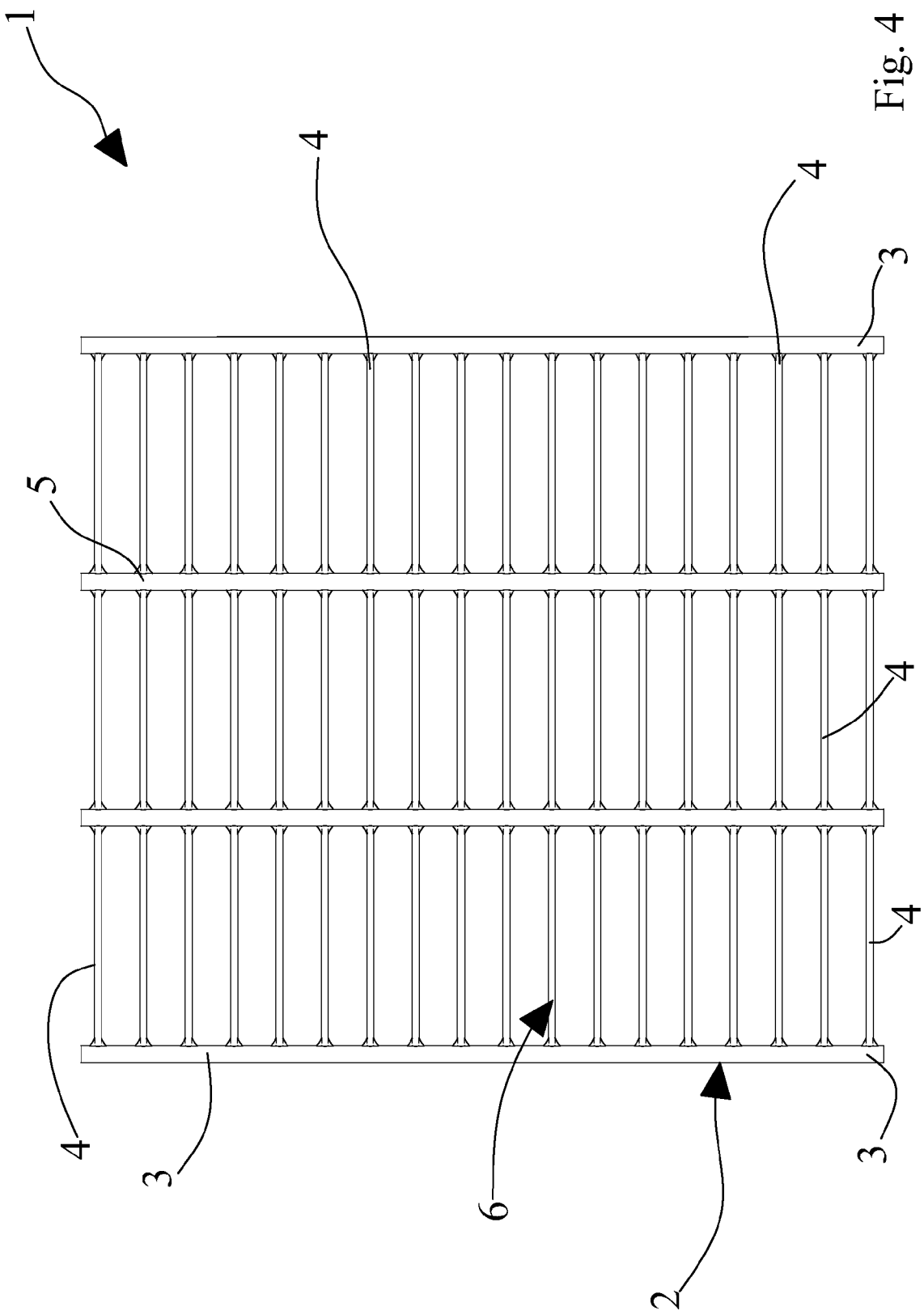
FIG. 4 is a plan view of a single-stretched reinforcing element obtainable from the semi-finished product shown in FIG. 3A or 3B.

FIG. 4 is a view from above of a single-stretched reinforcing element 1 obtainable by the unrolling of the product roll 102, which in turn is formed from the semifinished workpiece shown in FIG. 3A or from semi-finished workpiece of FIG. 3B: the first elements or bars 3 are generated continuously by the flow extrusion or by the continuous longitudinal configuration of the perforated sheet and have a length that is equal to the length of the roll and in any case greater than the overall length of the second transversal elements 4, or the width of the roll. The distance between bars or adjacent first elements can be controlled by varying the transversal stretching ratios.

The distance between adjacent second elements can be varied by modulating, depending on whether it starts from one or other of the semi-finished workpieces of FIGS. 3A, 3B, the striking frequencies during punching of the plate or the application pitch of the precursors of second elements during the coextrusion process. This allows for a greater or lesser number of first and/or second elements 3, 4 and enables varying the thickness thereof, depending on the transversal stretching applied to the second elements 4 and the pitch between the first elements 3.

By applying opposing stretching forces of equal intensity the bars can be spaced evenly and are parallel and aligned, i.e. without bends or angles that would compromise correct use thereof. As already mentioned, FIG. 4 shows a reinforcing element 1 obtainable by unrolling and placing the unrolled article 102 flat. Consequently, the reinforcing element 1 comprises a monolithic net structure 2 made of plastic material having a plurality of the first elements 3 spaced apart and a plurality of the second elements 4 also spaced and transversally arranged with respect to the first elements; the elements 3 and 4 can be made of plastic materials selected according to their physical and mechanical characteristics, e.g. the elements 3 and 4 can be made from HDPE or polypropylene or still other polymers.

In FIG. 4, the first elements 3 and the second elements 4 intersect at nodes 5 to form the meshes. Each of these first and second elements 3, 4 exhibits portions 6 which extend between consecutive nodes 5. Because of transversal stretching action, the portions 6 of the second elements have end regions of a progressively decreasing section (measured perpendicular to the prevalent development direction of the second elements—see FIGS. 5A and 5B) starting from a node in the direction of a centerline of the portions, and a central zone having a substantially constant section.

Figure 5A:
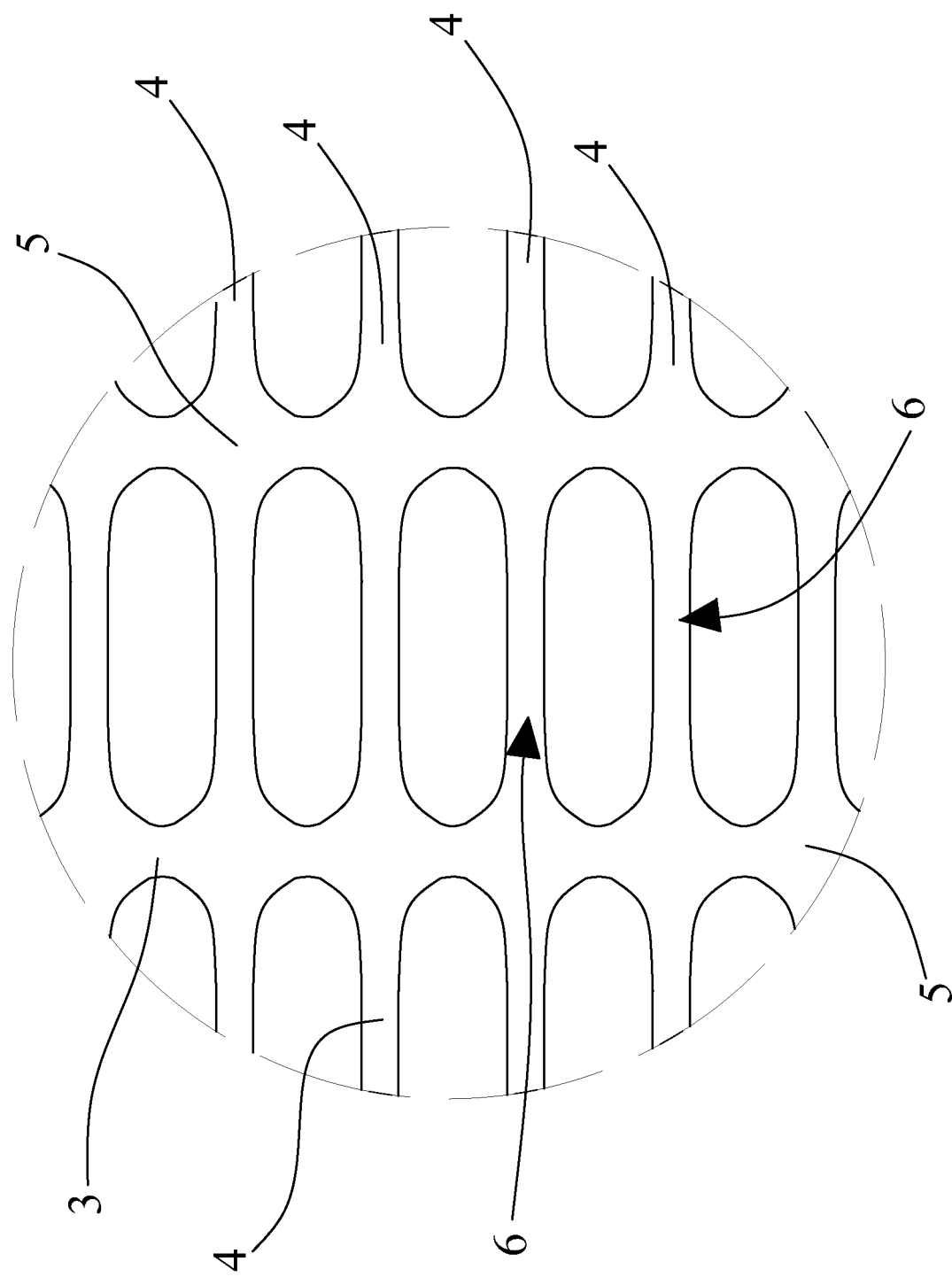
FIG. 5A shows an enlarged detail of the blank of FIG. 3A after the application of a transversal stretching action as shown in FIG. 2B.
Figure 5B:
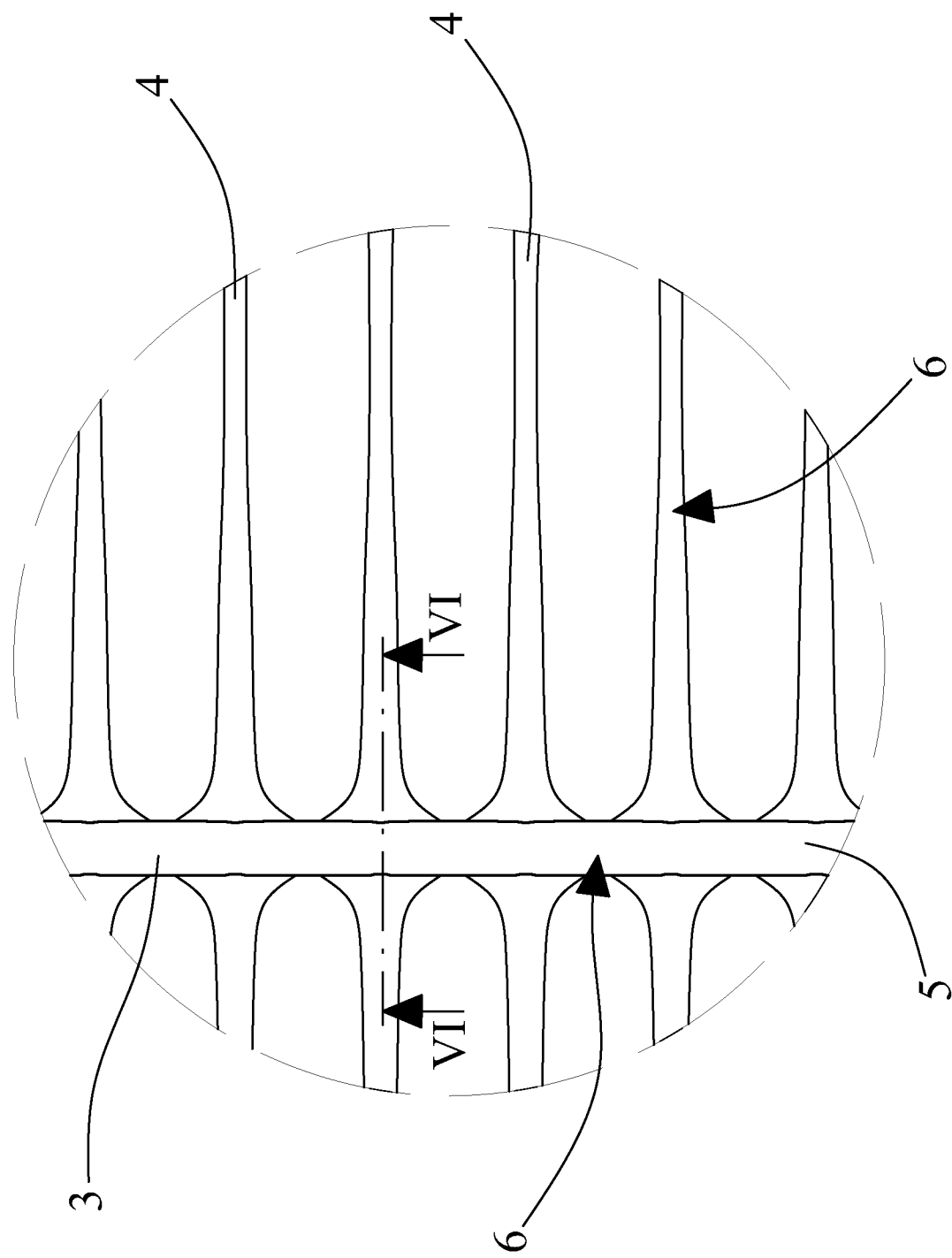
FIG. 5B shows an enlarged detail of the semi-finished workpiece of FIG. 3B after the application of a transversal stretching action as shown in FIG. 2B.
Figure 5C:
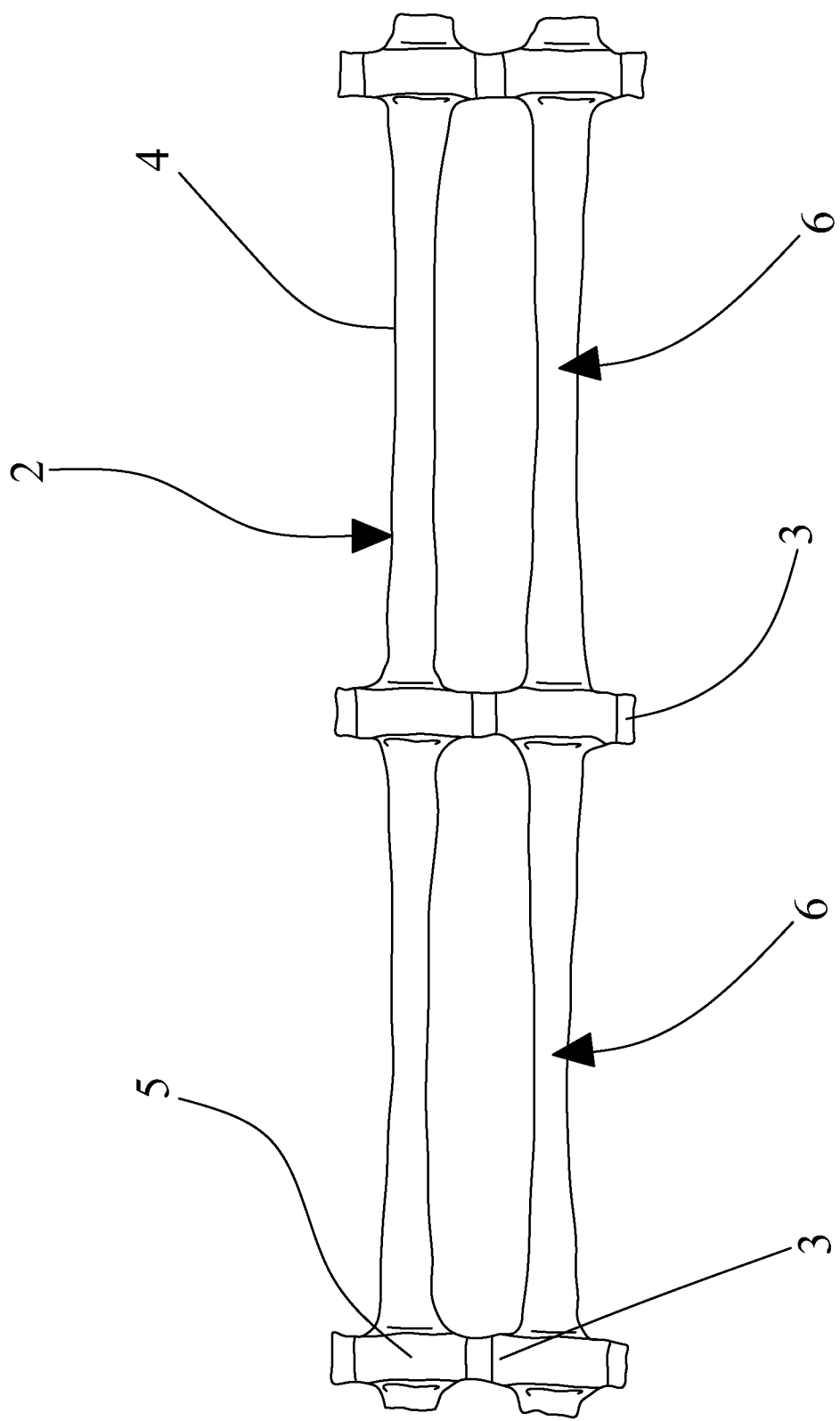
FIG. 5C is a view from above of a portion of the semi-finished workpiece of FIG. 3B subsequently to an action of transversal stretching as shown in FIG. 2B.

Depending on whether the net structure is derived from the blank of FIG. 3A (flat plate) or from that of FIG. 3B (strip having irregularities emerging from the prevalent development plane of the structure), the net structure respectively exhibits the conformation shown in FIG. 5A or the one shown in FIGS. 5B and 5C.

Quantitatively, the distance between two first adjacent elements 3 is between 100 mm and 400 mm, optionally between 200 mm and 300 mm. Similarly, the distance between adjacent second elements 4 is between 10 mm and 50 mm, optionally between 20 mm and 40 mm. By varying these distance the mesh size is also varied, and may exhibit an area comprised between 1000 and 20,000 mm2.

From the figures it can be noted that the second elements 4 are placed transversally, for example at right angles, with respect to the first elements. The first elements 3 are continuous longitudinal elements, with a length that is appreciably greater than the sum of the length of the portions 6 forming any second element 4: for example the first elements may be two and preferably five to one hundred times longer than the second elements.

Going into further detail the size of the elements that make up the net structure 2 can be defined. As can be seen from the accompanying figures, the first elements 3 are substantially not stretched (or at most slightly stretched, but always to a lesser degree than the degree of stretching of the second elements) and have significantly greater size and thickness than the second elements 4, which is a choice deriving from the fact of having to confer a certain rigidity to the reinforcing element 1 and a good anchoring ability. The second elements 4, being stretched and of markedly reduced section, instead ensure flexibility and excellent resistance to traction. In fact the first elements 3, according to a section that is transversal to the prevalent development direction thereof have an area of greater than 20 mm$^2$, optionally greater than 30 mm$^2$.

The second elements 4, according to a transversal section to the prevalent development direction thereof, have an area of greater than 3 mm$^2$, optionally greater than 4 mm$^2$. The thinning of the second elements is caused by the stretching process which leads to the reduction in the area of the cross section and the longitudinal elongation of the second elements. The stretching ratio or the ratio between the length of the second elements after the stretching and the length of the second elements before stretching is at least 3, optionally between 3 and 8, more optionally between 4 and 7. Note that it is possible to slightly stretch the first elements (such as a stretching resulting in a stretching ratio not exceeding 1.25), provided that the first elements retain the dimensions described above in terms of longitudinal extension and cross-section area.

The stretching of the elements can be controlled, since the process is able to arrange the molecular chains that form the second elements in an arrangement that is markedly oriented along the prevalent development direction of the second elements themselves. In case the first elements are lightly stretched, the molecular chains of said elements exhibit an orientation along the same first elements, but in a manner which is less pronounced compared to that of the second elements (at molecular chain level the molecular orientation is less pronounced in the first elements than in the second elements. As mentioned, the stretching process is performed along the development of the second elements 4 after the forming of the net conformed semi-finished workpiece of FIG. 3A or 3B. The stretching process gives the second elements 4 a greater tensile strength and better flexibility.

The thus-obtained reinforcing element, which as mentioned is made of a plastic material, has a specific weight of from 200 to 1200 g per m$^2$ and a specific resistance to traction, along the second elements, of greater than 20 KN/m, in particular between 20 and 200 KN/m, optionally between 60 and 200 KN/m. The specific resistance strength is measured by the method set down in the EN ISO 10319 standard.

For the sake of completeness, it should be noted that, irrespective of their possible stretching, the first elements 3 can also undergo a slight deformation, due to the passage between rollers and cohesion with the second elements 4, in particular at and in proximity of the nodes 5.

The examples illustrated in the figures show only a net structure 2 mono-stretched along the second elements 4. Although the net structure 2 has two prevalent development directions (i.e. the directions in which the first and second elements extend), the structure 2 also has a certain size, or thickness S, at right angles to these prevalent development directions (see FIG. 5A where the extension in a third dimension is particularly evident at the first elements) giving the element 1 a three-dimensional structure that is well-differentiated with respect to sheet materials. In particular, the maximum thickness "S" of the net structure is greater than 3 mm, for example 4 or 5 mm. The thickness "S" is defined by the maximum distance between opposite sides of the net structure. FIG. 5A illustrates the dimensional difference between the thickness of the first and second elements 3 and 4: the second elements 4 having undergone the process of stretching have a thickness "t" at an intermediate zone between two consecutive nodes 5 that is much smaller than the thickness S of the first elements 3.

The elongate shape of the second elements gives the reinforcing element excellent flexional capability, and in particular enables the structure 2 to flex freely according to at least a transversal axis substantially parallel to the first elements 3.

Figure 6:
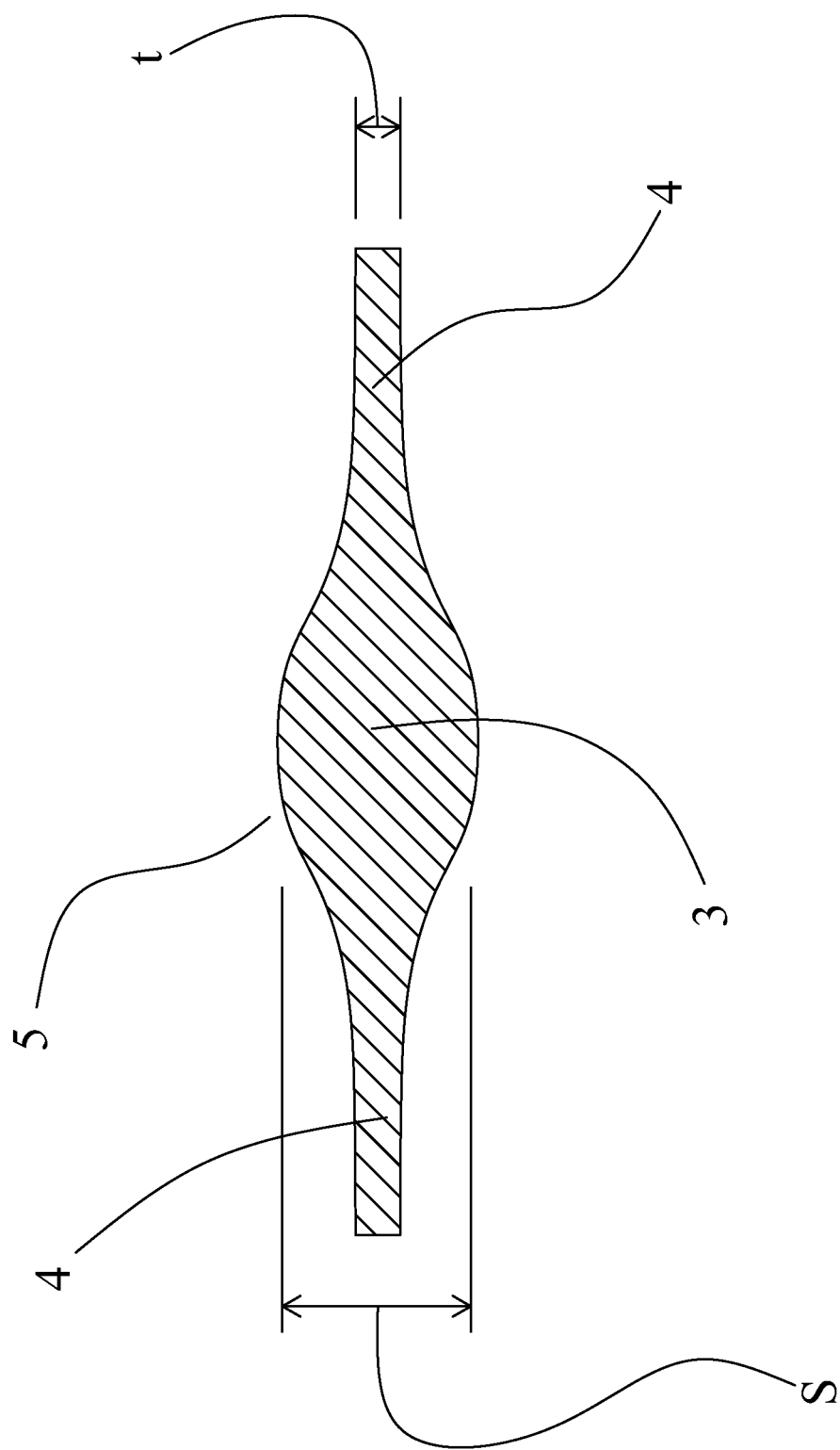
FIG. 6 shows a section along line VI-VI of FIG. 5B.
Figure 6A:
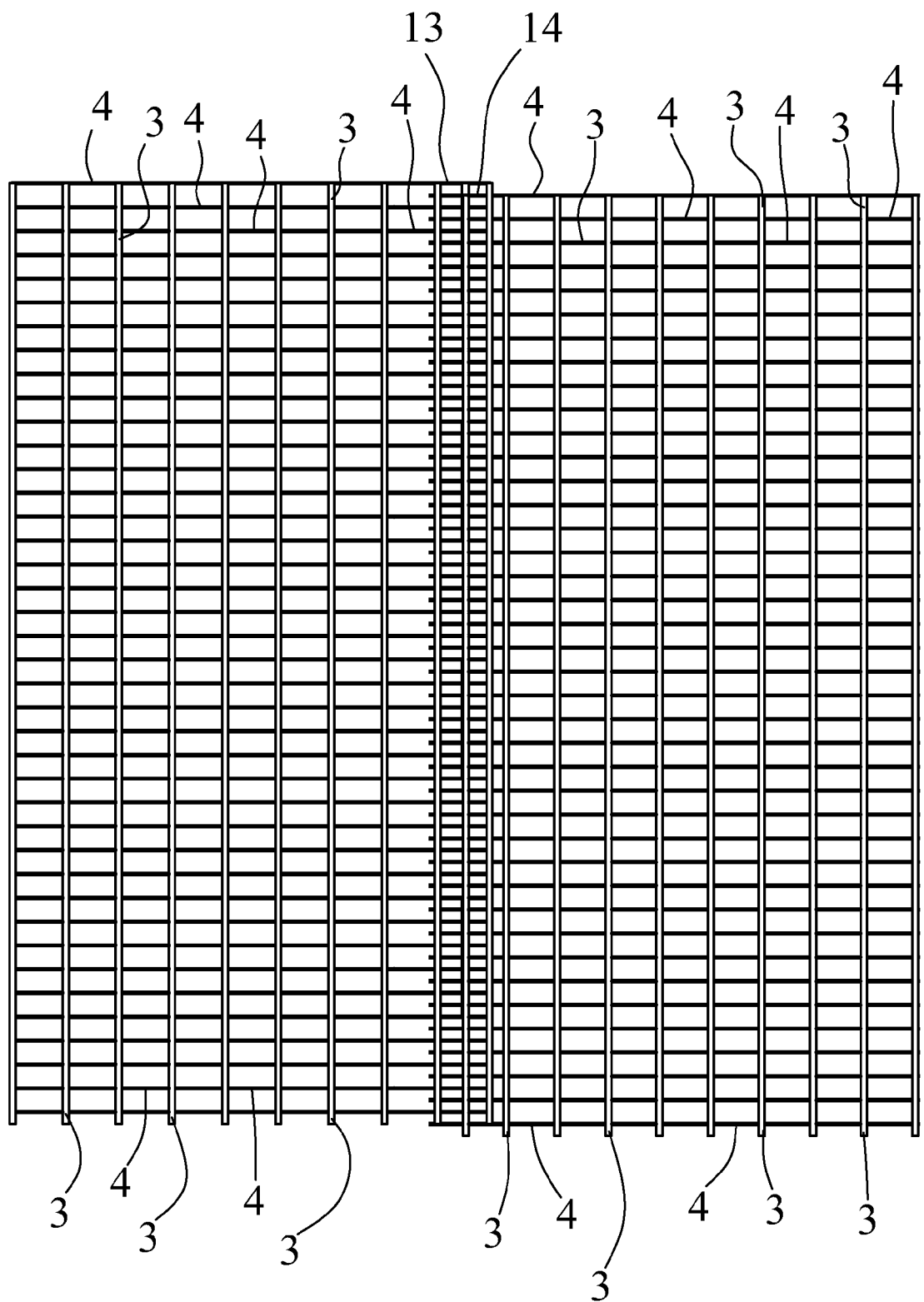
FIG. 6A is a perspective view of two reinforcing elements and connected to one another.

It should be specified that the reinforcing element can be used in series (see FIG. 6A) in which two or more elements are flanked along the longitudinal edges 13 and 14 and are arranged such as to define an overlap zone 19 which comprises a plurality of slots 20 which form passage openings 21 delimited by the segments 22 of the second elements 4 of mutually overlapping flaps 13 and 14. The slots 20 are aligned in a direction parallel to the first elements, forming a coupling area 23. A blocking element 18 is inserted through the slots such as to cooperate with portions of the second elements of the two overlapping flaps 13 and 14. In practice, the blocking element may comprise a cylindrical body or bar, as shown in FIG. 6C.

Furthermore, two or more blocking elements can be provided, consecutive to one another along the longitudinal development of the reinforcing element 1.

Figure 6B:
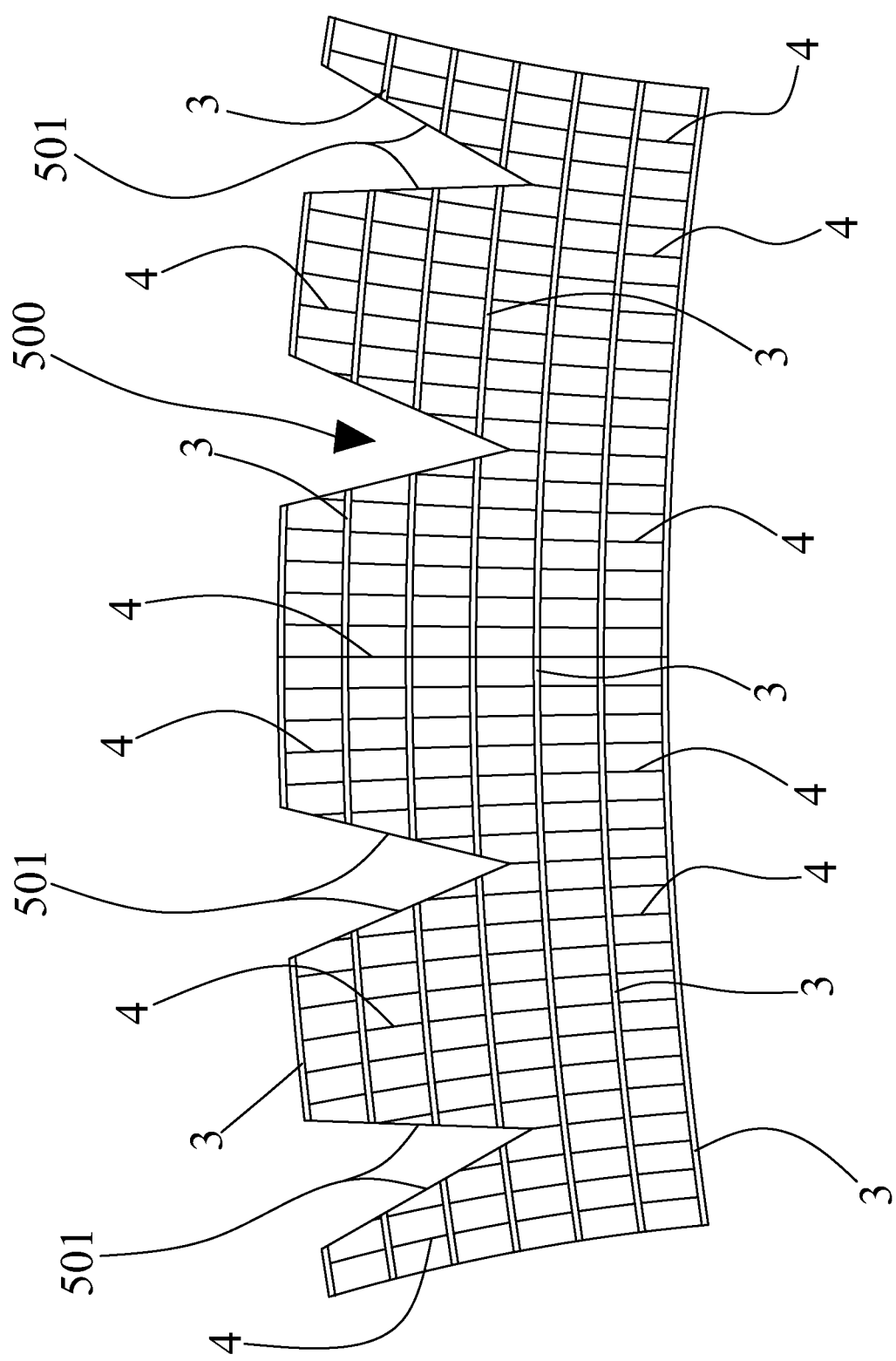
FIG. 6B is a view from above of a portion of a reinforcing element arranged in an arched path.
Figure 6C:
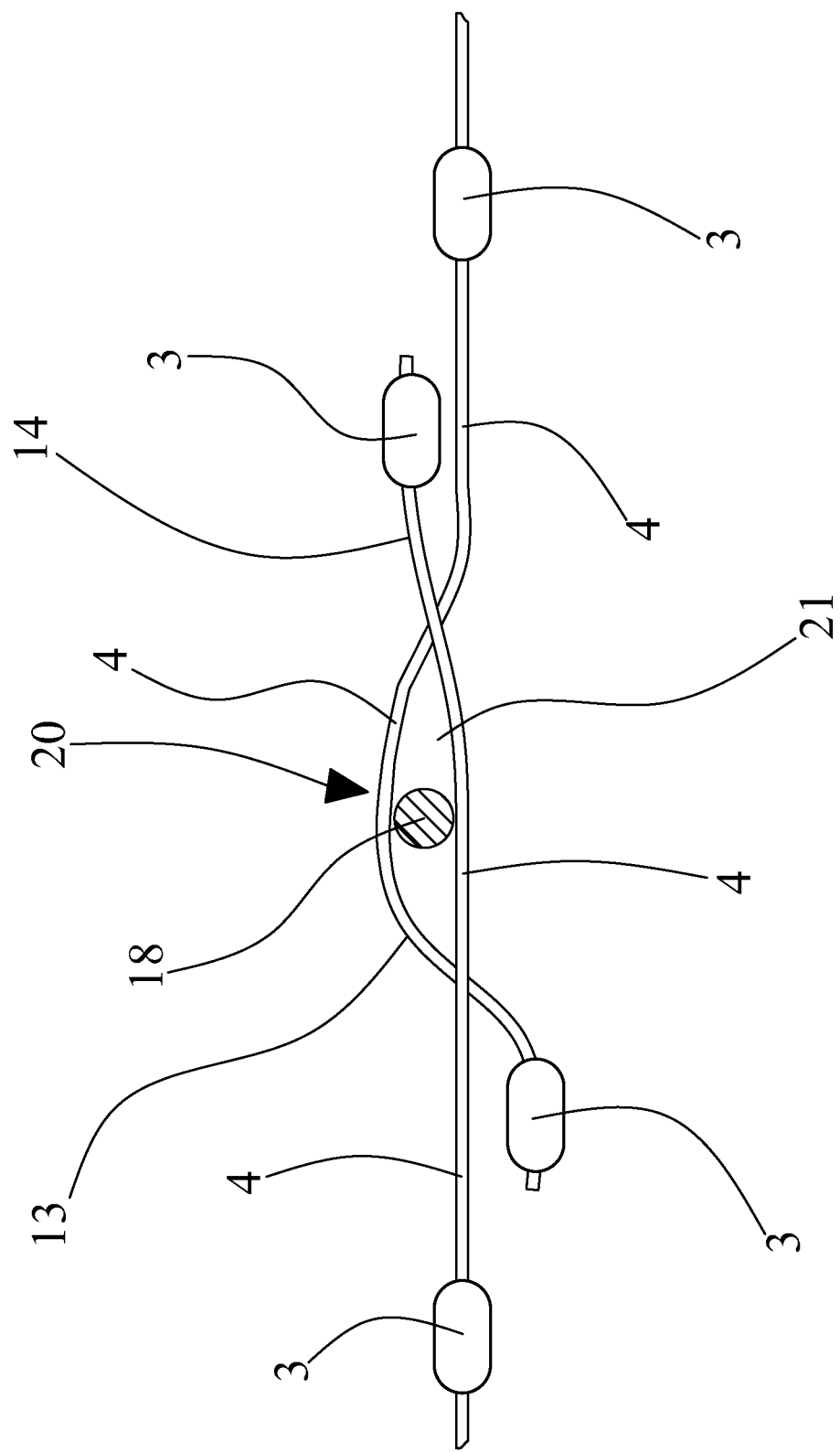
FIG. 6C is a detail of a connection of the two reinforcing elements of FIG. 6A.

In FIG. 6B, lastly, a case is illustrated in which a reinforcing element exhibits recesses 500 at least at a longitudinal flap 13 or 14, so that the element itself can be arranged in an arched trajectory. The recesses can be obtained by transversal slotting to form converging edges 501 and are for example arranged longitudinally spaced, for example in a regular pattern. Moreover, these recesses affect only one part of the transversal development of the element, for example less than 50% of the width of the element so that the element still retains good mechanical strength properties.

Production of the Article in Roll Form and of the Reinforcing Element.

The product in roll form and the reinforcing element can be realized with the procedures described below regardless of the applications that are then in the present description; therefore, the description of the manufacturing processes will not be repeated.

The reinforcing element 1 and the product roll 102 are made of a plastic material (such as HDPE or polypropylene).

Figure 2B:
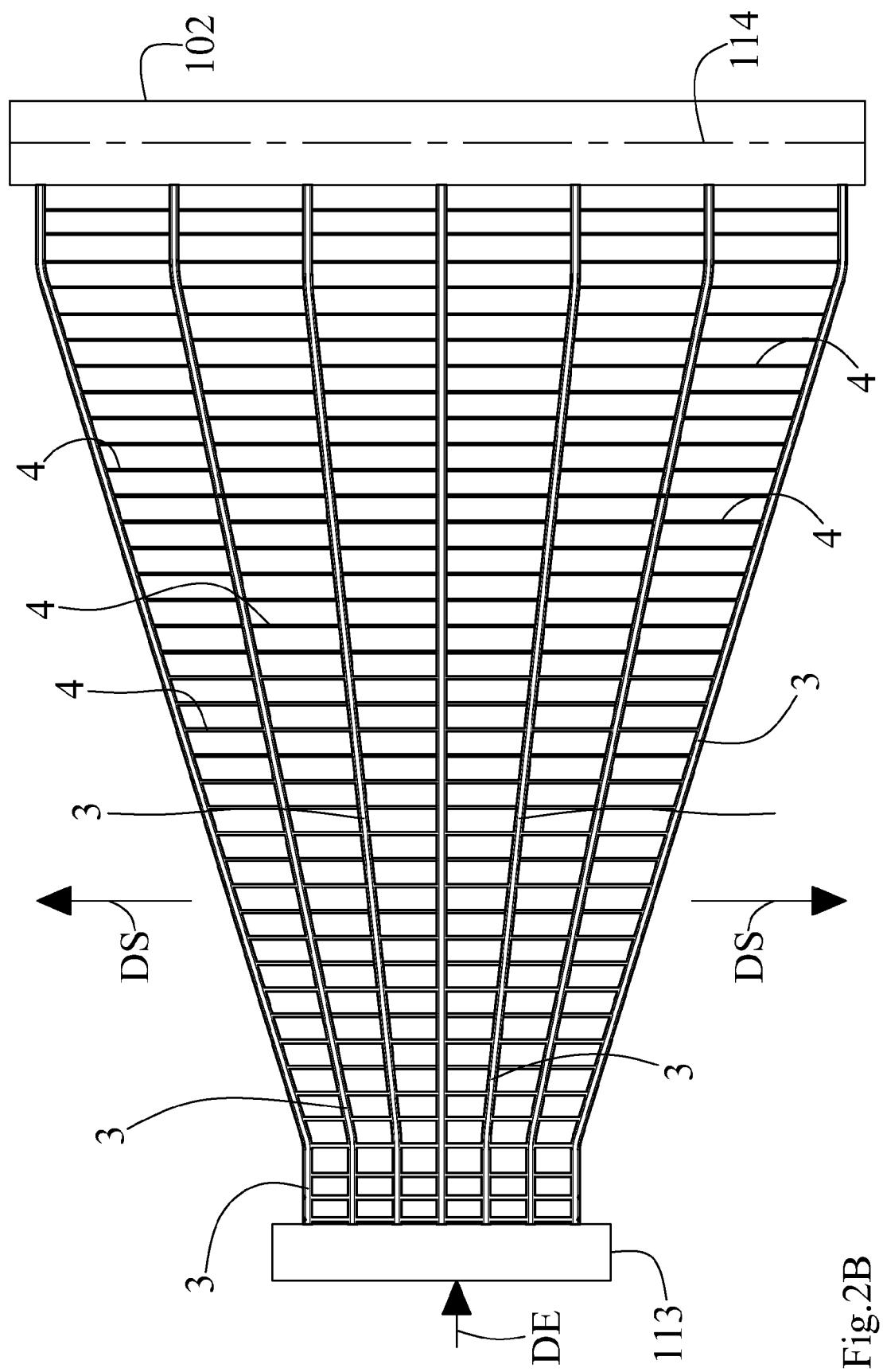
FIG. 2B is a schematic view, in a view from above, of a step of transversal stretching of the production process for the realization of a single-stretched product, or a substantially single-stretched product in a net structure.

The first and second elements 3, 4 are made by a simultaneous extrusion process. For example as seen in FIG. 2A, the plastic material is fed from a hopper 300 and then moved towards an extrusion head 301. At the extrusion head, the first elements 3 (or precursors of the same elements) are extruded elements and precursors of the second elements are coextruded transversally to the first elements, forming an integral reticular and tubular body 302 in output from the extrusion head. The body 302 is therefore a monolithic plastic body. Subsequently the body arrives at a cutting station 303 which forms the longitudinal semi-finished reticular structure 304 of FIG. 3B.

After formation of the semi-finished reticular structure 304, the structure 304 is stretched in the retractor 305 only along the development of the second elements in order to confer sufficient length thereto; alternatively the net structure 2 can be stretched along the development of both the first elements and the second elements within the limits described above.

It should be noted that the first elements 3 are parallel to the direction of exit from the extrusion station DE and that the stretching of the second elements 4 occurs in a transversal direction DS to the extrusion direction. In this way first and second elements are obtained that are high-performance elements of arbitrary length, as the extruder can provide, in principle, indefinite lengths.

With the stretching the reinforcing element can increase its tensile strength, obtained by bringing the net structure to a temperature of higher than 80° C., and subsequently by gripping the transversal edges to effect the pull along the development of the second elements. The net structure is brought to the stretching temperature by a process of heating by convection of hot air, or in hot water baths, or using other heating systems.

Alternatively to what is described a semi-finished workpiece of the type illustrated in FIG. 3A can be realized, produced from a sheet 310, for example by extrusion or calendering. In this case too, however, a direction of advancement of the sheet material can be defined (i.e. a direction of extrusion or calendering). The sheet is then perforated (with through holes 311 or not, for example by cutting or punching or other processes). Then the sheet is stretched transversally: in this case too the first elements 3 are parallel to the exit direction from the extrusion station DE of the sheet (or the advancement of the sheet) and the ironing of the second elements occurs in a transversal direction to the extrusion direction DS (or the sheet advancement direction). In this way high-performance second elements are obtained, and first elements of arbitrary length.

Thanks to the described process first elements are obtained positioned at a distance that varies as a function of the stretching ratio applied transversally while the second elements move away from one another as a function of the extrusion head pulsation frequency (i.e. the frequency of application of the precursors of the second elements transversely to the first elements in the extrusion head immediately after the formation of precursors of the first elements themselves); or a frequency of perforation should the process start from sheet material, such as to obtain a mesh size that varies depending on requirements and during a same production process.

The net structure is then cut transversally to the first elements to a predetermined length, measured in the direction of the first elements or the longitudinal elements. The measurement of this length is typically greater and depends on the application; however, it is possible to have lengths of the first elements of up to 10, 50 or even 100 meters. The measurement of the width is also dependent on the application; however, a width of up to 2, 4 or even 8 meters can be obtained.

Lastly, the net structure can be formed in a roll along an transversal winding axis, for example perpendicular to the prevalent development direction of the first elements, such as to form a roll of product that is easier to transport. Note that the roll-winding can take place even before the transversal cutting: in other words a winding station can be provided downstream of the stretching and proceed to the roll-winding of the net structure; once a rolled product has been attained of predetermined dimensions, the net structure can be cut transversally to the prevalent development direction of the first elements, before proceeding to the formation of a new product roll.

Figure 2E:
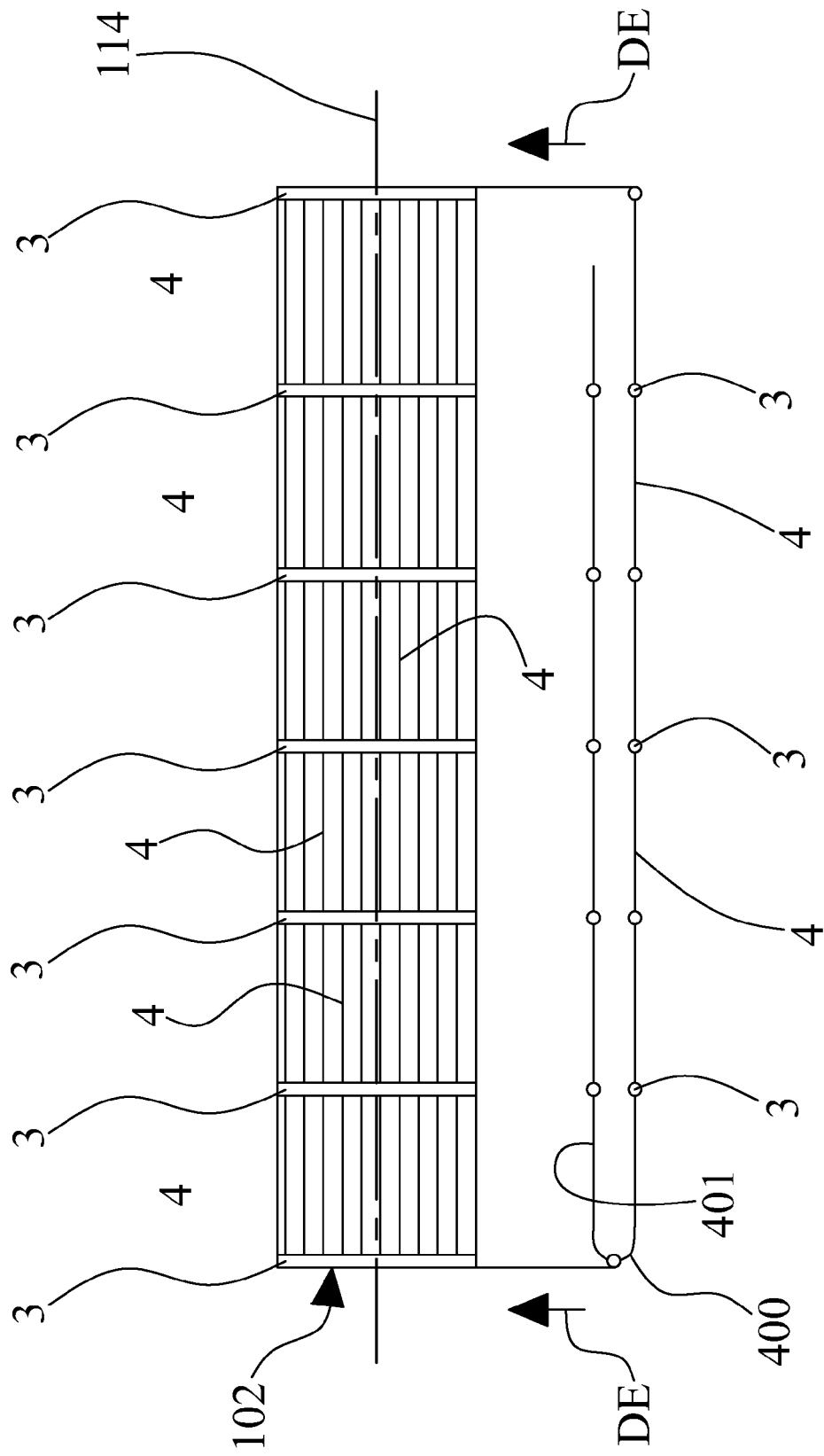

It should be noted that in an alternative embodiment illustrated in FIGS. 2C-2E a step of folding can be included, according to fold lines that are parallel to the first longitudinal elements, before performing the step of winding the roll. In particular, with reference to FIG. 2C, it can be observed that lateral portions of the flat semi-finished workpiece, exiting from the stretching station 305, are folded along respective fold lines 400 so as to form longitudinal flaps 401 arranged superposing and parallel to the central part of the net workpiece. With reference to FIG. 2D, it can be observed that lateral portions of smaller size with respect to the example of FIG. 2C are folded along respective fold lines 400 such as to form longitudinal flaps 401 that are arranged superposed and parallel to the central part of the net semi-finished workpiece.

With reference to FIG. 2E, the semi-finished workpiece exiting the stretching station is folded on itself along a substantially median fold line 400 such as to form a semi-finished workpiece having two superposed on one another.

The above-described steps illustrated in FIGS. 2C-2E enable the transversal dimensions of the roll to be reduced during the formation step, without damaging it, thanks to the flexibility of the second elements. In the case of very thin and flexible second elements, multiple folds can be made, creating structures with 3 or more superposed layers, prior to forming the roll.

In a further aspect, after the stretching along the second elements, the net structure 2 can be joined to a bordering element 24a having a laminar structure (for example a reticular film, a textile layer, a non-woven textile layer) defining passages having a smaller area than that of the meshes of the structure 2. The laminar bordering element can for example be hot-joined or glued to a surface of the net structure itself, before the structure is wound in a roll (and if there is a step of longitudinal folding, before it). As will better emerge herein below, the bordering element 24a can be used to define a support element 24 during the step of installing the invention.

Applications

By unrolling the rolled product a grid reinforcing element is obtained for reinforcing, usable for gradients, barriers and "green" walls, either in blocks, or alternatively a grid element is provided for stabilizing, usable for roads, car parks and railway beds; or a grid element for containing, usable for realizing containing structures such as columns or mattresses.

1. Vertical Pole

Figure 12A:
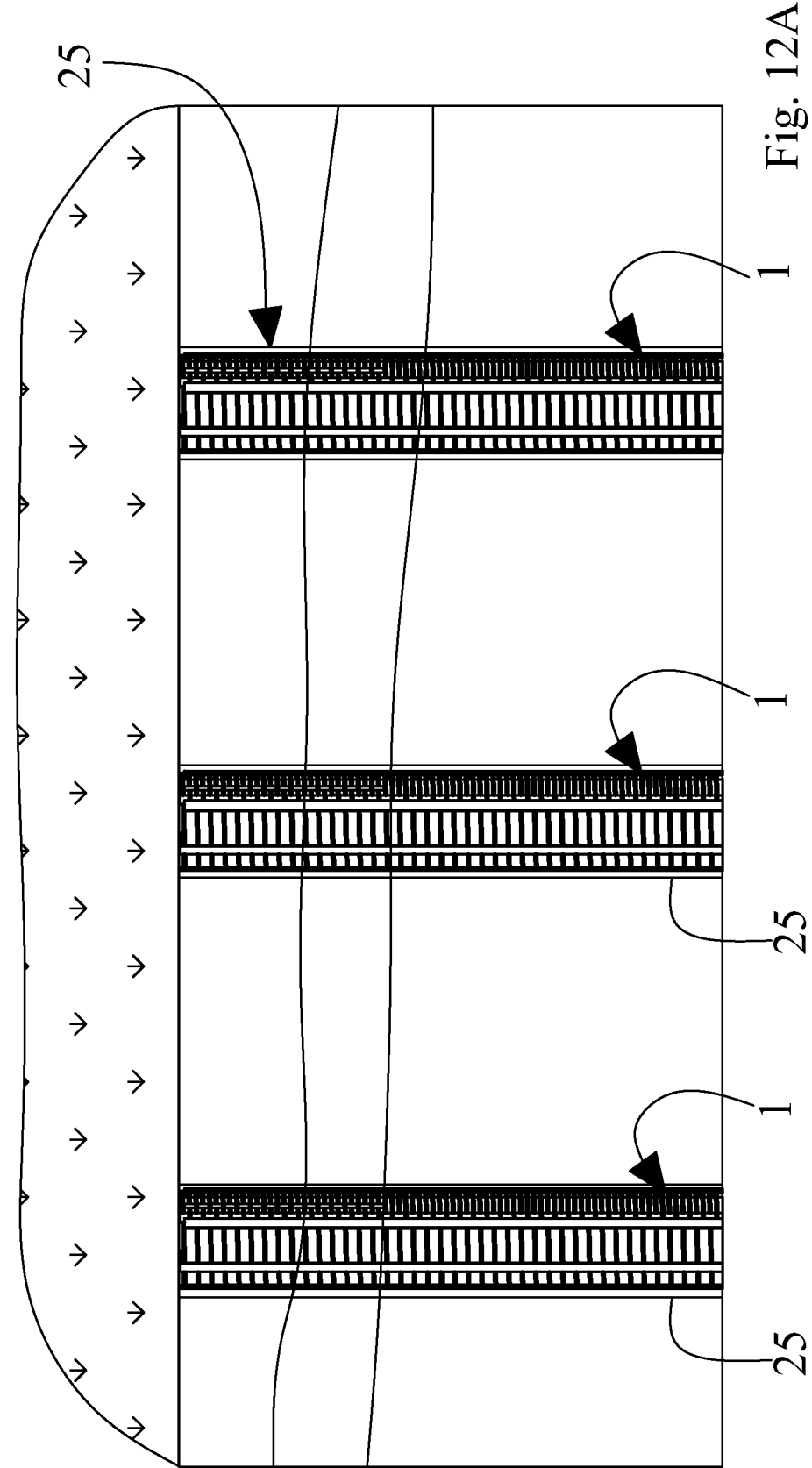
FIG. 12A is a schematic section of a portion of terrain in which reinforcing elements of the type of FIG. 10 are present, according to an aspect of the invention.
Figure 12B:
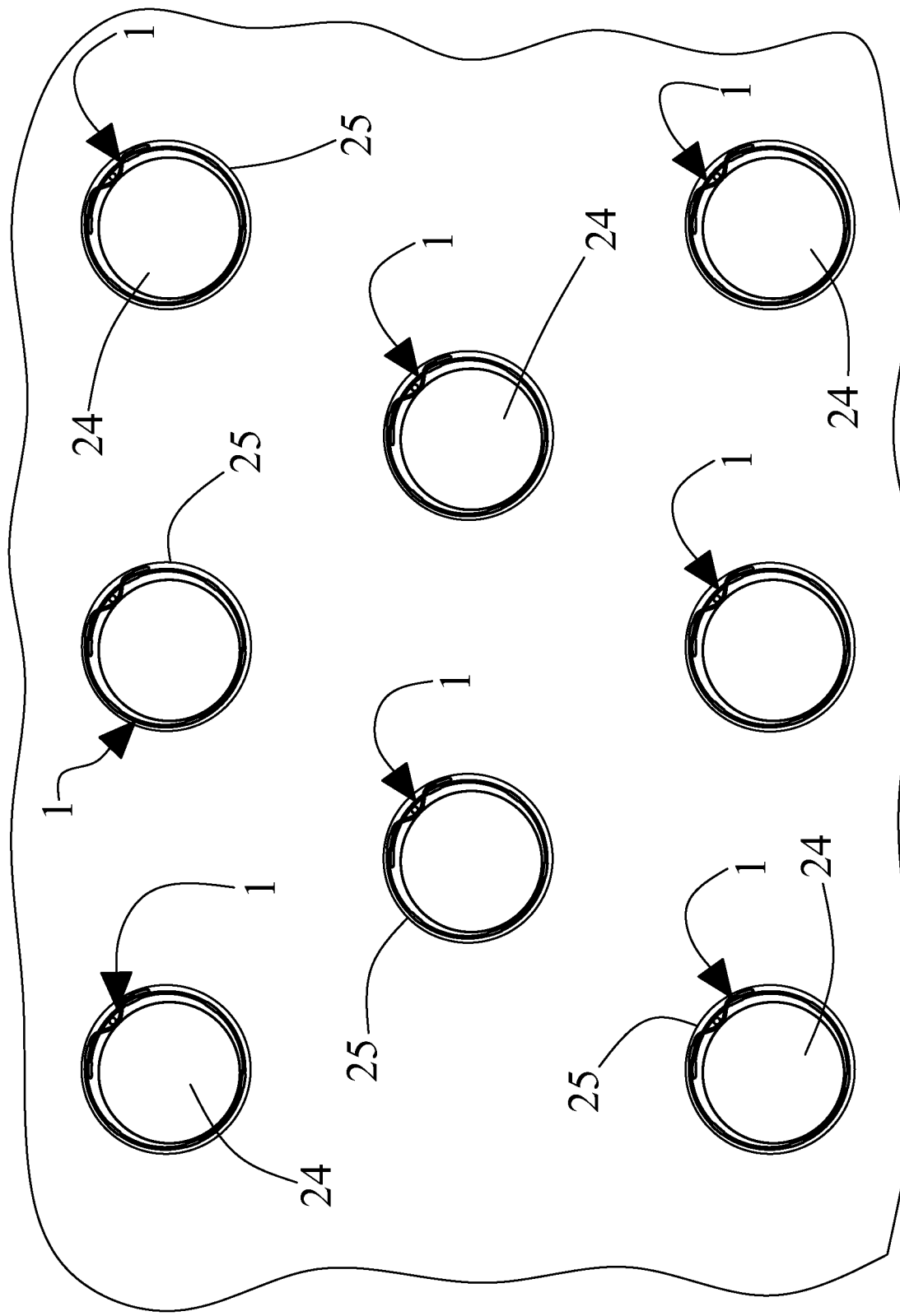
FIG. 12B is a view from above of a portion of terrain where a plurality of reinforcing elements of the type of FIG. 10 is applied, according to an aspect of the invention.
Figure 13:
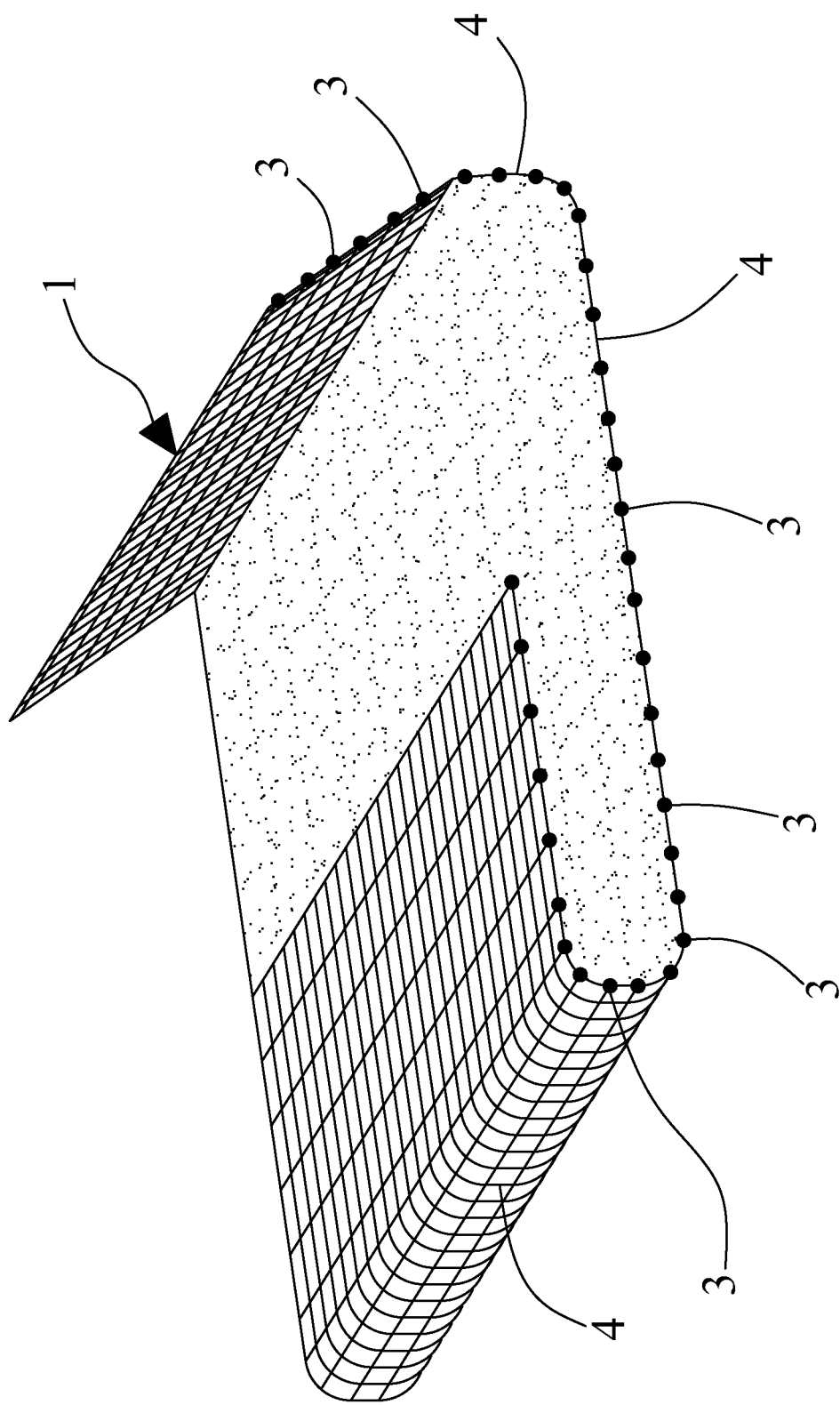
FIG. 13 shows a perspective view of a reinforcing element similar to the one shown in FIG. 8 or 10 and wound around an axis parallel to the first elements so as to define a substantially elliptical or rectangular closed profile with rounded edges.

An example of application is shown in FIGS. 12A and 12B in which a plurality of reinforcing elements are positioned in respective vertical and substantially cylindrical seating 25 afforded in a portion of ground to be consolidated and stabilized, thus forming structures similar to foundation piles.

In the accompanying figures two different configurations are shown in which the net structure of the reinforcing element 1 can be installed, in particular defined as the first and second working condition.

Figure 8:
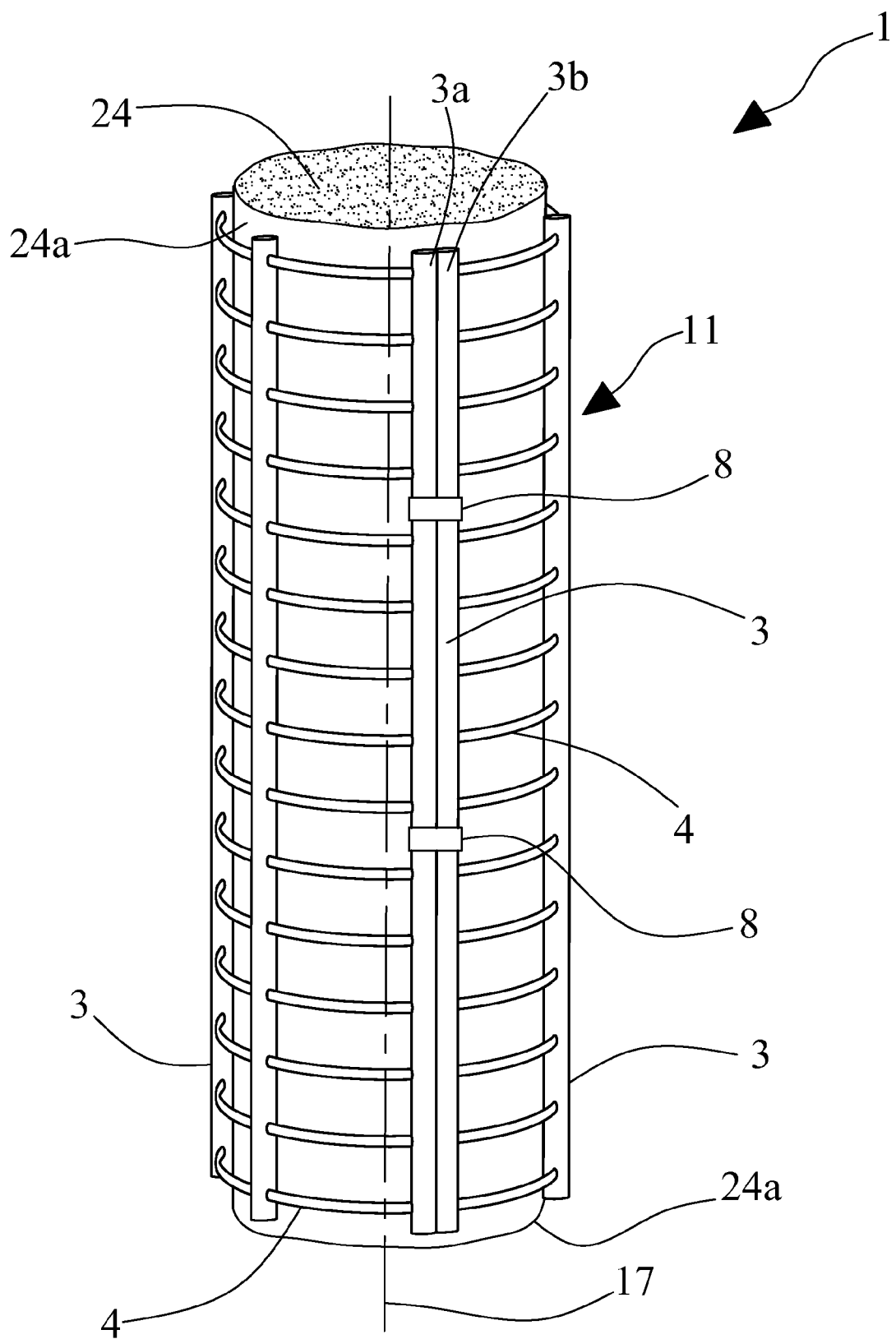
FIG. 8 is a perspective view of the reinforcing element of FIG. 7 in the first working condition and operating around a tube sock.
Figure 9:
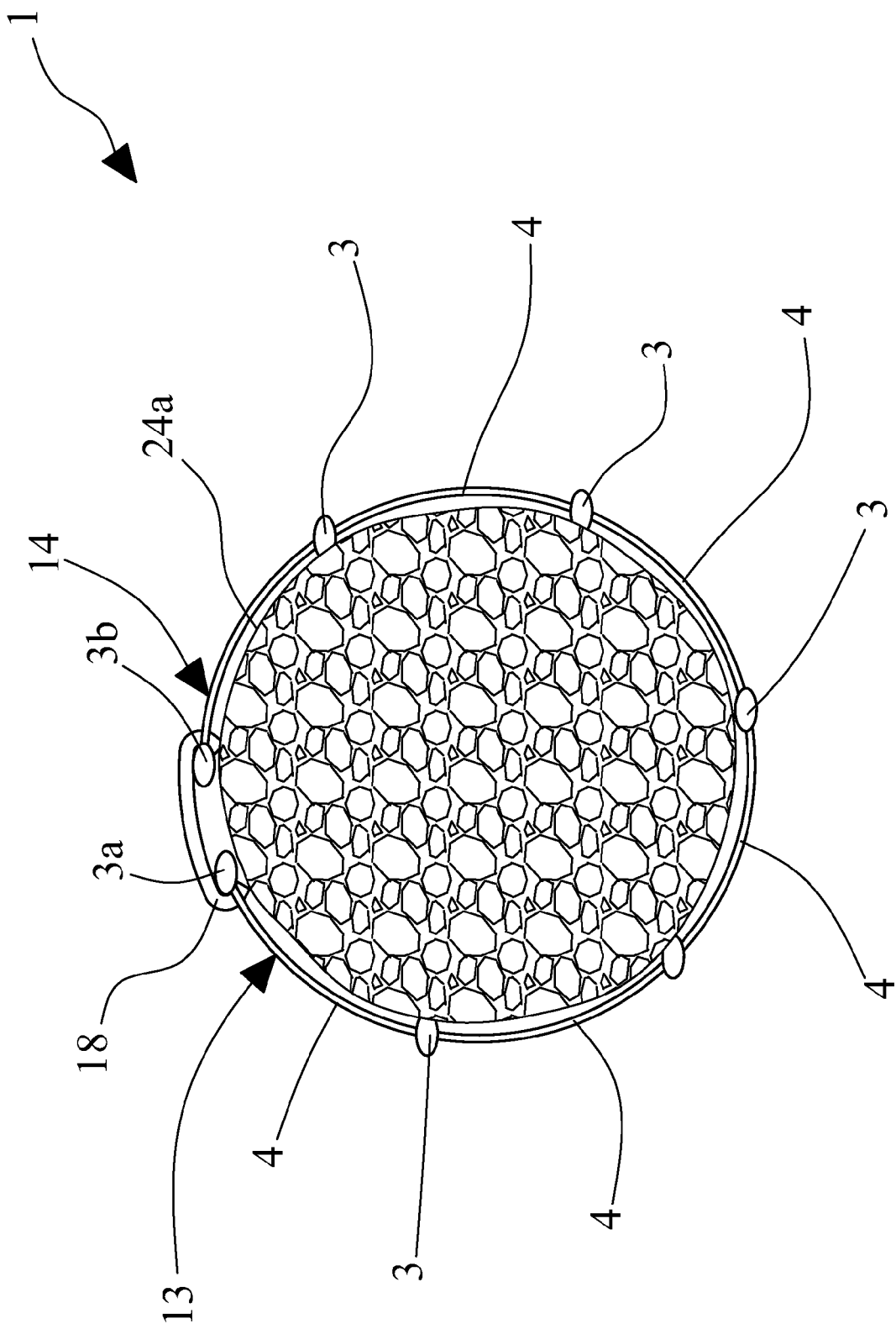
FIG. 9 is a view from above of the reinforcing element of FIG. 8.
Figure 10:
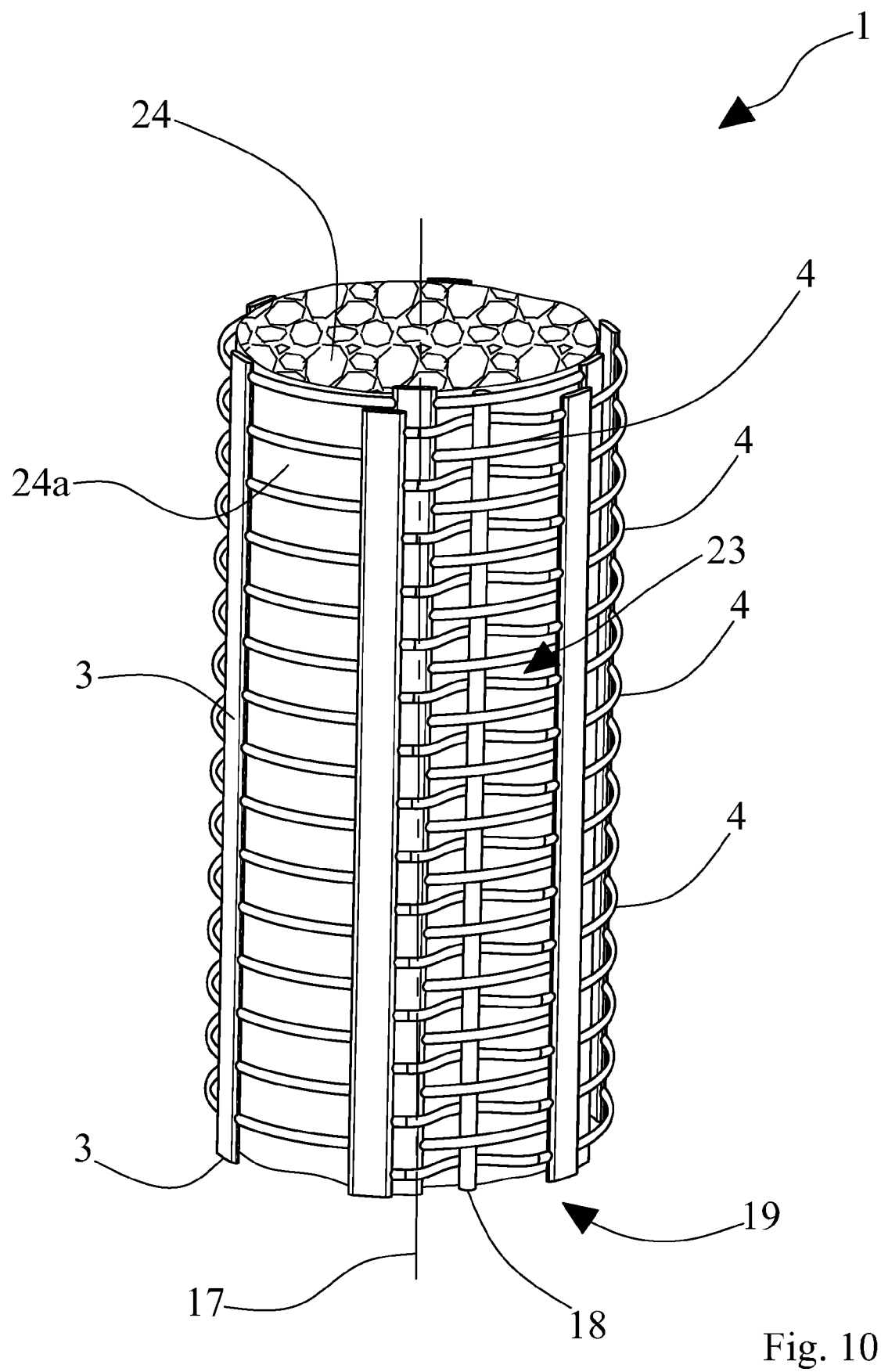
FIG. 10 is a perspective view of the reinforcing element of FIG. 7 in a second working condition around a tube sock.
Figure 11:
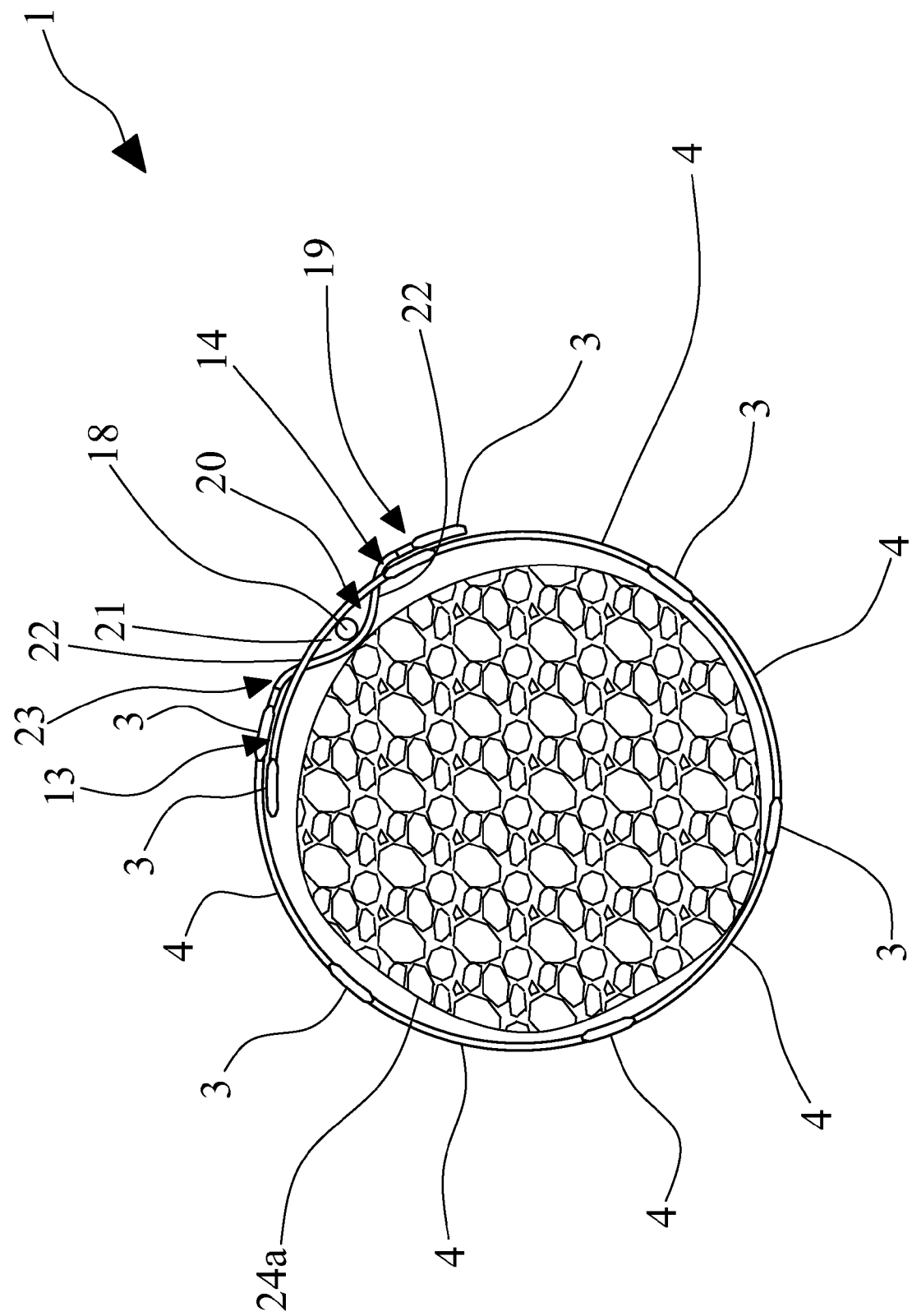
FIG. 11 is a view from above of the reinforcing element of FIG. 10.

With reference to FIGS. 6 to 11, the net structure 2 obtained by unrolling the rolled article 102 along the first elements or bars 3 is arranged along an arched profile of the second elements (i.e. with the second elements arranged in arcs or substantially parallel curved lines) and has a radially external surface 11 and a radially internal surface 12 opposite one another. The net structure is longitudinally delimited by respective head portions 15 while circumferentially the net structure 2 is delimited by a first and a second longitudinal flap 13, 14 that can be directly adjacent (FIG. 9) or at least partially overlapping (FIGS. 10 and 11).

Figure 7:
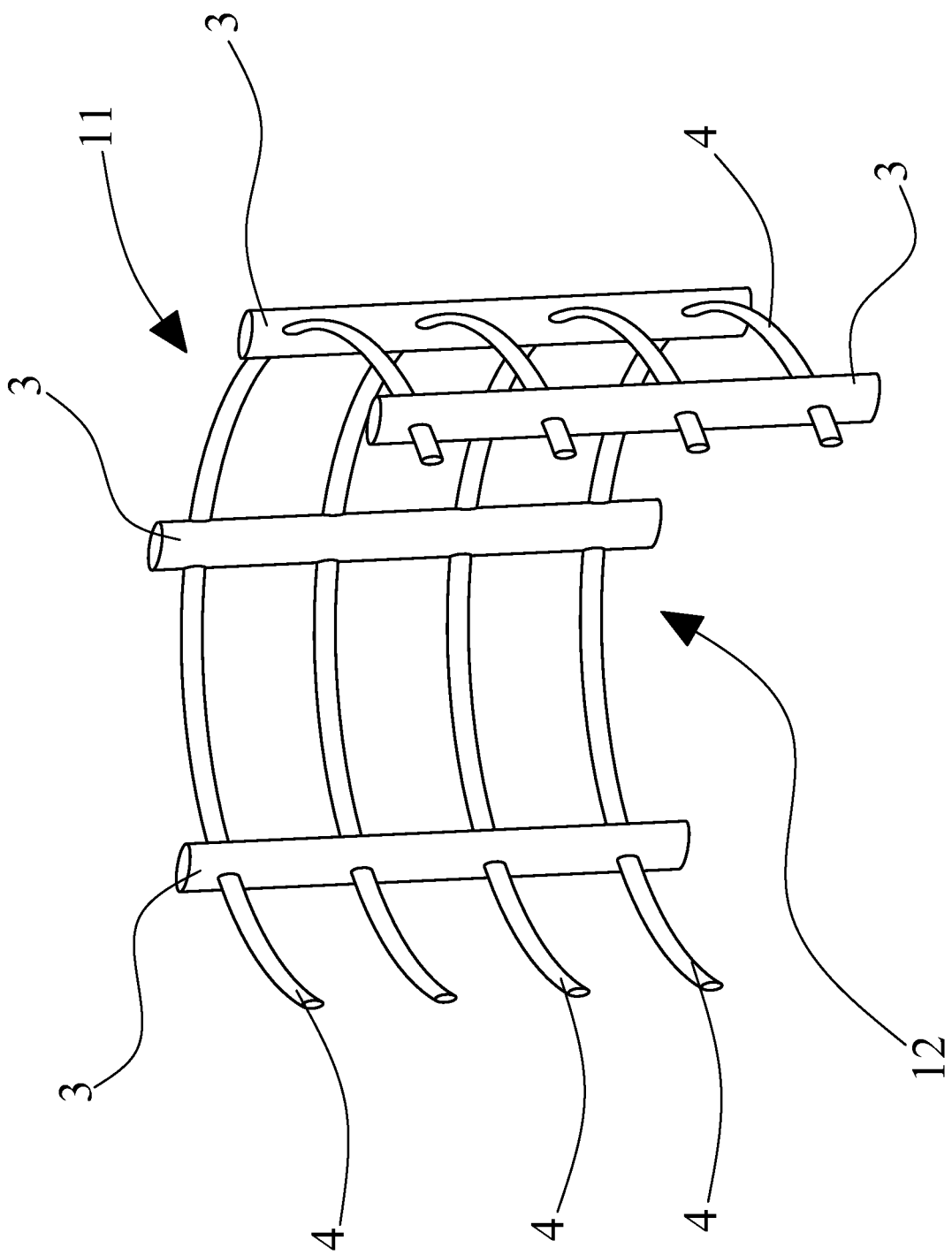
FIG. 7 is a perspective view showing a portion of a reinforcing element which extends transversally along a curved line, in accordance with a first type of application.
Figure 7A:
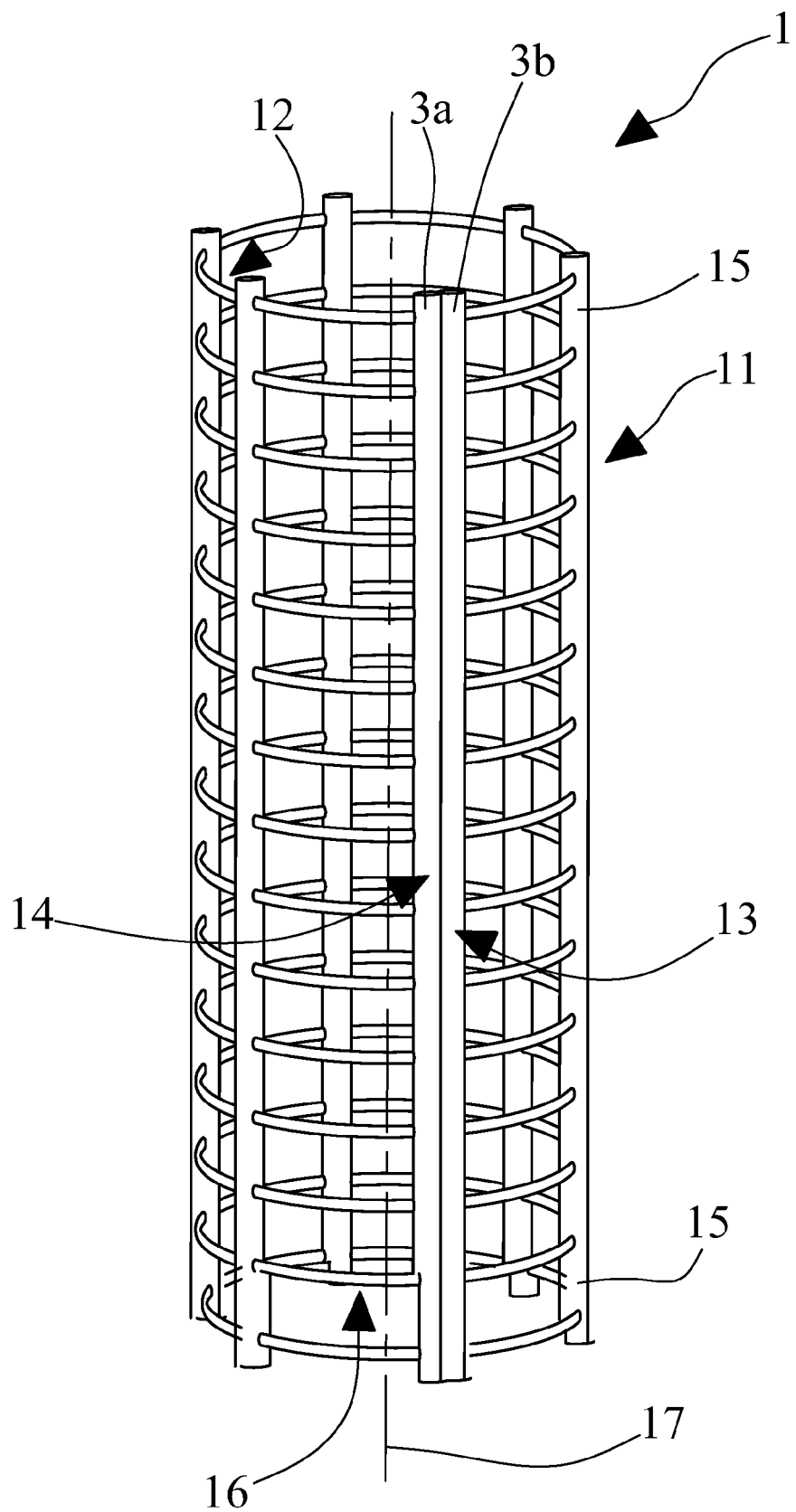
FIG. 7A is a perspective view of a reinforcing element of FIG. 6 in a first working condition.

In the first working condition, shown in FIGS. 7 to 9, the second elements 4 are arranged in a substantially arched conformation to form a longitudinal seating 16 having an axis of extension 17 parallel to the first elements 3 of the net structure 2. In the example of FIG. 9, the net structure 2 of the reinforcing element 1 in the first working condition 9 has, according to a section with a plane substantially normal to the axis 17 and passing through the second elements 4, a substantially circular shape in which the flaps 13 and 14 and in particular the first end elements are mutually facing and substantially in contact with one another. Alternatively, this shape can also have other conformations depending on needs: for example, substantially polygonal, elliptical, circular arched or elliptically arched.

To maintain the stable working condition shown in FIG. 9 elements can be provided for the radial stop 18, for example clips or straps or shaped plates or elements of any other nature that are applied at one or more points along the development of the first two elements 3a and 3b and are able to keep them in contact or at a predetermined distance.

As for the second working condition, visible in FIGS. 10 and 11, the net structure 2 is wound at least partially upon itself so that the flaps 13, 14 form a longitudinal overlapping area 19. In the second working condition blocking is ensured by the cooperation between a predetermined number of superposed second elements with one or more blocking elements 18.

In closer detail, the second working condition can be seen in FIG. 11, where the overlapping area 19 comprises a plurality of slots 20 which form passage openings 21 bounded by tracts 22 of second elements 4 of mutually overlapping flaps 13 and 14. The slots 20 are aligned in a parallel direction to the first elements, forming a coupling zone 23. Although the accompanying figures show only one coupling area 23 defined by a plurality of slots 20 aligned with each other, there can be a presence of multiple coupling zones 23, circumferentially offset and providing greater radial blocking of the net structure 2. The blocking element 18 is inserted through the slots so as to cooperate with portions of the second elements of the two overlapping flaps 13 and 14. In practice, the blocking element may comprise a cylindrical body or bar, as shown in FIG. 10. As mentioned two or more blocking elements consecutive to one another along the longitudinal development of the reinforcing element 1 can be provided.

In the second working condition, the structure 2 in a section plane perpendicular to the axis 17 is for example configured in a substantially circular profile (FIG. 11). In a further configuration, the profile can be substantially polygonal, elliptical, circular arched or elliptically arched.

From a dimensional point of view, the reinforcing element 1 has a length in the direction of the development axis 17 of greater than 3 meters. For example, the reinforcing element while remaining a monolithic body may extend along the axis 17 by 5, 10, 20 or more meters according to requirements without giving rise to constructional complications. The circumferential extension is given by the length of each of the second elements 4, which for example can be from 2 to 6 meters.

The reinforcing element can optionally house a supporting element 24, arranged in said seating 16 and considerably consolidating the soil. According to different applications the support element 24 can be a container, such as a tubular net structure, partially or completely filled with a filling material which can be an aggregate and/or cement.

From a point of view of implementation, the roll of product 102 is first unwound along the prevalent development direction of the first elements, and then shaped so as to define the longitudinal seating 16. In the meantime, or previously, housing cavities 25 have been made in a terrain to be consolidated. The size, depth and distribution of these housings depends on the type of soil to consolidate. The reinforcing element 1 shaped as described (see FIGS. 9 and 11) is inserted within each housing cavity 25 and the reinforcing element can be filled with filler material. Filler material or concrete can for example be inserted in the support element, or a combination of concrete materials and aggregate materials. Then a bordering element 24a can be inserted in the reinforcing element 1, which bordering element can be fillable with a filler material such as gravel, sand and/or concrete such as to define a support element 24. The bordering element 14a also exhibits a net structure (for example it comprises a tube of textile or a net bag or a laminar element fixed to the net structure at point of production) but having meshes of considerable smaller dimensions in comparison to those of the structure 2. Before or after insertion of the bordering element there is the circumferential blocking of the element 1 with one or more blocking elements 18 such that the element 1 can guarantee good radial containing performance and thus actively support the filler material.

Note that it is also possible to use the reinforcing element 1 alone, i.e. without the internal supporting element 24. In this case, once the holes have been bored in the ground to be consolidated the reinforcing element is inserted, which can for example be wound on itself in the first or second working condition described above and blocked circumferentially with the aid of one or more blocking elements 18.

2. Marine Mattresses

A further use of the reinforcing element configured as illustrated in FIGS. 7-11, 13 and 14 is to arrange the reinforcing element horizontally such as to constitute a containing structure delimited by respective head portions 15 while circumferentially the net structure 2 is delimited by a first and a second longitudinal flap 13, 14 which are partially superposing (similar to that described with reference to FIGS. 10 and 11).

In this case too a bordering element 24 can be used, of the type described with reference to the application for foundation poles. The area of overlap comprises a plurality of slots 20 which form passage openings 21 bounded by sections of the second elements 4 of mutually superposing flaps 13 and 14. The slots 20 are aligned in a parallel direction to the first elements, forming a coupling zone 23. Although the accompanying figures show only one coupling zone defined by a plurality of slots 20 aligned with each other, there could be multiple coupling areas circumferentially offset and usable for providing greater radial locking of the net structure 2. The blocking element 18 is inserted through the slots so as to cooperate with portions of the second elements of the two overlapping flaps 13 and 14. In practice, the blocking element may comprise a rod-shaped body. As mentioned, two or more blocking elements can be provided, consecutive to one another along the longitudinal development of the reinforcing element 1.

Figure 14:
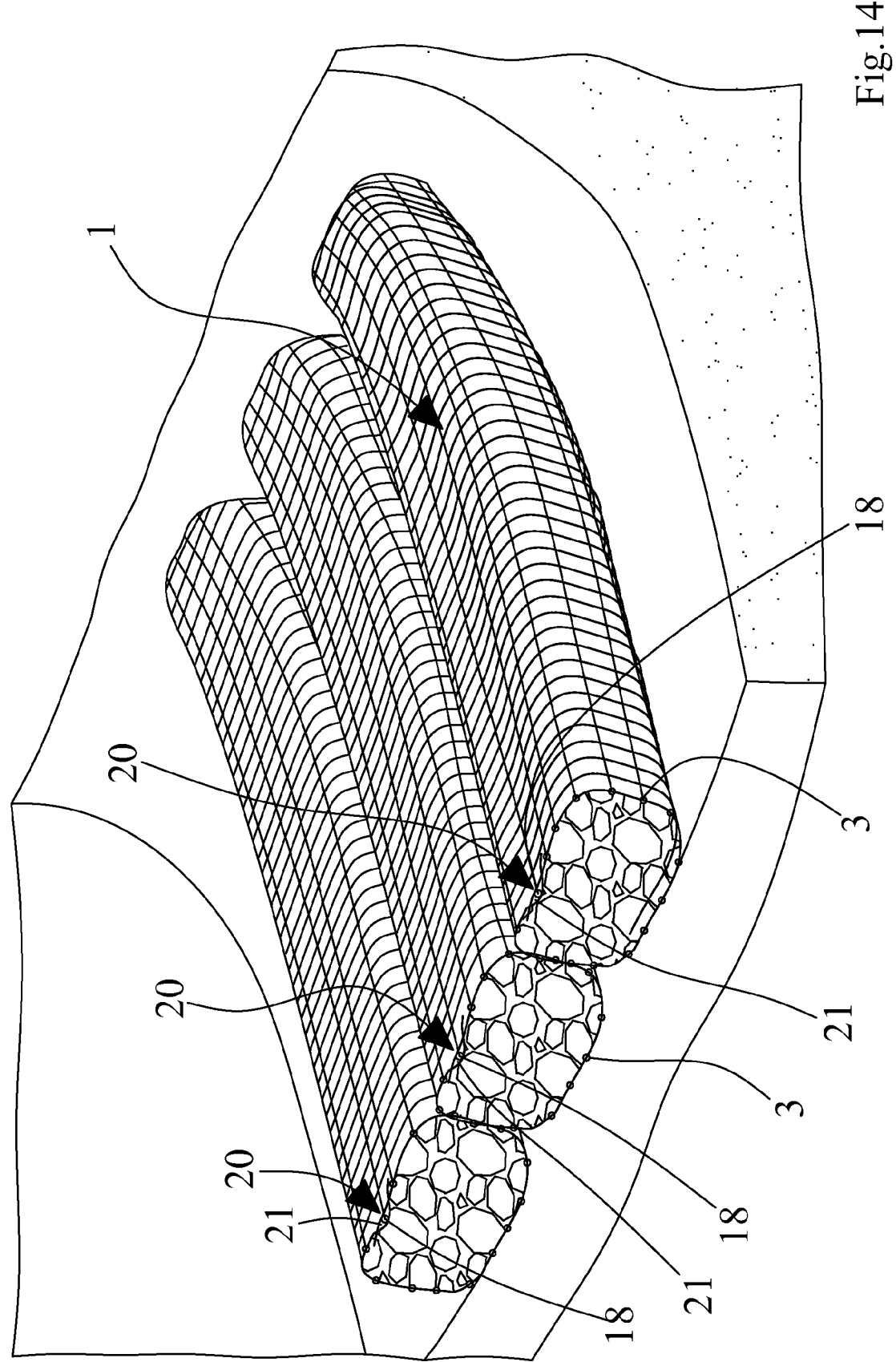
FIG. 14 is a perspective view of a reinforcing element of the type of FIG. 13 operating on a seabed, for example sea or river, according to another aspect of the invention.

These reinforcement elements are used, for example along the banks of rivers or on a seabed, as shown in FIG. 14. In this case the reinforcing element is filled with gravel or stones and is stretched substantially horizontally. A plurality of reinforcing elements in general are arranged with circular profile closed on itself and mutually flanked to form a structure having a function of protection and anti-erosion.

3. Consolidation and Frontal Reinforcement and the Like

With reference now to the accompanying figures from 15 to 20, the reinforcing element 1 is used for the consolidation and strengthening of fronts, slopes, embankments, green walls, natural or artificial walls, block walls, valleys, rock protection, noise barriers and the like.

Figure 15:
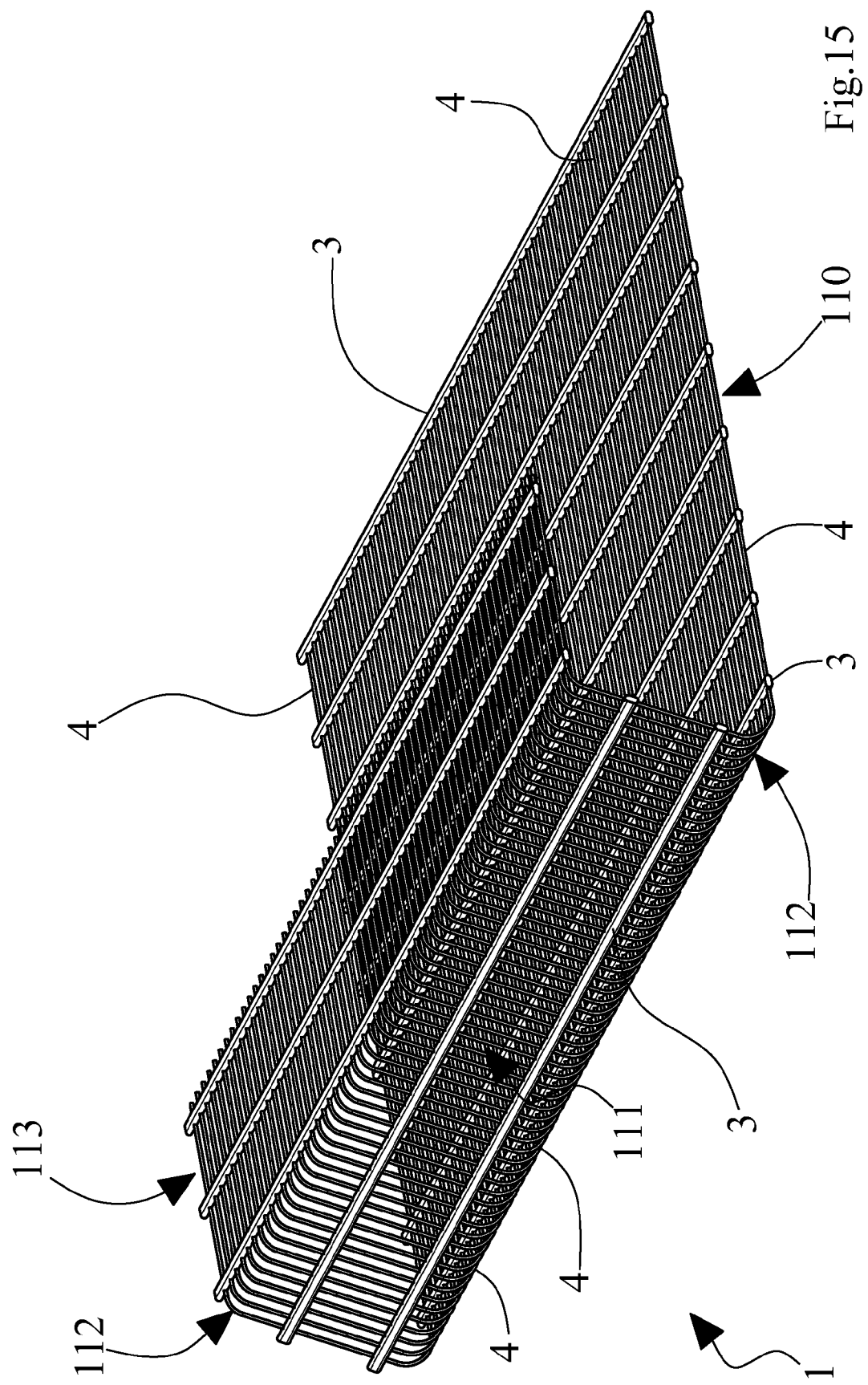
FIG. 15 is a perspective view of a reinforcing element in a first configuration according to a further application of the invention.
Figure 16:
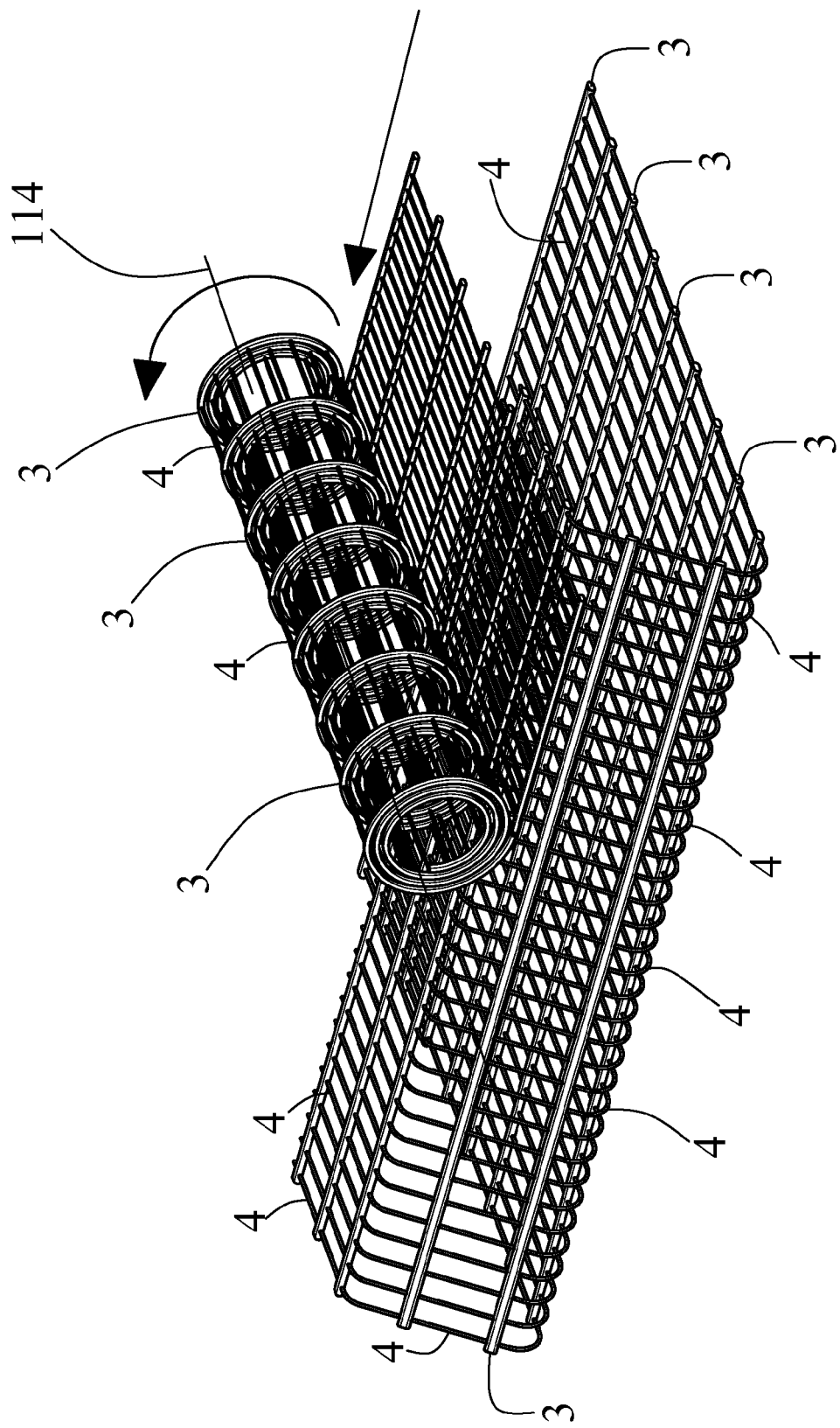
FIG. 16 is a schematic perspective of a step relating to a process for soil reinforcement utilizing the article of FIG. 15.

As shown in FIG. 15 and FIG. 16, the reinforcing element 1 exhibits a three-dimensional configuration (i.e. not flat) which in a view transversal to the first elements exhibits an open-profile shape having at least two tracts 110 and 111 arranged transversally to one another. For example the open-profile shape comprises a first and a second tract 110 and 113, substantially straight and optionally substantially parallel to one another, connected by at least an intermediate tract 111 transversal to the first and second tracts. The intermediate tract is joined to the straight tracts via substantially arched tracts 112, in particular an arc of a circle, interposed between the straight tracts and the intermediate tract.

Passing on to detail the process for consolidation and reinforcement of the ground shown in FIGS. 15-20, the process comprises the formation of a containing structure that can frontally support a gradient or a slope prone to landslides.

The process comprises the following steps.

A first step of the process includes preparing the soil to be consolidated or the initial surface of the structure being formed. This step for example comprises realizing a laying plane where the product in roll form 102 can be unrolled.

A second step includes arranging a product in roll form 102 on a tract of the terrain (FIGS. 16 and 17). The product is arranged with its winding axis 114 transversal to the facade of the area 115 to be consolidated or of the containing structure under realization. In the figures, the axis of the rolled product is horizontal and arranged so that during the process of unwinding the first elements are arranged parallel to the horizontal extension direction of the area 115 and the second elements are arranged transversally to the horizontal extension direction of the area (i.e. directed internally of the slope or structure). In practice, in the example shown in FIG. 16 the first elements 3 are substantially horizontal such that following the unwinding of the product 102 a significant horizontal tract of the containing structure is covered. The second elements 4 are oriented perpendicularly to the first elements and arranged in an open profile such as the one shown in FIG. 15.

Figure 16A:
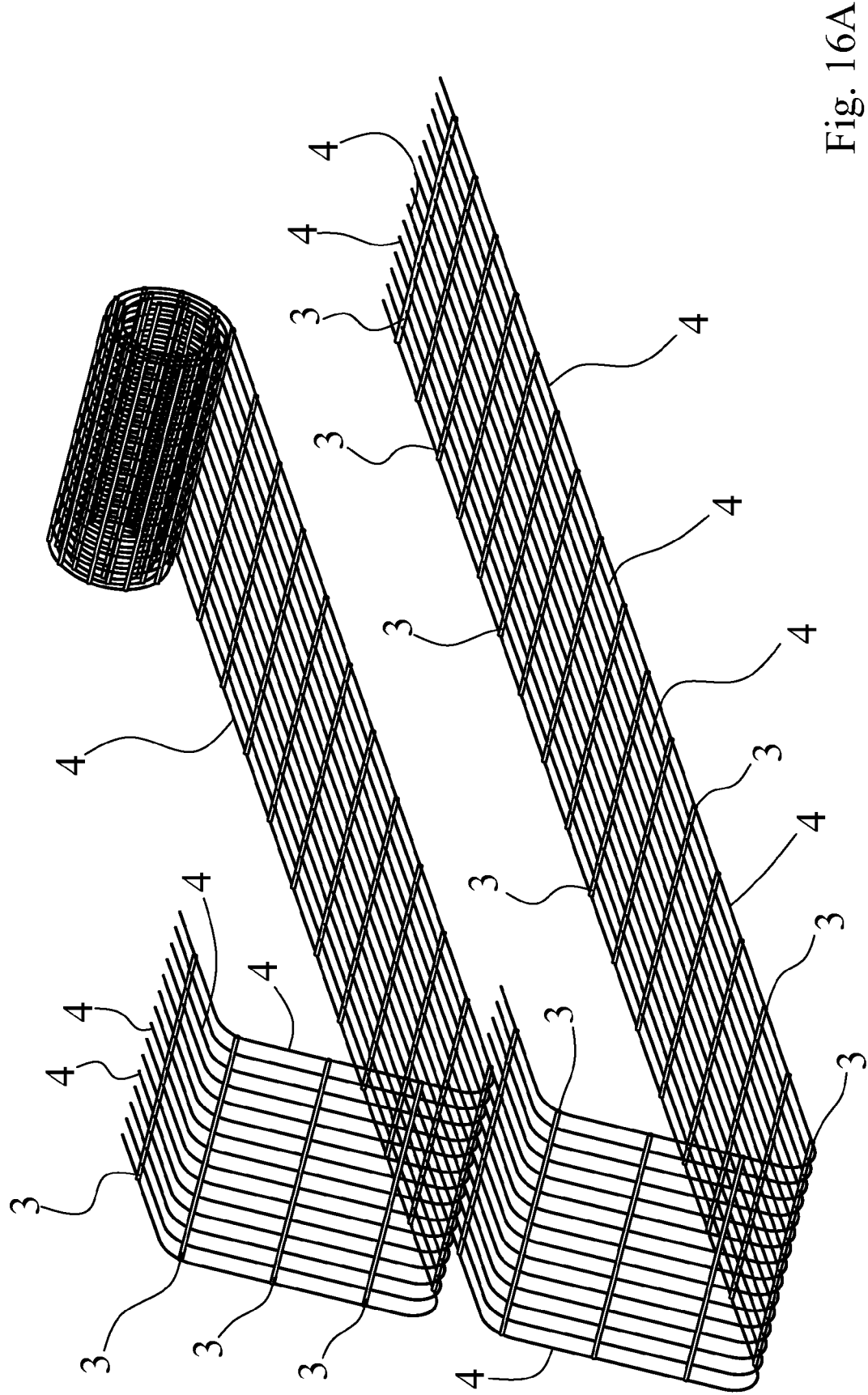
FIG. 16A is a schematic perspective of a step relating to the process for terrain reinforcement utilizing the article of FIG. 1A.

A third step (FIG. 18A) includes unrolling the product 102 along the prevalent development direction of the first elements 3 such as to obtain a reinforcing element 1 arranged with the first elements 3 horizontal and oriented along the area 115 and the second elements 4 oriented transversally to the horizontal development direction of the first elements and at least partly oriented transversally to the surface of the area 115. This is exactly the opposite of what has been done traditionally (FIG. 16A).

Figure 18B:
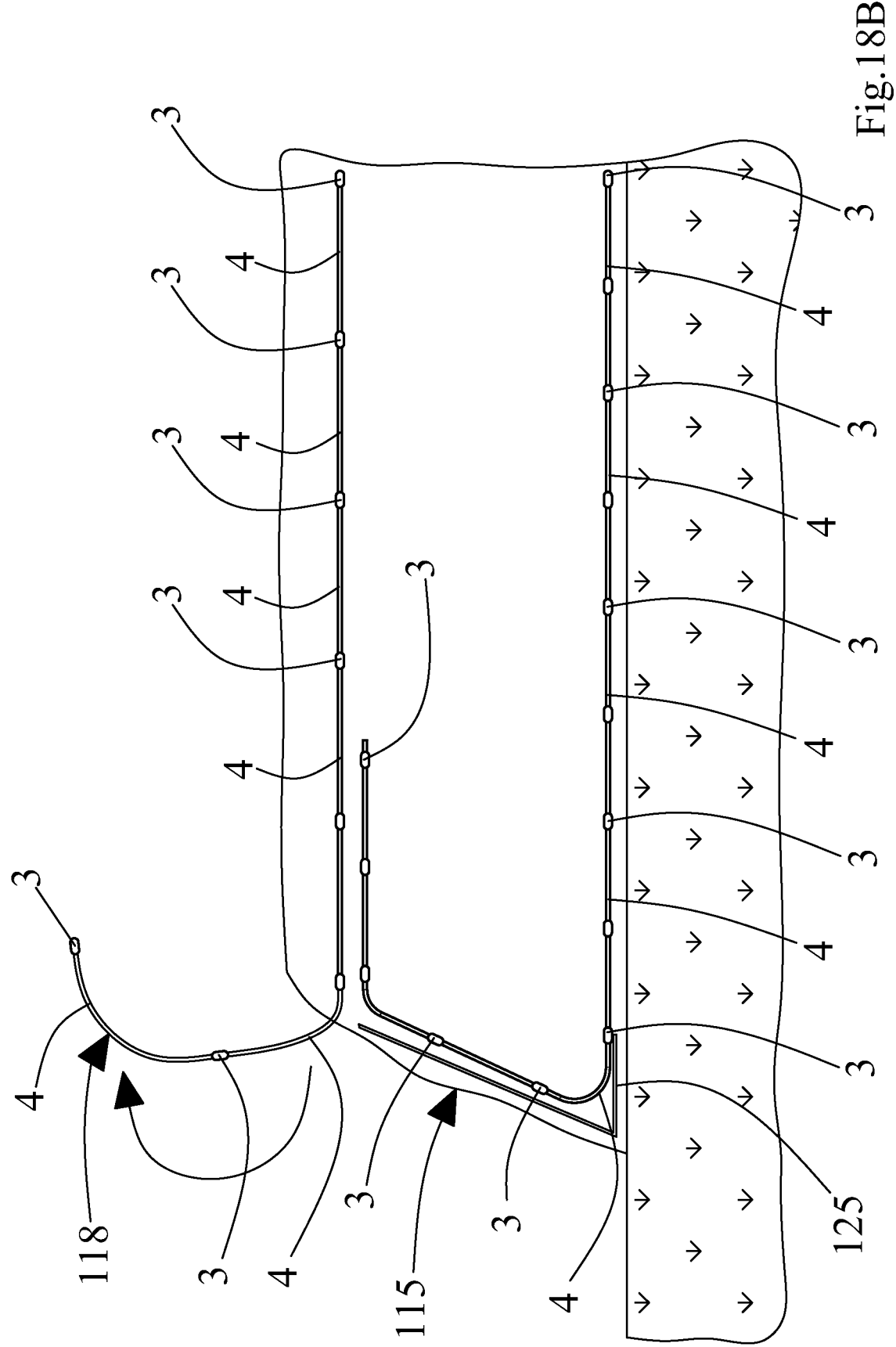
FIG. 18B shows a lateral view of a step following the step of FIG. 18A.
Figure 18C:
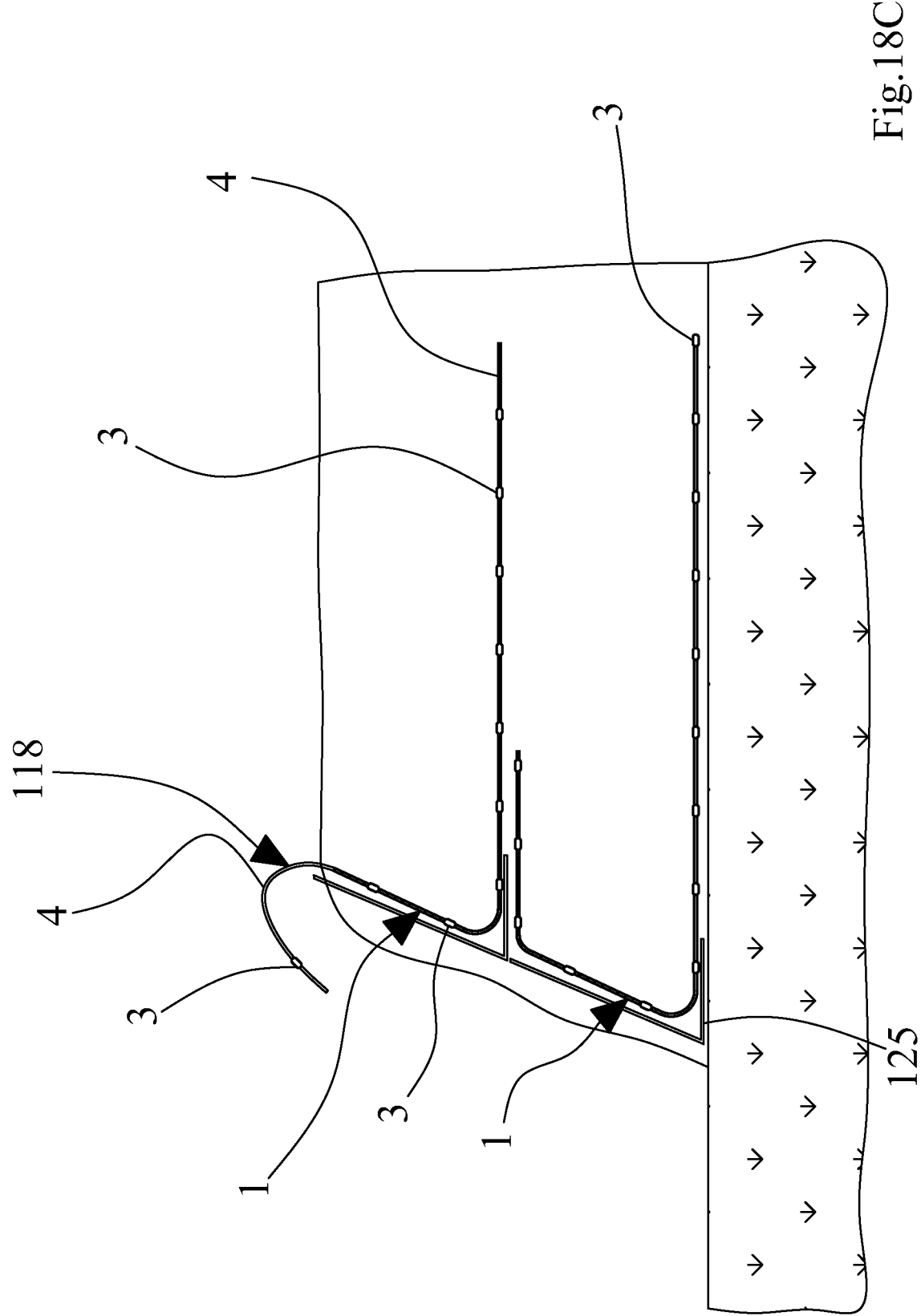
FIG. 18C shows a lateral view of a step following the step of FIG. 18B.
Figure 18D:
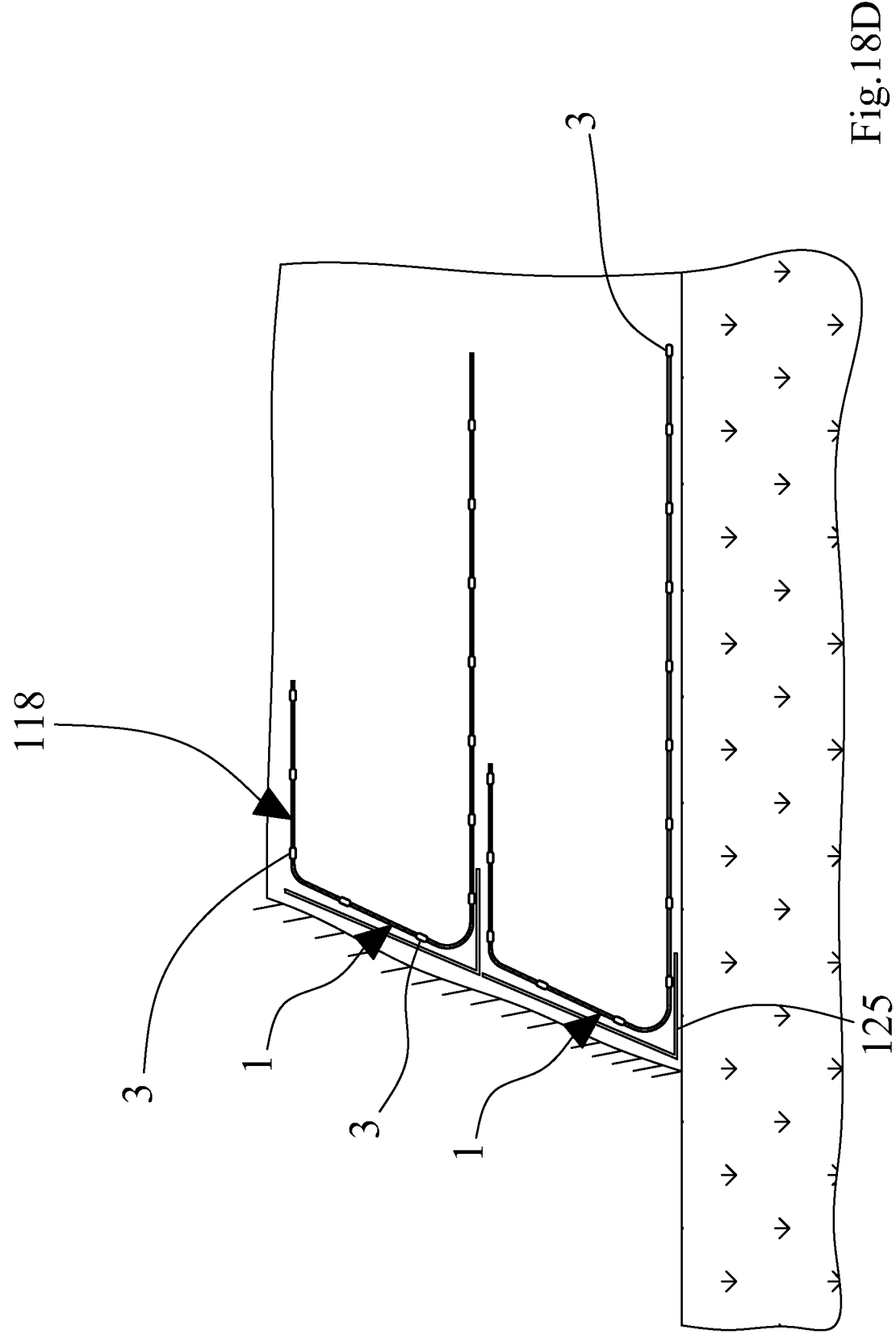
FIG. 18D shows a lateral view of a step following the step of FIG. 18C.
Figure 19:
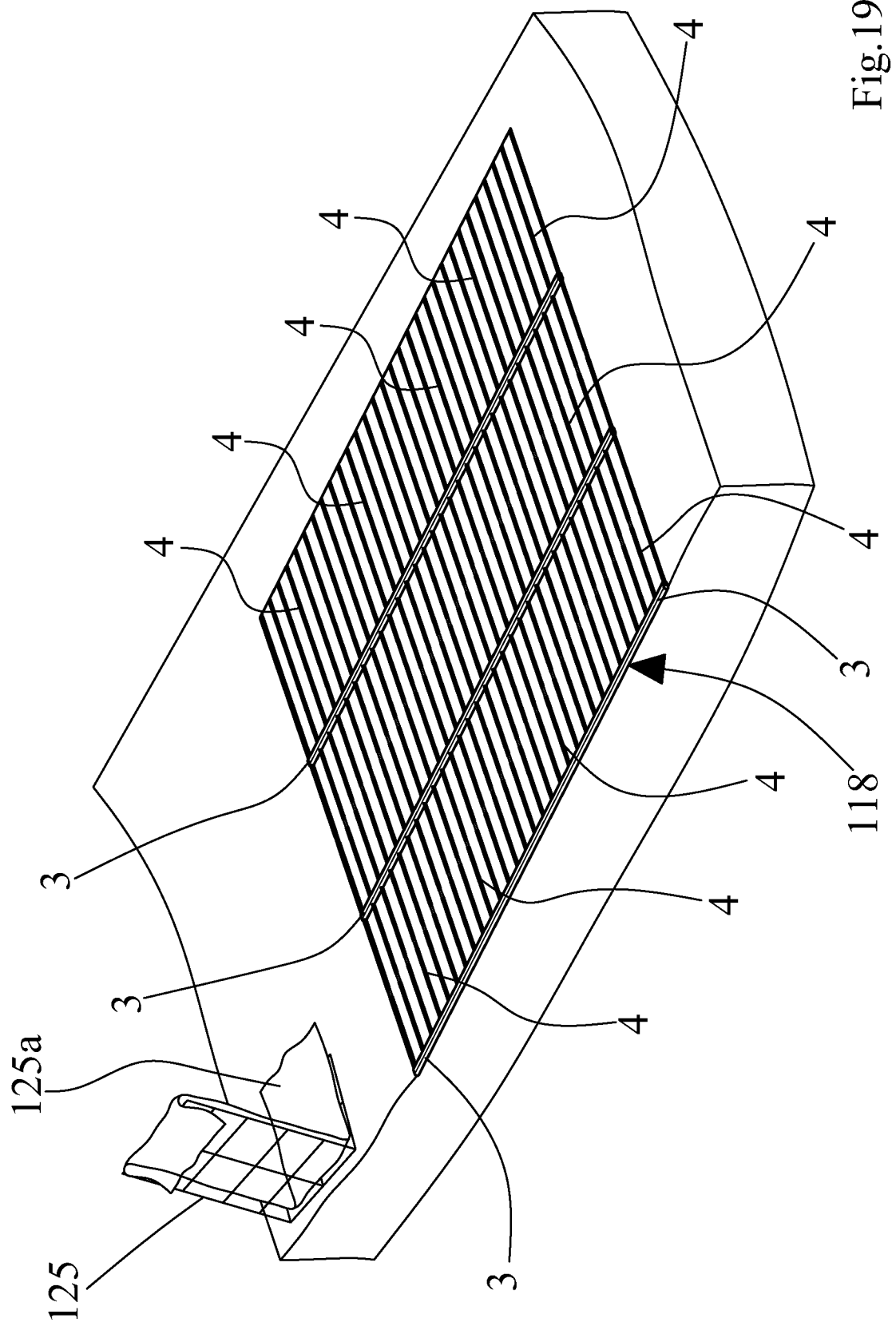
FIG. 19 shows a reinforcing element in an alternative configuration with respect to the configuration used in FIG. 15.

Following the unwinding of the rolled product, possible a little stabilizing material is laid, with the fold of a free longitudinal edge 188 of the net structure 2 facing upwards (FIG. 18B). Then positioning of formwork 125 is performed, with an associated containing net 125a: FIG. 19 illustrates a formwork; obviously a plurality of formworks can be arranged along the area, for example made of iron, to appropriately configure the area 115 (FIG. 18C).

Then further filler material is deposited, arranged on the horizontal portion of the reinforcing element over a height that is substantially equal to the frontal formwork (FIG. 18D), thus forming one or more reinforced layers. The longitudinal edges extend parallel to the first elements of the net structure. In the described example, at least one of the longitudinal edges 118 is folded upwards to wrap the filler material: FIGS. 18A-18D evidence the longitudinal edges 118, respectively, before and during the winding phase of the reinforcing element.

Alternatively the product roll can be unwound as shown in FIG. 19, i.e. with a longitudinal edge 118 substantially flush with the area to be covered. In this case, the net structure is flat and has the first elements parallel to the area and the second transversal elements and substantially coplanar to the first elements. Even in the case of FIG. 19 as in that of FIGS. 18A-18D it is possible to realize multi-layer reinforced structures where the net structure of each layer is parallel to that of the adjacent layers. Finally, in the case of FIG. 19 too it is possible to use frontal formworks 125 which allow frontal containing and profile definition of the area under formation.

Figure 19A:
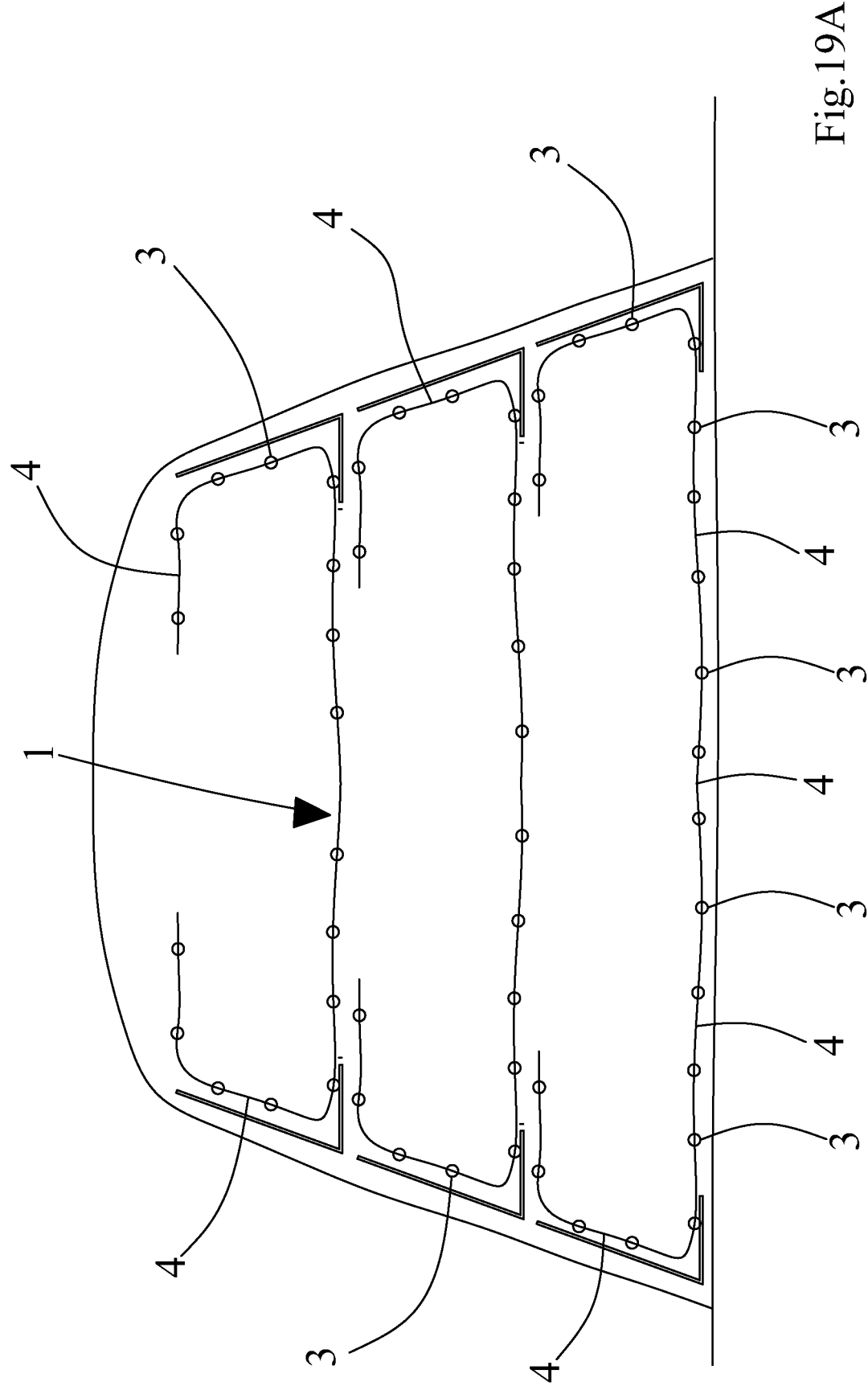
FIGS. 19A and 19B show the elements of FIGS. 15 and 19, applied in building an artificial riverbank.
Figure 19B:
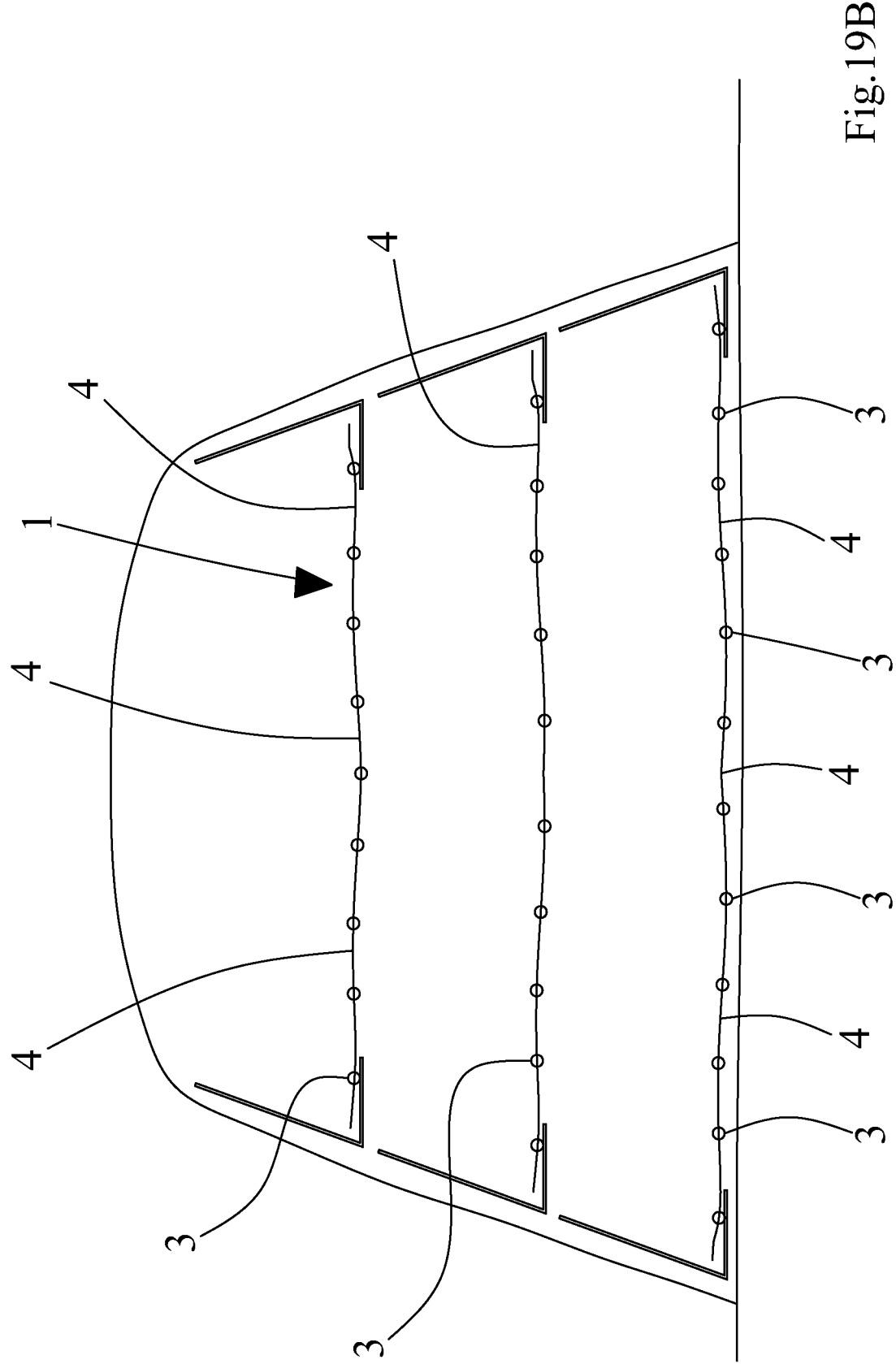

Although in FIGS. 18A-18D in FIG. 19 and reference is made to reinforcing structures of an area, the solutions described can also be applied on ridges or embankments or banks with two opposite sides as shown in FIGS. 19A and 19B.

Figure 20:
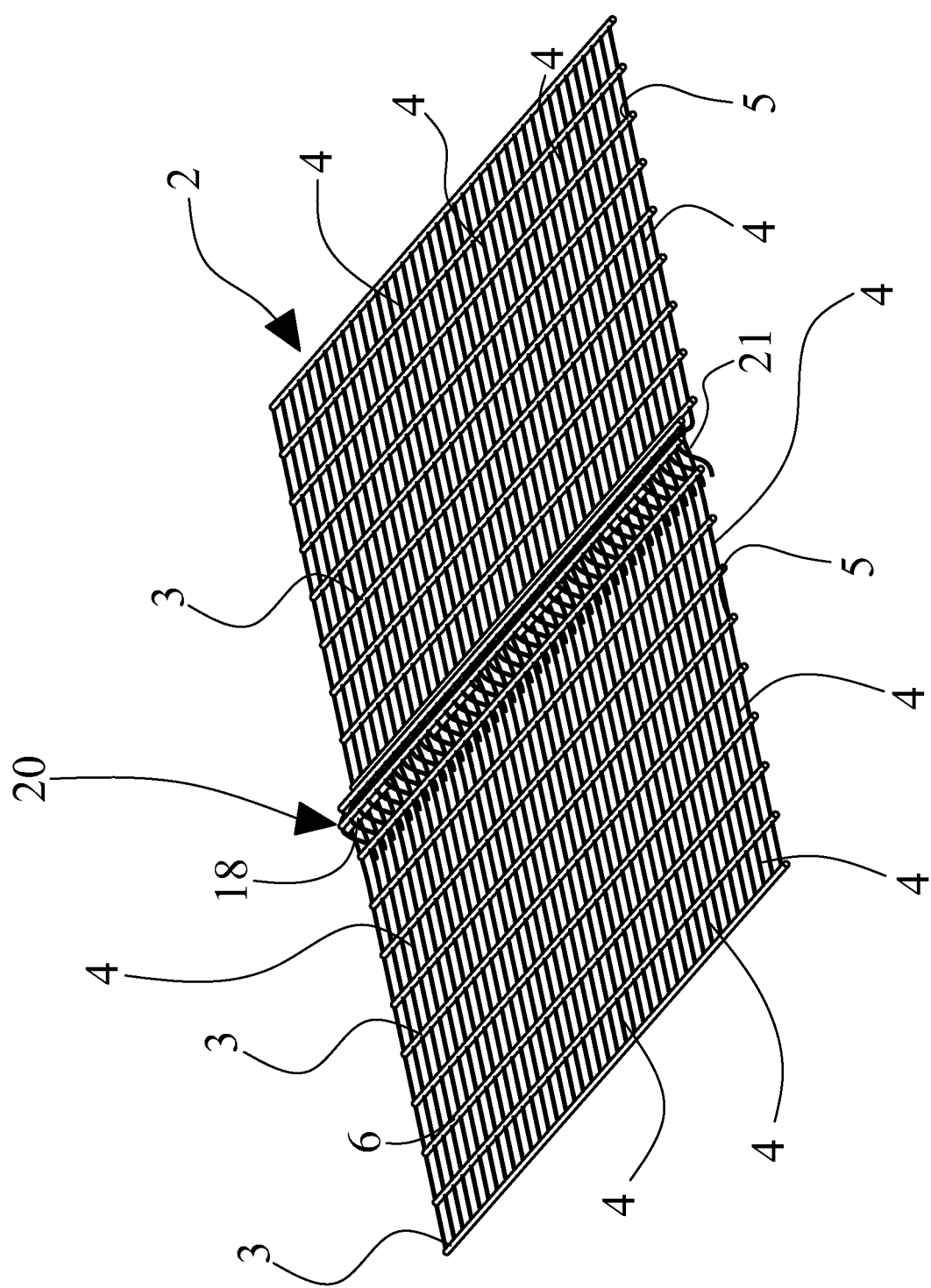
FIG. 20 is a perspective view of two reinforcing elements and connected to one another.

Lastly, FIG. 20 shows how the reinforcing element can be superficially widened thanks to the joinability of two rolls laid side by side. The joint can be effectively obtained by joining two longitudinal edges to one another and using the joins as shown for example in FIG. 8 (clips or the like) or by superposing the longitudinal edges of two reinforcing elements side by side and adopting the connecting means (18, 20, 21) illustrated in FIG. 6C.

FIGS. 19A and 19B illustrate a further application example on a bank. The product roll 102 is unwound along the first elements 3 so as to form a reinforcing element 1 the first elements 3 of which are arranged parallel to the surfaces of the bank and the second elements 4 of which are perpendicular thereto. In the mentioned figures, the reinforcing element 1 has a planar structure (FIG. 19B) or a three-dimensional structure with an open profile having a straight tract and two edges facing upwards or downwards (FIG. 19A). In addition, a plurality of reinforcing elements can be positioned in partial or total superposing relationship.

Figure 26:
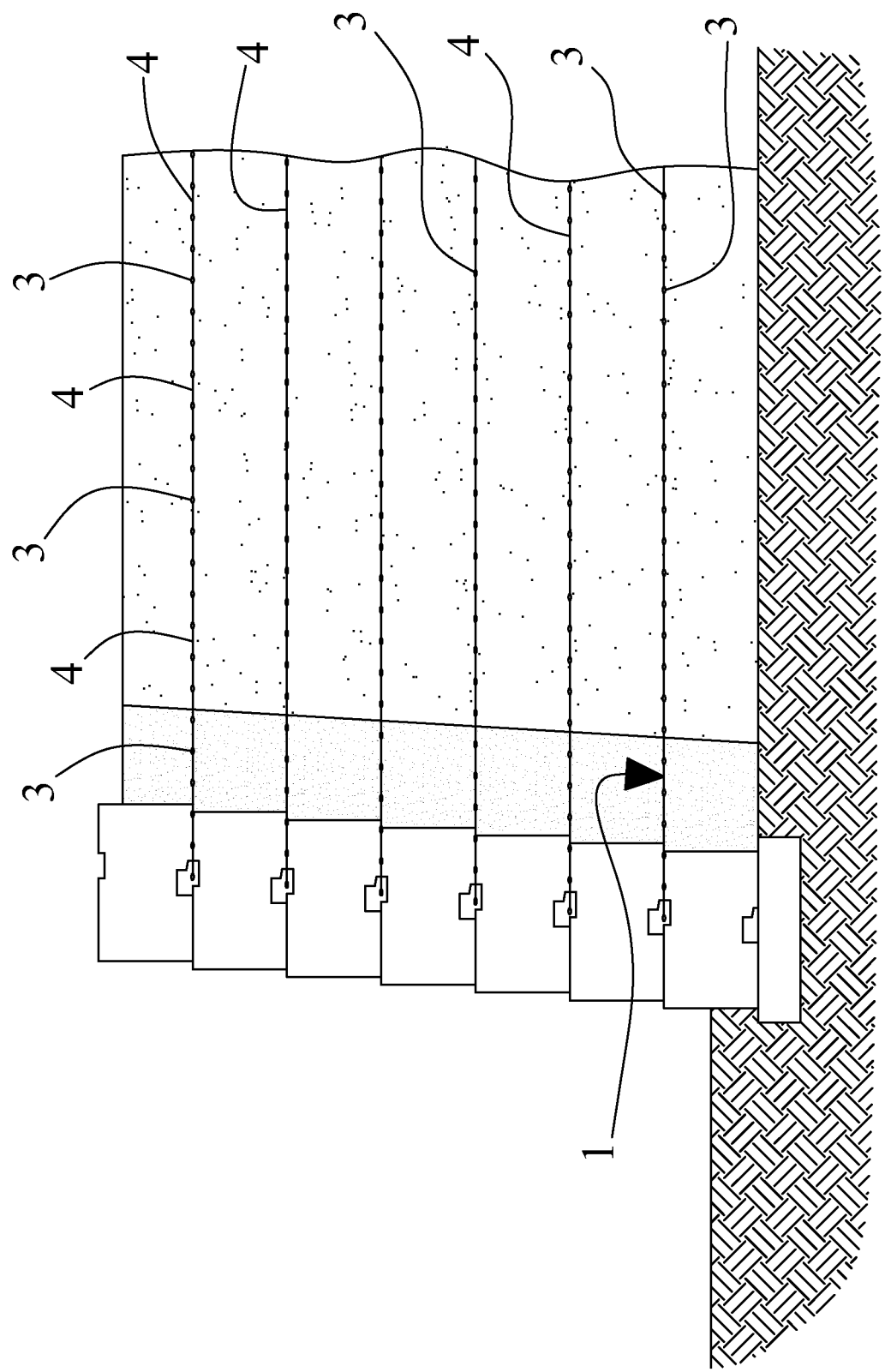
FIG. 26 is a schematic view in cross-section of a block wall in which a reinforcing element according to a variant of the invention is inserted.

With reference now to FIGS. 26 and 27, the reinforcing element 1 is used for the consolidation and reinforcement of artificial walls, block walls and the like. In the specific application of the product of FIG. 26 and FIG. 27 the product roll 102 is unwound along the first elements 3 so as to form a reinforcing element 1 the first elements 3 of which are arranged parallel to the surface (FIG. 26) or to the opposite sides of the wall (FIG. 27) and the second elements 4 of which are perpendicular thereto. In the above-mentioned figures the reinforcing element 1 has a planar structure. In addition, a plurality of reinforcing elements can be positioned in partial or total superposing relationship. The longitudinal edge of each reinforcing member engages a groove arranged on the upper surface of blocks defining the front face or faces of the wall. In the case of FIG. 27 both opposite longitudinal edges, which are defined by a respective first element, engage respective slots arranged on the blocks forming the two opposite sides of the wall. Furthermore, since the blocks and the reinforcing elements are arranged in superposed layers, the blocks of a subsequent layer close and block the longitudinal edges against the adjacent blocks of the previous layer. In this way a correct positioning and anchoring of the reinforcement element is ensured.

4. Consolidation of Roads and Railway Beds

Figure 21:
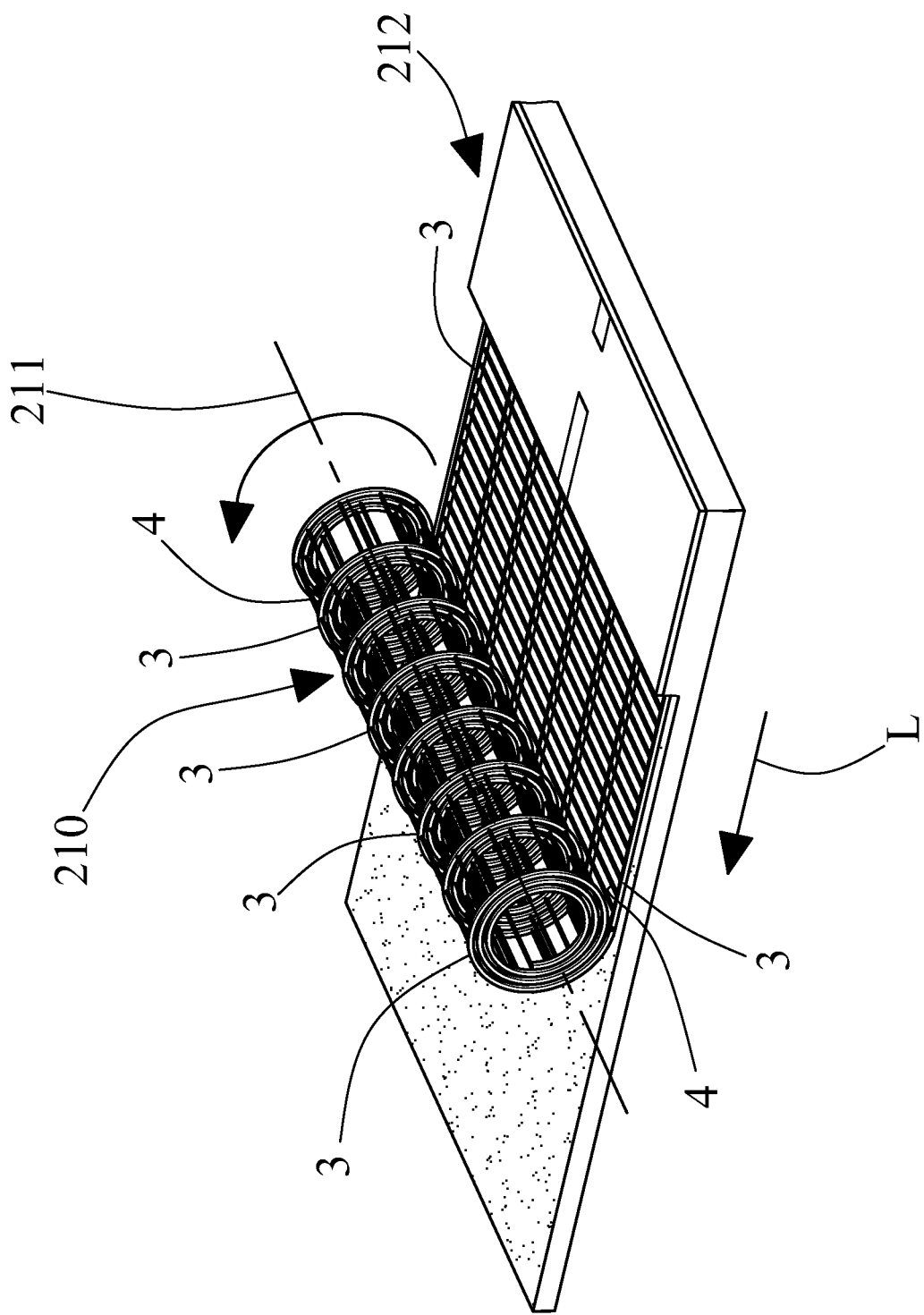
FIG. 21 is a schematic view, according to a perspective view of a process for consolidating road surfaces utilizing the product in roll form of FIG. 1.
Figure 22:
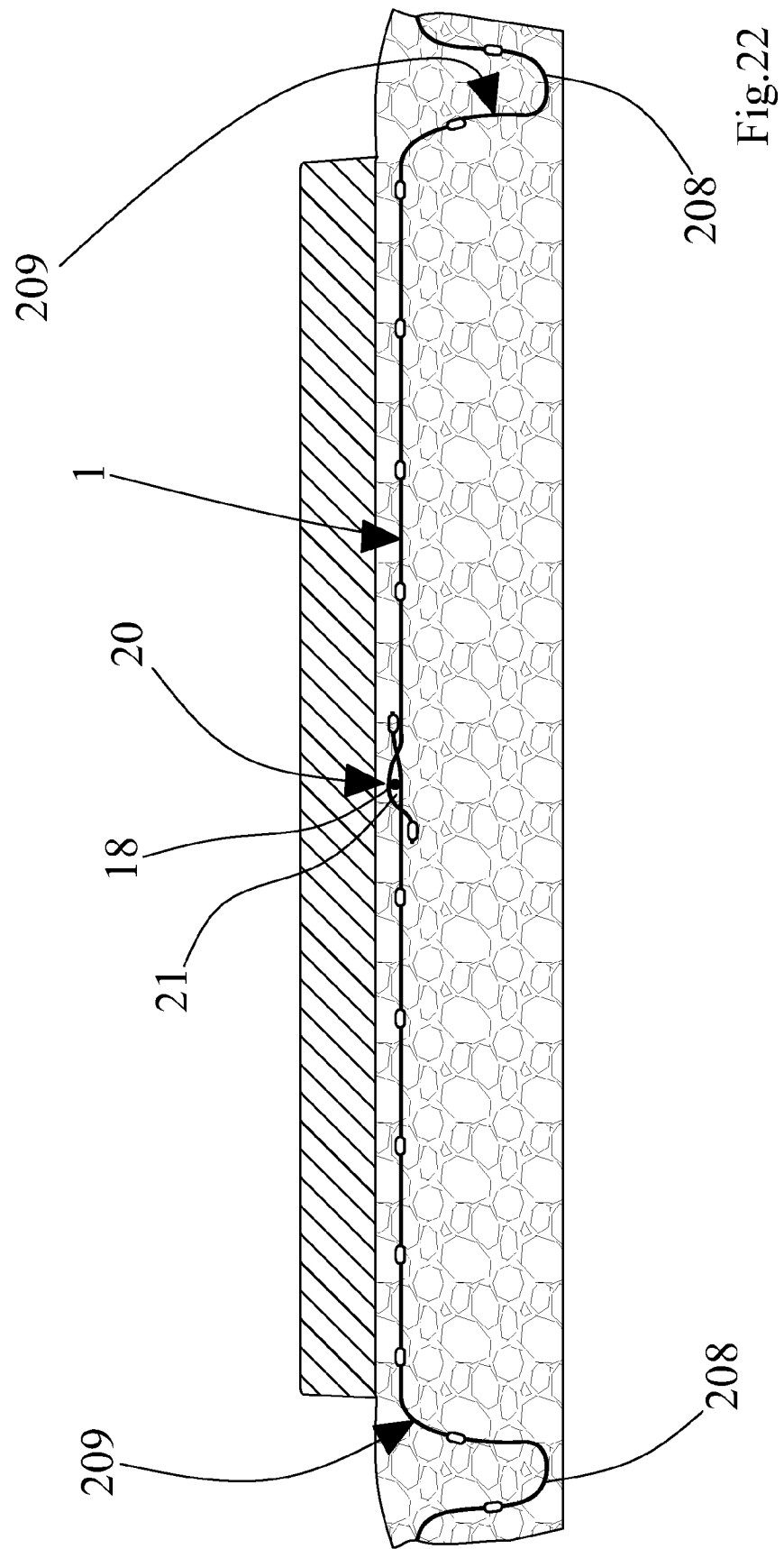
Figure 23A:
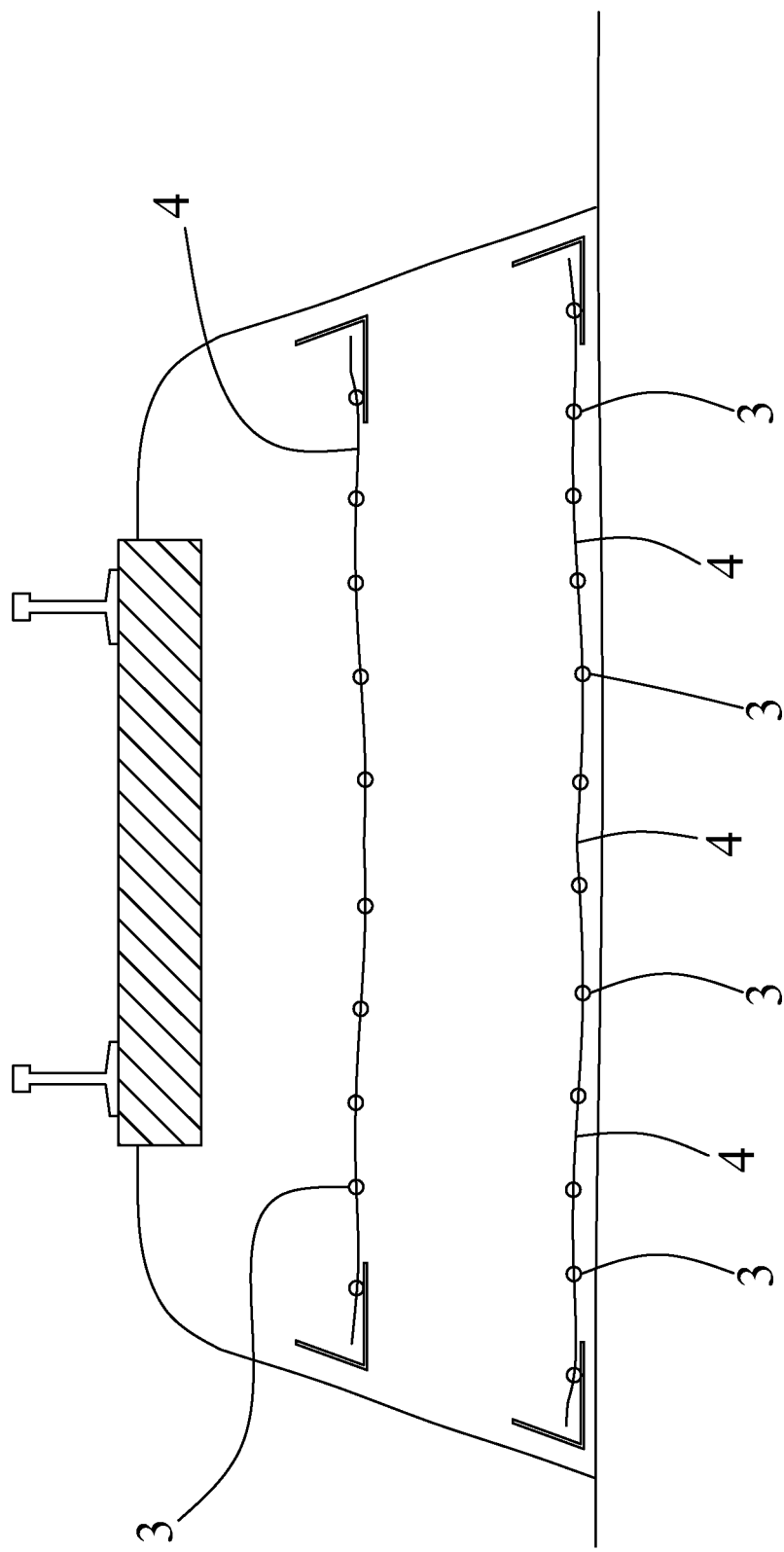
Figure 24:
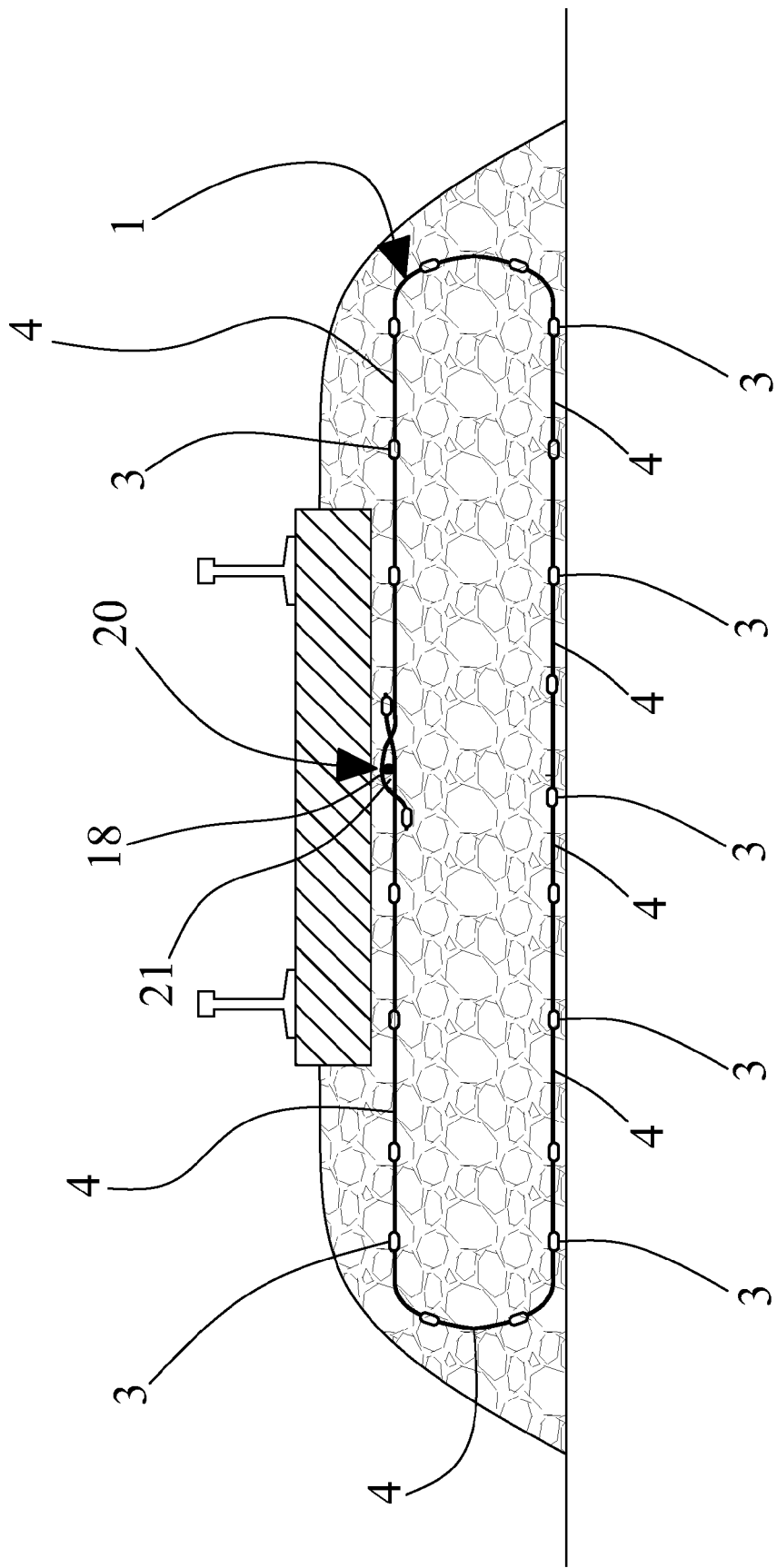
FIG. 24 and FIG. 25 are schematic views in cross-section of a railway bedding in which a reinforcing element of variants of the invention is inserted.
Figure 25:
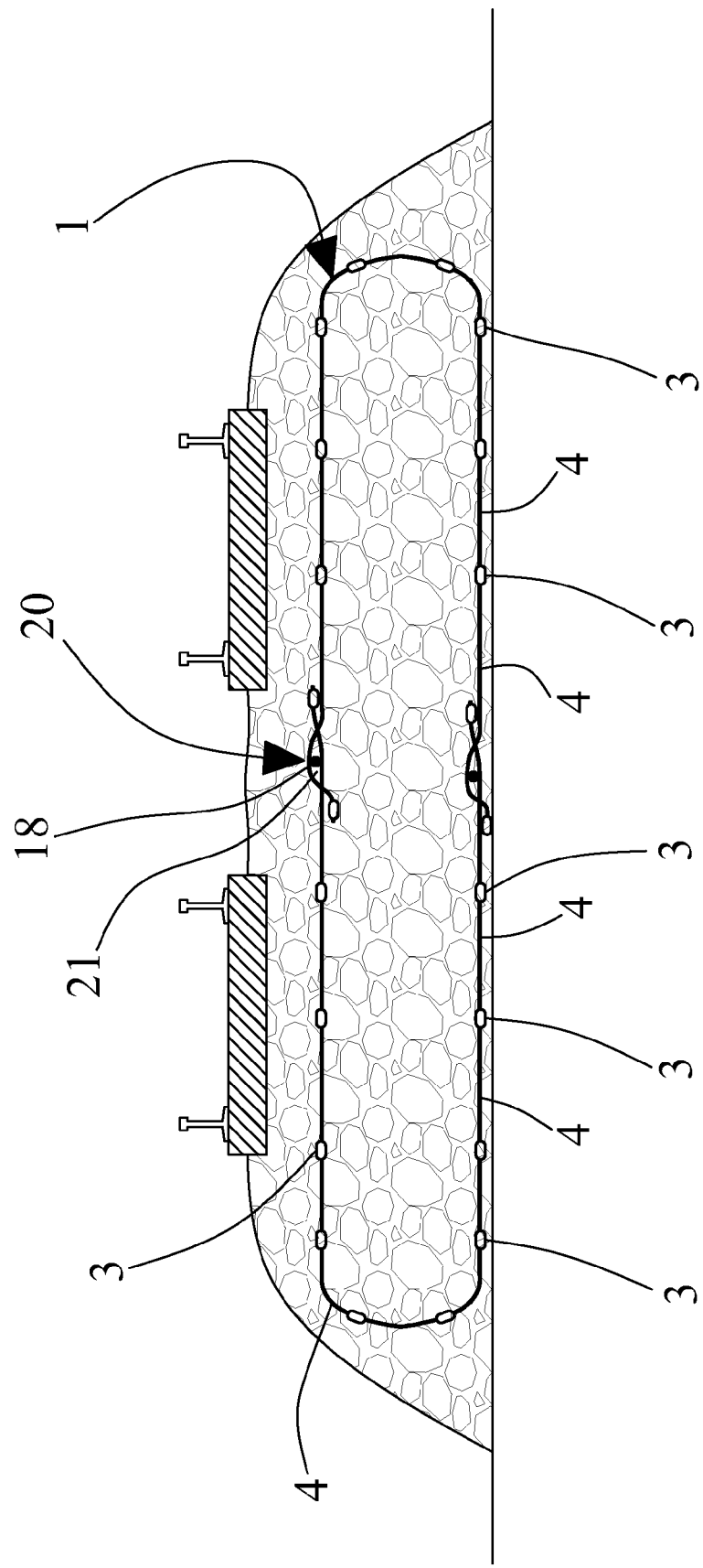

The reinforcing element 1 can also be used for the consolidation of road beds (FIGS. 21-23) parking or storage areas and/or railway beds (FIGS. 23A, 24 and 25).

The product in roll form 102 is unwound along the prevailing direction of the road or railway ballast in order to provide the reinforcing element 1 with the first elements aligned to the direction of travel of the road or rail.

Also in these applications the reinforcing element 1 can be shaped in a flat configuration (FIG. 23 and FIG. 23A) or three-dimensional (i.e. not coplanar with portions such as shown in FIGS. 22, 24 and 25).

In a case of flat configuration, the profile of the reinforcing element is virtually rectilinear and mainly used for the consolidation of road or parking areas, although the use thereof for railway bed ballast is not excluded. The longitudinal edges 209 of the reinforcing element can be blocked to the ground with the aid of pegs 210 for increasing the resistance and lift of the reinforcing element.

In the case of three-dimensional configuration for use on road surfaces, the profile of the reinforcing element 1 has, in a transversal view to the first elements, a shape with open profile having a substantially straight central portion, to the opposite transversal ends of which corrugated sections 208 defining longitudinal trenches 209 are joined (FIG. 22) where the filling material can build up and form an effective stop transversally of the prevalent development direction of the carriageway.

In this case too, a plurality of reinforcing elements can be joined, as shown in FIG. 20, to cover the area of interest in the transversal direction and therefore cover a greater surface area.

In a detail of the laying operation, the reinforcing element 1 used for the consolidation of road surfaces is formed by unrolling the product 102 positioned with its axis transversal to the prevalent development direction L of the carriageway 212 or the road surface on which the roadway will defined. Based on the width of the roadway two or more reinforcing elements can be laid side by side and joined in the transversal direction to the prevalent development direction of the carriageway.

Although it is not possible to realize a product roll 102 that can cover the entire length of the road or carriageway, the invention offers the possibility of minimizing the number of transversal connections between longitudinally consecutive elements 1 and to arrange the first and second elements exactly according to the best possible orientation, the second elements 4 being arranged transversally to the prevalent development direction L of the road (i.e. able to make an effective containment transverse) and the first elements being able to offer an effective anchoring to the soil over the entire length of the element 1.

After laying, the adjacent reinforcing elements can be connected to one another by means of blocking elements.

In this particular case, to connect adjacent reinforcement elements along the development of the carriageway, metal or plastic bars are used. In particular the ends of adjacent reinforcing elements are superposed so that the second elements form the slots (the principle is the same as described for the examples of FIGS. 8 and 10 and in the detail of FIG. 6C). The bars are inserted into the slots to keep the reinforcing elements in position.

After the relative positioning and possible anchoring of the various reinforcing elements, aggregate filler material is typically laid (for example comprising gravel, stones, sand) which when deposited at the meshes stably anchors each reinforcing element to the ground. Thus one or more surface coverings can be deposited for defining the true and proper road surface.

In the case of consolidation of railway ballast the reinforcing element can for example be prepared as described above with reference to roadways (refer to FIG. 22 and FIG. 23 with the difference that in place of the road surface, there may be one or more railroad tracks, or see FIG. 23A).

In a further aspect of the invention it is however also possible to realize reinforced rail bedding of the type illustrated in FIGS. 24 and 25. In these figures, after the product roll is unwound along the first elements and laid on a first layer of gravel or other aggregate material forming the base of the railway ballast, the net structure thus obtained is wound in the direction of the second elements, so as to form a net structure with a looped transversal profile (FIG. 24).

Alternatively 2 or more reinforcing elements are connected along the respective longitudinal edges (e.g. using the techniques illustrated in FIG. 6C) such as to define a looped net structure of larger dimensions, for example to reinforce support ballast of two or more railway lines (FIG. 25).

The lattice structure obtained has, as shown in FIGS. 24 and 25, a looped transversal profile having a horizontal dimension that is greater than the vertical (for example having an elliptical or rectangular shape with rounded edges) so as to suitably reinforce a railway ballast having an isosceles trapezoid transversal shape with a substantially smaller height than the dimensions of the base.

The Invention Attained One or More of the Above-Specified Aims.

Thanks to the invention a product in a roll form can be obtained that can be used in numerous applications, facilitating the anchoring and minimizing the installing costs.

The reinforcing element obtained by unrolling the product in roll form can further be joined by interconnection along the whole length of the longitudinal sides thereof to further reinforcing elements such as to construct a single reinforcing and stabilizing surface of considerable dimensions.

The reinforcing element of the invention can also be anchored along all sides thereof in order to fully exploit the resistance of the product in reinforcing and stabilizing.

With the invention, a structure rollable into a tubular shape can be realized, by joining the edges of the reinforcing element 1 along the direction of the first elements, as it is able to realize containing structures such as those described in the present invention. The invention especially offers the possibility of being folded and connected along the two flaps thereof with the aim of constituting a geotechnical structure able to contain and confine stones, grave and earth as required, by using a textile for containing.

Differently from the traditional single-stretched nets, the rolled product is wound along the first elements (or bars) which exhibit any extension, being orientated along the extrusion direction of the semi-finished workpiece or the advancement direction during the manufacturing of the semi-finished workpiece in sheet form.

Thanks to the production process of the invention, the distance between the first adjacent elements and the second adjacent elements can be varied.

Further, the first elements maintain a straight configuration that is very useful, as the elements must be arranged along the prevalent development direction of the structures to be consolidated or reinforced.

It will be apparent to those skilled in the art that various modifications and variations can be made to the product having a net structure, the process for realizing the product, and use of the product for geotechnical applications of the present disclosure without departing from the scope of the invention. Throughout the disclosure, use of the terms "a," "an," and "the" may include one or more of the elements to which they refer. Other embodiments of the invention will be apparent to those skilled in the art from consideration of the specification and practice of the invention disclosed herein. It is intended that the specification and examples be considered as exemplary only.

What is claimed is:

1. A reinforcing element for geo-technical applications comprising a monolithic net structure made of a plastic material, having:
   a plurality of first elements distanced from one another and having an elongate conformation in a respective prevalent development direction, the first elements being not stretched; and
   a plurality of second elements distanced from one another and also having an elongate conformation, which develop substantially in a transversal direction to the first elements,
   wherein the second elements are stretched along a development thereof,
   wherein, in an operative condition of the net structure, the second elements are configured such that the net structure exhibits a substantially arched profile defining a net structure with a closed profile and forms a longitudinal seating having an axis of extension substantially parallel to the first elements, the net structure further exhibiting a first longitudinal flap and a second longitudinal flap arranged at respective transversal ends of the net structure and linked one another,
   wherein the reinforcing element exhibits a support element internally arranged in the seating and delimiting a space filled with an aggregate material selected from the group consisting of concrete and conglomerates, and
   wherein the support element in one selected from the group of:
      a tube inserted in the seating,
      a netted bag inserted in the seating, and
      at least a laminar confining element joined on a side thereof to the reinforcing element and having through-openings which are significantly smaller with respect to the openings of the net structure.

2. The reinforcing element of claim 1, wherein the first elements exhibit a stretching ratio that is no more than a half of a stretching ratio of the second elements, the stretching ratio of an element being defined as a ratio between a final length of the element once the stretching has been performed, and an initial length of the element before the stretching action.

3. The reinforcing element of claim 1, wherein the net structure in operative conditions exhibits a length, in a direction of the extension axis, which is greater than 5 meters.

4. The reinforcing element of claim 3, wherein the net structure, in operative conditions, exhibits a ratio between the length in a direction of the axis extension and a maximum transversal size measured perpendicular to the axis which is greater than 3, and
   wherein the second elements exhibit a length of greater than 3 meters, and wherein the first elements are ten times as long as the second elements.

5. The reinforcing element of claim 1, wherein the second elements are stretched after formation thereof and exhibit a structure with molecular chains orientated along the development of the second elements.

6. The reinforcing element of claim 1, wherein the monolithic net structure exhibits a radially external surface and a radially internal surface opposite the radially external surface, the net structure further exhibiting a first and a second longitudinal flap arranged at respective transversal ends of the net structure, and
   wherein the net structure, in operative conditions, at least partially rolls on itself forming a longitudinal superposing zone comprising at least two mutually superposed portions of the net structure.

7. The reinforcing element of claim 6, wherein the superposing zone comprises a plurality of slots, each of which slots forms a passage opening delimited by tracts of second elements of the mutually-superposed portions, a plurality of the slots being substantially aligned in a direction of the first elements to form a coupling zone, and
   wherein the reinforcing element comprises at least a blocking element configured to at least radially block the net structure in operative conditions, and wherein the blocking element engages the slots crossing the passage openings.

8. The reinforcing element of claim 7 wherein the blocking element comprises at least a rod inserted in the passage openings of the slots.

9. The reinforcing element of claim 6, wherein the first and second flaps are substantially facing and adjacent one another, and wherein blocking elements bridge the flaps and are configured such as to guarantee a blocking between the flaps.

10. The reinforcing element of claim 1, wherein the first elements and the second elements are respectively longitudinal elements and transversal elements,
    wherein the first elements and the second elements exhibit a transversal section that is substantially full, the transversal section of the first elements being greater by at least 5 times with respect to the transversal section of the second elements, and
    wherein the first elements exhibit a transversal section having an area that is greater than 20 $mm^2$, and
    wherein the second elements exhibit a transversal section having an area of greater than 3 $mm^2$.

11. The reinforcing element of claim 1 wherein the second elements exhibit a stretching ratio of greater than 3, the stretching ratio of the second elements being defined as a ratio between a final length of the second elements after a stretching action there-upon and an initial length of the second elements before stretching.

12. The reinforcing element of claim 1, wherein the net structure has a specific weight comprised between 200 and 1200 $g/m^2$.

13. The reinforcing element of claim 1, wherein the net structure has a specific tensile strength, along the second elements, comprised between 20 and 200 KN/m, the specific strength is measured by the method set down in the EN ISO 10319 standard.

14. The reinforcing element of claim 1, wherein the first elements and the second elements are respectively longitudinal elements and transversal elements, wherein the transversal elements are located perpendicular to the longitudinal elements which are substantially straight, and wherein the second elements have a substantially circular or elliptical conformation.

15. A reinforcing element for geo-technical applications comprising a monolithic net structure made of a plastic material, having:
- a plurality of first elements distanced from one another and having an elongate conformation in a respective prevalent development direction; and
- a plurality of second elements distanced from one another and also having an elongate conformation, which develop substantially in a transversal direction to the first elements, wherein
- the second elements are stretched along a development thereof and wherein, in an operative condition of the net structure, the second elements are configured such that the net structure exhibits a substantially arched profile defining a net structure with a closed profile and forms a longitudinal seating having an axis of extension substantially parallel to the first elements,
- the net structure exhibits a radially external surface and a radially internal surface opposite the radially external surface, the net structure further exhibiting a first and a second longitudinal flap arranged at respective transversal ends of the net structure, and wherein the net structure, in operative conditions, at least partially rolls on itself forming a longitudinal superposing zone comprising at least two mutually superposed portions of the net structure having counter shaped arched profiles,
- the superposing zone having arched profile comprises a plurality of slots, each of which slots forms a passage opening delimited by tracts of second elements of the mutually-superposed portions having arched profile, a plurality of the slots being substantially aligned in a direction of the first elements to form a coupling zone, and
- the reinforcing element comprises at least a blocking element configured to at least radially blocking the net structure and wherein the blocking element engages the slots crossing the passage openings.

16. The reinforcing element of claim 15, wherein the first elements exhibit a stretching ratio that is no more than a half of a stretching ratio of the second elements, the stretching ratio of an element being defined as a ratio between a final length of the element once the stretching has been performed, and an initial length of the element before the stretching action.

17. The reinforcing element of claim 15, wherein the net structure, in operative conditions, exhibits a ratio between the length in a direction of the axis extension and a maximum transversal size measured perpendicular to the axis which is greater than 3,
- wherein the second elements exhibit a length of greater than 3 metres, and wherein the first elements are ten times as long as the second elements.

18. The reinforcing element of claim 15, wherein the first elements and the second elements are respectively longitudinal elements and transversal elements,
- wherein the first elements and the second elements exhibit a transversal section that is substantially full, the transversal section of the first elements being greater by at least 5 times with respect to the transversal section of the second elements, and
- wherein the first elements exhibit a transversal section having an area that is greater than 20 mm$^2$, and
- wherein the second elements exhibit a transversal section having an area of greater than 3mm$^2$.

19. The reinforcing element of claim 15, wherein the second elements exhibit a stretching ratio of greater than 3, the stretching ratio of the second elements being defined as a ratio between a final length of the second elements after a stretching action there- upon and an initial length of the second elements before stretching.

20. The reinforcing element of claim 15, wherein the first elements and the second elements are respectively longitudinal elements and transversal elements, wherein the transversal elements are located perpendicular to the longitudinal elements which are substantially straight, and wherein the second elements have a substantially circular or elliptical conformation.

21. A reinforcing element for geo-technical applications comprising a monolithic net structure made of a plastic material, having:
- a plurality of first elements distanced from one another and having an elongate conformation in a respective prevalent development direction; and
- a plurality of second elements distanced from one another and also having an elongate conformation, which develop substantially in a transversal direction to the first elements, wherein
- the second elements are stretched along a development thereof and wherein, in an operative condition of the net structure, the second elements are configured such that the net structure exhibits a substantially arched profile defining a net structure with a closed profile and forms a longitudinal seating having an axis of extension substantially parallel to the first elements, and
- the net structure exhibits a radially external surface and a radially internal surface opposite the radially external surface, the net structure further exhibiting a first and a second longitudinal flap arranged at respective transversal ends of the net structure, wherein the first and second flaps are substantially facing and adjacent one another, and wherein blocking elements bridge and engage the flaps to block the flaps, said blocking element being applied at one or more points along the development of two adjacent elements of the first elements.

22. The reinforcing element of claim 21, wherein the first elements exhibit a stretching ratio that is no more than a half of a stretching ratio of the second elements, the stretching ratio of an element being defined as a ratio between a final length of the element once the stretching has been performed, and an initial length of the element before the stretching action.

23. The reinforcing element of claim 21, wherein the net structure, in operative conditions, exhibits a ratio between the length in a direction of the axis extension and a maximum transversal size measured perpendicular to the axis which is greater than 3, wherein the second elements exhibit a length of greater than 3 metres, and wherein the first elements are ten times as long as the second elements.

24. The reinforcing element of claim 21, wherein the first elements and the second elements are respectively longitudinal elements and transversal elements,
- wherein the first elements and the second elements exhibit a transversal section that is substantially full, the transversal section of the first elements being greater by at least 5 times with respect to the transversal section of the second elements, and wherein the first elements exhibit a transversal section having an area that is greater than 20 mm², and wherein the second elements exhibit a transversal section having an area of greater than 3 mm².

25. The reinforcing element of claim 21, wherein the second elements exhibit a stretching ratio of greater than 3, the stretching ratio of the second elements being defined as a ratio between a final length of the second elements after a stretching action thereupon and an initial length of the second elements before stretching.

26. The reinforcing element of claim 21, wherein the first elements and the second elements are respectively longitudinal elements and transversal elements, wherein the transversal elements are located perpendicular to the longitudinal elements which are substantially straight, and wherein the second elements have a substantially circular or elliptical conformation.

\* \* \* \* \*